(12) United States Patent
He

(10) Patent No.: US 11,717,115 B2
(45) Date of Patent: Aug. 8, 2023

(54) MULTI-STAGE COOKING

(71) Applicant: Zhengxu He, Reno, NV (US)

(72) Inventor: Zhengxu He, Reno, NV (US)

(*) Notice: Subject to any disclaimer, the term of this patent is extended or adjusted under 35 U.S.C. 154(b) by 463 days.

(21) Appl. No.: 17/072,011

(22) Filed: Oct. 15, 2020

(65) Prior Publication Data
US 2022/0031122 A1    Feb. 3, 2022

Related U.S. Application Data

(60) Provisional application No. 63/057,509, filed on Jul. 28, 2020.

(51) Int. Cl.
| | |
|---|---|
| A47J 44/00 | (2006.01) |
| A47J 37/12 | (2006.01) |
| A47J 36/34 | (2006.01) |
| A47J 27/00 | (2006.01) |
| B25J 11/00 | (2006.01) |
| A47J 36/06 | (2006.01) |

(52) U.S. Cl.
CPC ............... *A47J 44/00* (2013.01); *A47J 27/00* (2013.01); *A47J 36/06* (2013.01); *A47J 36/34* (2013.01); *A47J 37/128* (2013.01); *A47J 37/1219* (2013.01); *B25J 11/0045* (2013.01)

(58) Field of Classification Search
CPC .. A47J 44/00; A47J 27/00; A47J 36/06; A47J 36/34; A47J 37/1219; A47J 37/128; B25J 11/0045
USPC ......... 99/325, 326, 357, 334, 339, 352, 358, 99/355, 443, 494, 451; 426/274, 275, 426/574, 629, 641, 656, 634, 516–519, 426/531
See application file for complete search history.

(56) References Cited

U.S. PATENT DOCUMENTS

| | | | | |
|---|---|---|---|---|
| 3,736,860 A | * | 6/1973 | Vischer, Jr. | F24C 7/087 99/477 |
| 2012/0102883 A1 | * | 5/2012 | Raniwala | B67C 7/0073 53/425 |

* cited by examiner

*Primary Examiner* — Phuong T Nguyen

(57) ABSTRACT

The present application firstly discloses a cooking system including a second cooking apparatus and a first cooking apparatus, which is used to deep fry or boil a food or food ingredients. A semi-cooked food is produced in the first cooking apparatus and is used as an ingredient in the second cooking apparatus. The cooking apparatuses work together to produce a cooked food.

23 Claims, 49 Drawing Sheets

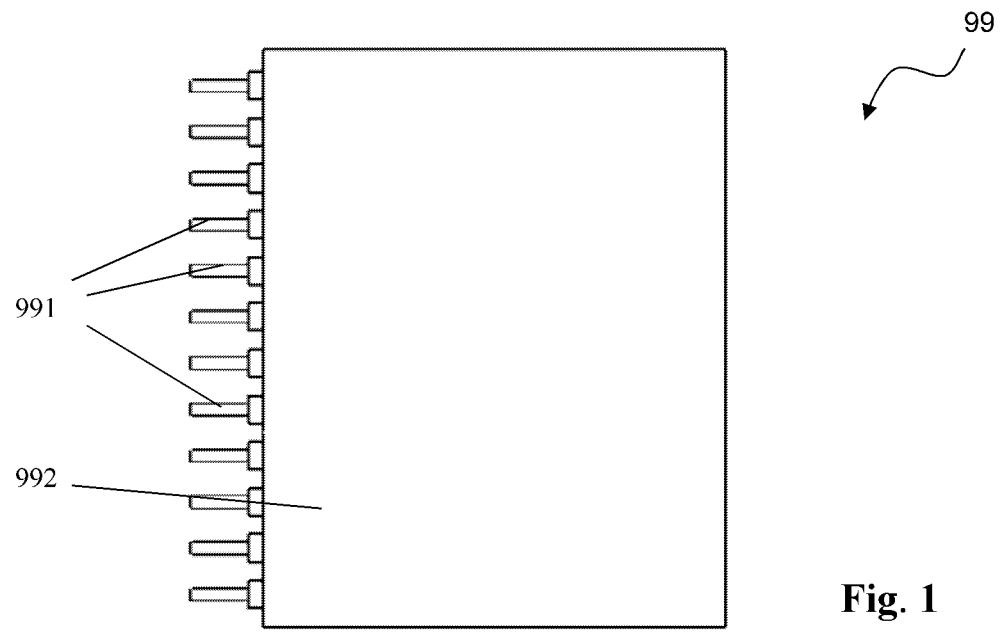
Fig. 1
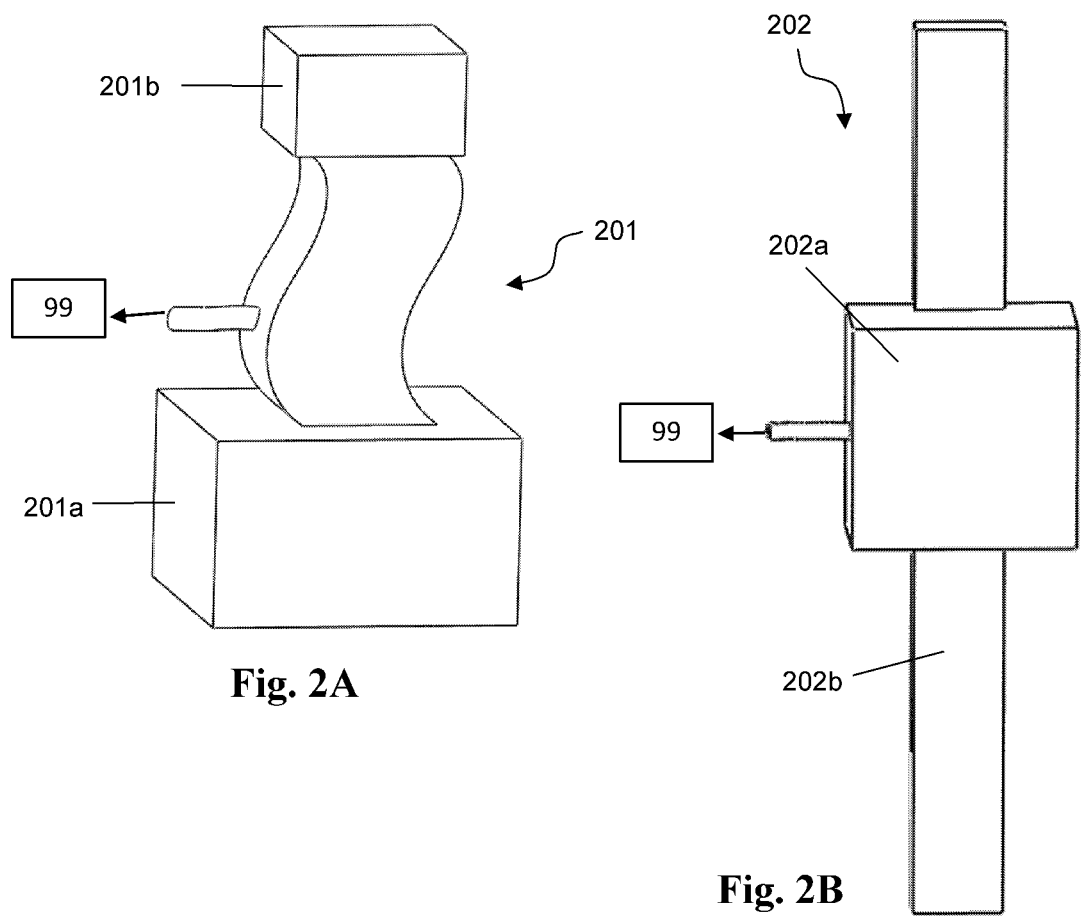
Fig. 2A
Fig. 2B

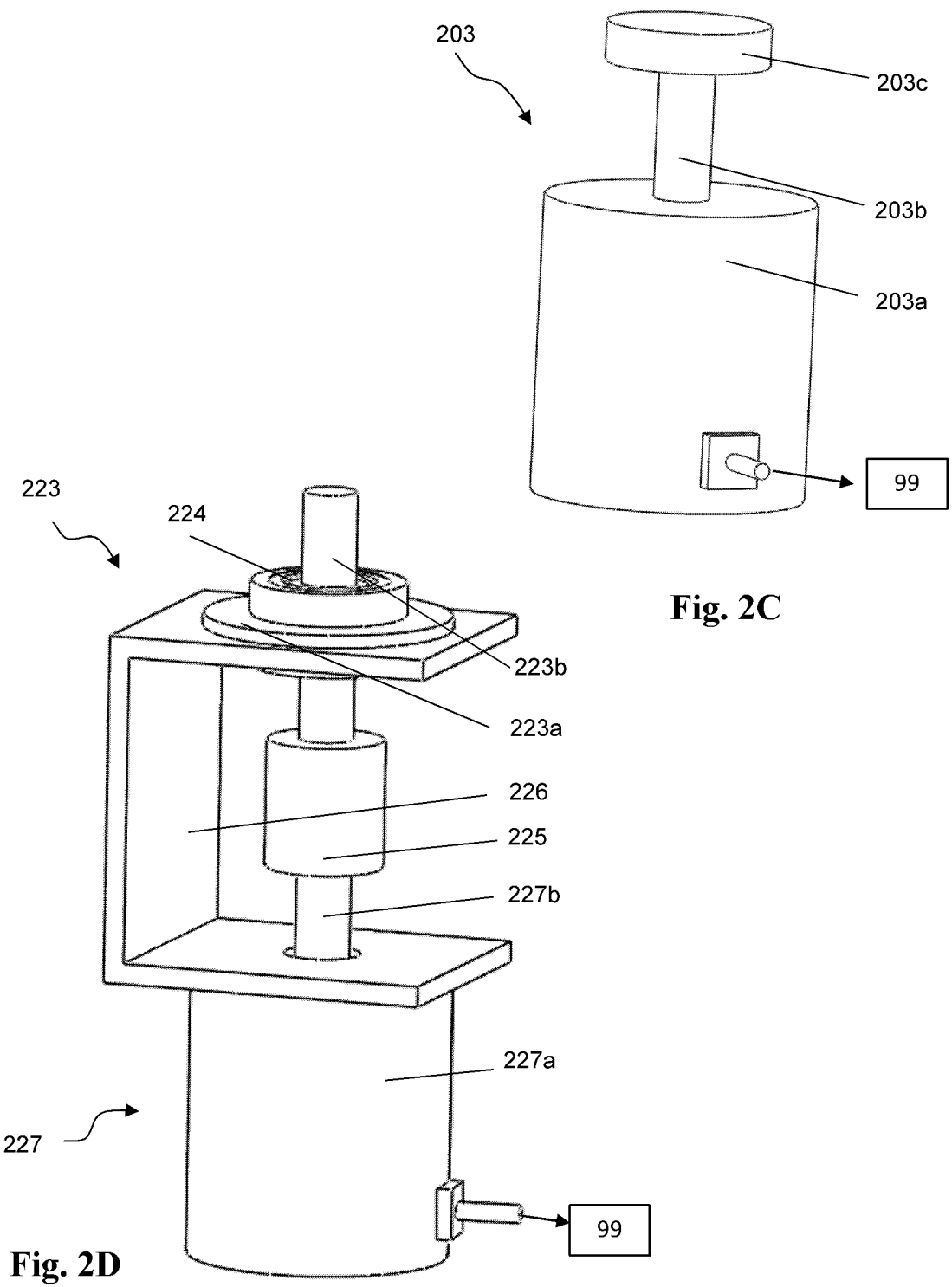

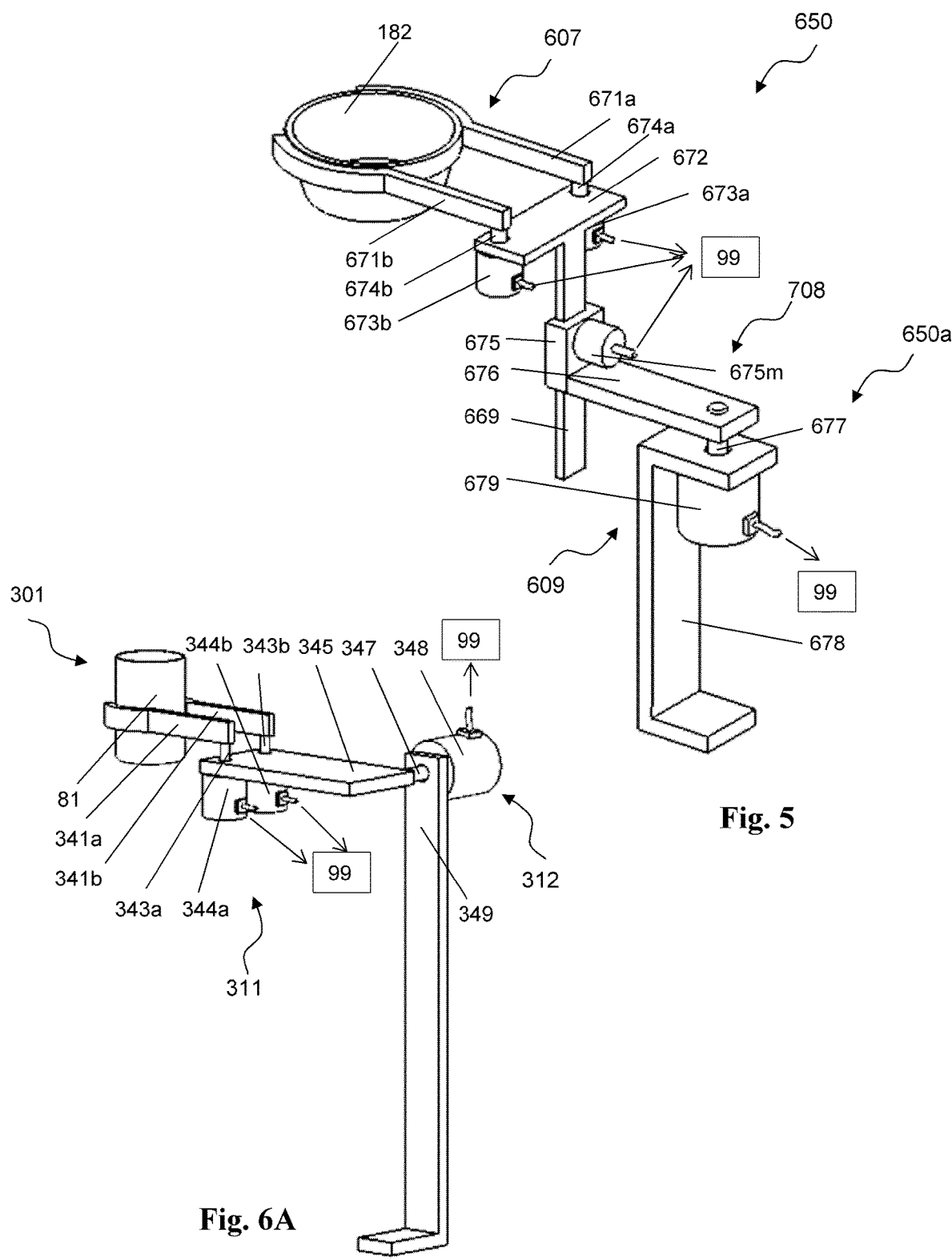

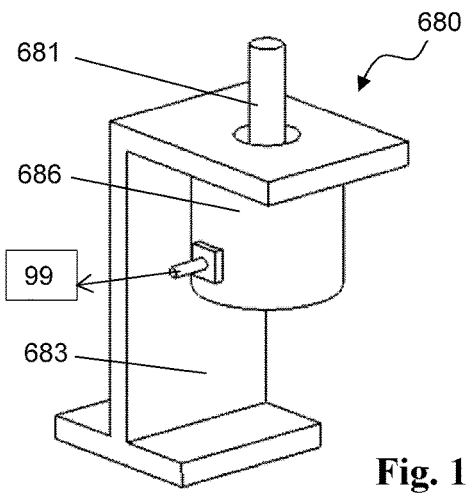
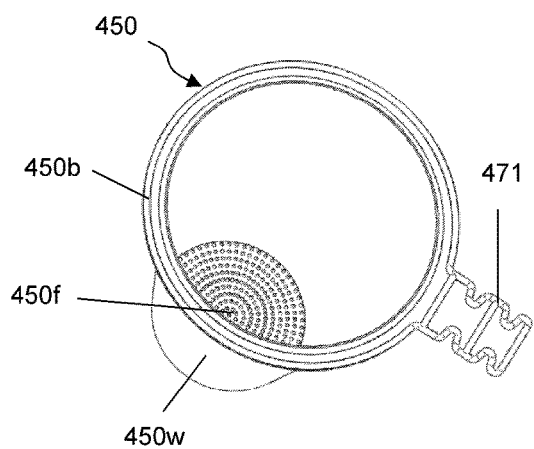
Fig. 17
Fig. 18A
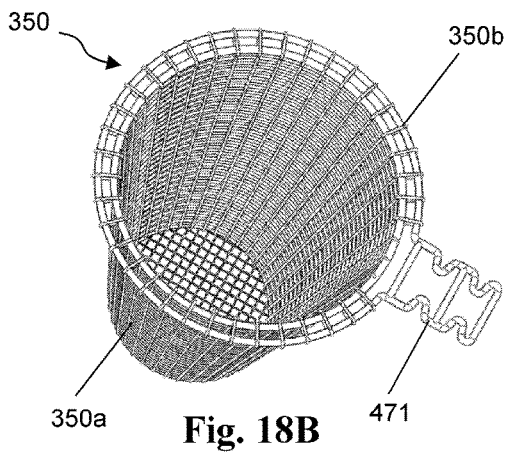
Fig. 18B
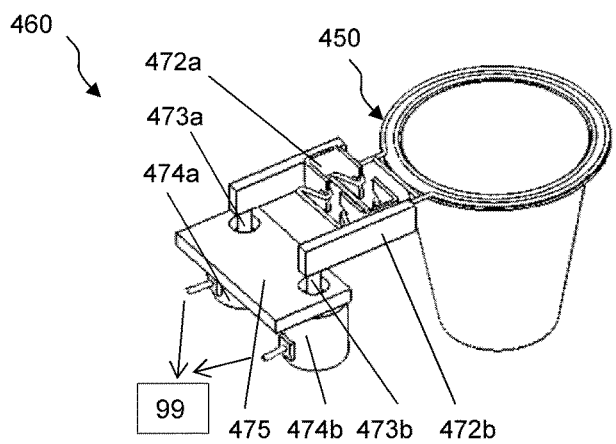
Fig. 19A
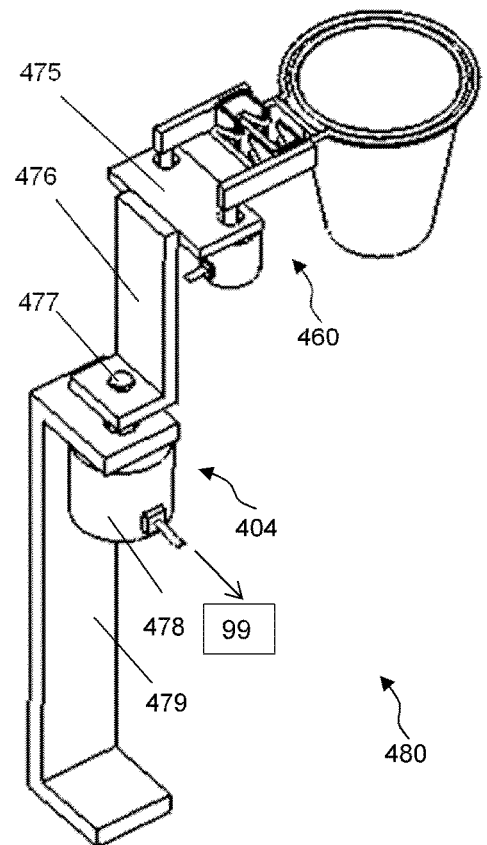
Fig. 19B The computer system 99 is configured to store a program configured to send or receive signals to and from the motorized mechanisms, inductive stoves, motors, temperature sensors, and pumps of the cooking system 909. 921

The computer system 99 comprises a database. 922

The computer system 99 stores the IDs of the cooking apparatuses, receiving apparatus, food container cleaning mechanism, liquid dispensing mechanism, ingredient dispensing mechanism, transfer mechanisms, cookware cleaning mechanism, transport system. 923

The computer system 99 stores the information of the structure of each mini-vehicle of the transfer system 302, including the ingredient container types that can be placed on the holders of the vehicle 790. 924

The computer system 99 stores a program for controlling the transport system 302, said program configured to control a mini-vehicle 790 to move to a position near a cooking station of the cooking system 909, so that an ingredient container on a given holder of the mini-vehicle 790 is at a dispensing position relative to the cooking apparatus at a pre-scheduled time. Said program configured to control a mini-vehicle 640 to move to a position near a receiving apparatus, so that the mini-vehicle 640 is at a food container transferring position relative to the support component of the receiving apparatus. 925

The computer system 99 stores a list of food items which can be cooked by the cooking system 909. 926

For each food item of the list of Step 926, the computer system 99 stores a cooking program configured to control the motorized mechanisms, inductive stoves, pumps and devices in the cooking system 909. 927

For each food item of the list of Step 926, the computer system 99 stores types and quantities of food ingredients, relative timing of their dispensing and the respective ID of the destination cooking apparatus for each ingredient. 928

Fig. 28A

The computer system 99 takes an order of a food item. 931

The computer system 99 finds the information on the types and quantities of the ingredients needed for cooking the ordered food item, in accordance with the information stored by the computer system in Step 928. 932

The computer system 99 locates the ingredient containers that contain the ingredients. 933

The computer system 99 schedules cooking of the ordered food item at the cooking system 909, including the timing for running the program of Step 927 corresponding to the ordered food item, timing of dispensing of the food ingredients from each ingredient container into a respective cooking container or cookware of the cooking system 909. 934

The computer system 99 controls the transport system 302 so that each ingredient container of Step 932 may be moved and stopped per the schedule of Step 934. 935

The computer system 99 runs the program of Step 927 corresponding to the ordered food item, according to the schedule of Step 934, as to send or receive signals to or from the motorized mechanisms, inductive stoves, temperature sensors and pumps of the cooking system 909. The cooking of the food item is complete after all these steps. 936

Fig. 28B

MULTI-STAGE COOKING

This application claims the benefit of U.S. Provisional Application Ser. No. 63/057,509 filed Jul. 28, 2020. Entire contents of the application are incorporated herein by reference.

CROSS-REFERENCE TO RELATED APPLICATIONS

US Provisional Patent Applications:
Ser. No. 63/057,509, Filed Jul. 28, 2020, Inventor: Zhengxu He
US Patent Applications:
Ser. No. 15/839,600, Filed Dec. 12, 2017, Inventor: Zhengxu He
Ser. No. 15/706,136, filed Sep. 15, 2017, Inventor: Zhengxu He
Ser. No. 15/801,923, filed Nov. 2, 2017, Inventor: Zhengxu He
Ser. No. 15/798,357, filed Oct. 30, 2017, Inventor: Zhengxu He
Ser. No. 15/924,749, Filed Mar. 19, 2018, Inventor: Zhengxu He
Ser. No. 16/155,895, Filed Oct. 10, 2018, Inventor: Zhengxu He
Ser. No. 16/510,982, Filed Jul. 15, 2019, Inventor: Zhengxu He
Ser. No. 16/517,705, filed Jul. 22, 2019, Inventor: Zhengxu He
Ser. No. 16/735,834, Filed Jan. 7, 2020, Inventor: Zhengxu He
Ser. No. 16/997,196, filed Aug. 19, 2020, Inventor: Zhengxu He
Ser. No. 16/997,933, filed Aug. 20, 2020, Inventor: Zhengxu He
Ser. No. 17/069,707, filed Oct. 13, 2020, Inventor: Zhengxu He
US Patent:
Ser. No. 10,455,987, issued Oct. 29, 2019, Inventor: Zhengxu He

BACKGROUND OF THE INVENTION

The present application relates to a cooking system for producing a food from food ingredients. In the cooking of a food, e.g. a dish of food, one or more of the following steps are possibly required: (1) first food ingredients is deep fried in oil or boiled in water to produce a semi-cooked food; (2) the semi-cooked food and/or second food ingredients is stir fried or otherwise cooked in a wok or other cookware; (3) all foods or food ingredients are then stirred and/or mixed and/or heated in said cookware, as to produce a cooked food; (4) the cooked food is then dispensed into a food container, such as, a dish or a bowl.

A cost-effective cooking apparatus or cooking system that does (some or) all the above steps is important, as it can save labor and cost.

Furthermore, a cost-effective transportation of the first and second food ingredients to the cookware and cooking container, respectively, is also important for the same reason.

BRIEF SUMMARY OF THE INVENTION

A cooking system disclosed in our application comprises some cooking apparatuses and other mechanisms and/or apparatuses. The present patent application discloses a cooking system comprising a second cooking apparatus and a first cooking apparatus. The second cooking apparatus comprises one or more of the following parts: (1) a cookware configured to contain or otherwise hold food or food ingredients for the purpose of cooking a food; (2) a motion apparatus comprising a stirring motion mechanism configured to move the cookware as to stir or mix the food or food ingredients contained in the cookware and a motion mechanism configured to directly or indirectly move the cookware, as to dispense a cooked food into a food container; (3) a transfer apparatus configured to grip and hold a food container as to allow said motion apparatus to dispense a cooked food from the cookware into a food container; (4) a plurality of cooking containers configured to contain or otherwise hold food or food ingredients, a food dispensing apparatus configured to move a cooking container, said food dispensing apparatus configured to dispense a semi-cooked food held in the cooking container to the cookware. The first cooking apparatus comprises one or more of the following parts: (5) a plurality of baskets (or cooking containers) each configured to contain or otherwise hold food or food ingredients; (6) a plurality of holders each configured to hold a basket and a motion mechanism configured to cyclically move said holders and said baskets held by said holders; (7) a dispensing apparatus configured to grip and move a cooking container held by a said holder, said dispensing apparatus may be used to dispense a cooked or semi-cooked food held in a cooking container to a cookware; (8) a liquid container configured to contain a liquid (e.g., oil for deep frying, water for boiling) and a heater configured to heat the liquid therein; (9) heaters; etc.

The cookware may be a wok, a pan, or any container configured to contain or otherwise hold food or food ingredients during cooking.

Implementations of our cooking system may include one or more of the following. The stirring motion mechanism may comprise a support component and a mechanism configured to produce a motion of the cookware relative to the support component, as to stir or mix the food or food ingredients in the cookware. The stirring motion mechanism may comprise: a first shaft; a second shaft; a third shaft; a fourth shaft; and a fifth shaft; wherein the axes of the shafts may be configured to be parallel to each other.

Implementations of our cooking system may include one or more of the following. A motion mechanism is configured to produce an axial rotation of the support component of said stirring motion mechanism as to dispense a cooked food from the cookware; wherein the axis of the axial rotation is configured to be horizontal.

Our cooking system may further comprise a dispensing apparatus which dispenses food ingredients into the cookware and/or a cooking container. The cooking system may also comprise: a transfer apparatus which may move a food container containing a cooked food to an area accessible by humans.

Implementations of our cooking system may include one or more of the following. A dispensing apparatus may comprise: (1) a gripping mechanism comprising a first support component, grippers, and a motion mechanism configured to produce a controlled rotation of said grippers relative to the first support component as to grab or let loose a container; (2) a second support component; (3) a motion mechanism configured to produce a rotation of the first support component relative to the second support component.

A computer is used to control the above described mechanisms and apparatus.

BRIEF DESCRIPTION OF THE SEVERAL VIEWS OF THE DRAWINGS

FIG. 1 shows an aerial view of a computer system.

FIG. 2A shows an aerial view of a motion mechanism. FIG. 2B shows an aerial view of a linear motion mechanism. FIG. 2C shows an aerial view of a rotational motion mechanism. FIG. 2D shows an aerial view of a rotational motion mechanism.

FIG. 5 shows an aerial view a transfer apparatus.

FIG. 6A shows an aerial view of an ingredient dispensing apparatus.

FIG. 17 shows an aerial view of a rotational motion mechanism

FIG. 18A shows an aerial view of a cooking container with a porous bottom. FIG. 18B shows an aerial view of a basket which may substitute the cooking container of FIG. 18A.

FIG. 19A shows an aerial view of a gripping mechanism.

FIG. 19B shows an aerial view a transfer apparatus comprising the gripping mechanism of FIG. 19A.

FIG. 28A is a flow chart showing the procedures performed by the computer system of the cooking system of FIG. 23 prior to cooking of a food. FIG. 28B is a flow chart showing the procedures performed by the computer system of the cooking system of FIG. 23 during the cooking of a food.

DETAILED DESCRIPTION OF THE INVENTION

Figure 2E:
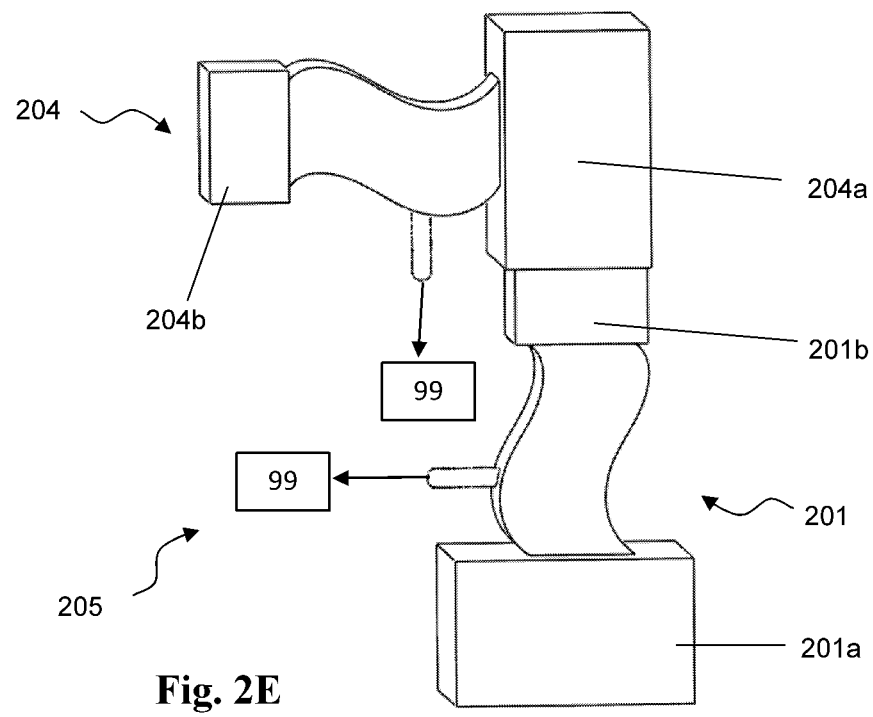
FIG. 2E shows an aerial view of a combination motion mechanism.

For the present patent application, a food ingredient refers to any of the foods or substances that are combined to make a particular food. A food ingredient can be raw or pre-cooked. A food ingredient can be solid, powder, liquid, or a mixture, etc. A food ingredient can be raw meat, sausage, fresh vegetable, dry vegetable, cooking oil, vinegar, soy source, water, or salt, etc.

For the present patent application, a computer system is meant to be any system or apparatus that includes one or more computers. A computer system may or may not include a database. A computer system may or may not include a network. A computer system may or may not include a memory shared by multiple computers. A computer system may include software. A single computer can be considered as a computer system.

For the present patent application, a shaft always comprises an axis. A shaft can have different shapes at different sections. A sectional shape of a shaft can be round or rectangular, or of other shapes. For the present patent application, a rotational movement refers to a rotational movement around an axis. A rotational mechanism refers to any mechanism comprising two mating parts which are constrained to rotate relative to each other. An example of rotational mechanism comprises a shaft and a bearing housing as mating parts, wherein the shaft and bearing housing are connected by bearings and accessories.

In some applications or embodiments, a motor comprises a base component (e.g., a frame) which is a stationary member of the motor, and a shaft which is a moving member of the motor, wherein a (usually rotational) motion of the shaft relative to the base component can be produced. A motor may be connected to a computer via wires, and/or through a driver, and/or a controller, and/or a relay, and/or a wireless communication device. The base component of a motor may be referred to as the support component of the motor.

Similarly, an encoder may comprise a base component, and a shaft which is rotatable relative to the base component, where the encoder can detect the degree of rotation of the shaft relative to the base component, and then inform a computer of the degree by sending signals to the computer.

Various parts of our cooking apparatuses and cooking systems are described below.

Referring to FIG. 1, a computer system 99 comprises a computer 992 with I/O ports 991. Via said I/O ports 991, said computer 992 may be connected to other electric or electronic devices including but not limited to: motors (including motors with controllers); actuators; inductive stoves; sensors; etc., so that the computer may communicate with said devices by known techniques. The communications can optionally be one way or two ways (to and from). For example, the signals of the electrical or electronic devices may be sent to the computer 992; the computer 992 may control the operations of the electrical or electronic devices by sending signals to the electrical or electronic devices. The connection of the computer 992 to said electric or electronic devices may comprise wires, wireless communication devices, controllers, drivers, and/or circuit boards. The computer system 99 comprises a memory. The computer system 99 may store data in the computer system's memory. The computer system 99 may control motors, actuators; stoves or heaters; and other devices by known techniques.

It should be noted that the computer system 99 may further comprise additional computers, a computer network, a database, computer programs, wireless communication ports, and/or other electric and electronic components.

A connection of said computer system 99 to an electric or electronic device may comprise a (wired or wireless) connection of a computer of said computer system to said device. Thus, a device is connected to said computer system 99 if said device is connected to a computer of said computer system.

Referring to FIG. 2A, a motion mechanism 201 comprises a stationary member 201a and a moving member 201b, which is connected (but not rigidly connected) to the stationary member. In many applications the movement of the moving member 201b is constrained relative to the stationary member 201a. The motion mechanism 201 comprises a driving mechanism (not shown in figure) configured to produce a motion of the moving member 201b relative to the stationary member 201a. The motion mechanism 201 may be connected to the computer system 99 of FIG. 1 via wires or by wireless means and the computer system 99 may be configured to control the timing and speed of the motion mechanism 201.

The motion mechanism 201 is a generic motion mechanism. Implicitly, the motion mechanism 201 includes a connection configured to connect the moving member to the stationary member, wherein said connection may often comprise bearings, sliders, kinematic pairs, and/or transmission mechanisms. The driving mechanism may be connected to the computer system 99 (via wires or by wireless means). The driving mechanism may be powered by electricity or other energy sources. A typical example of driving mechanism is a motor.

Referring to FIG. 2B, a linear motion mechanism 202 comprises a stationary member 202a and a moving member 202b, wherein the moving member 202b is constrained to move linearly relative to the stationary member 202a. The linear motion mechanism 202 comprises a driving mechanism (not shown in figure) configured to produce a linear motion of the moving member 202b relative to the stationary member 202a. The linear motion mechanism 202 may be connected to the computer system 99 of FIG. 1 via wires or by wireless means, and the computer system 99 may be configured to control the timing and speed of the linear motion mechanism 202.

The linear motion mechanism 202 is a generic one. Example of linear motion mechanism includes but are not limited to: a linear actuator; a mechanism comprising linear rail, a slider configured to slide linearly on the linear rail, and a driving mechanism configured to drive the linear motion of the slider; etc.

It should be noted that the linear motion mechanism 202 may comprise an electric (or pneumatic, hydraulic) putter, or other type of putter. The linear motion mechanism 202 may include a motor which produces a rotational motion and a transmission mechanism configured to convert a rotation into a linear motion; wherein the transmission mechanism may optionally comprise a pair of gear and rack, a pair of screw rod and nut, or a pair of sprocket and chain, etc.

A linear motion mechanism (such as the mechanism 202) is called a vertical motion mechanism if the direction of the linear motion is vertical. A linear motion mechanism (such as the mechanism 202) is called a horizontal linear motion mechanism if the direction of the linear motion is horizontal.

Referring to FIG. 2C, a rotational motion mechanism 203 comprises a stationary member 203a and a moving member 203b which is constrained to rotate relative to the stationary member 203a. The rotational motion mechanism 203 further comprises a driving mechanism (not shown in figure) configured to produce a rotation of the moving member 203b relative to the stationary member 203a around an axis, wherein the axis of the rotation is referred to as the axis of the rotational motion mechanism. The rotational motion mechanism 203 may be connected to the computer system 99 of FIG. 1 via wires or by wireless means, and the computer system 99 may be configured to control the timing and speed of the rotational motion mechanism 203.

Referring to FIG. 2D, a rotational motion mechanism 223 comprises: a bearing housing 223a as a stationary member; a shaft 223b as a moving member; and a motor 227 as a driving mechanism. The bearing housing 223a and the shaft 223b are connected by bearings 224 and accessories so that the shaft 223b is constrained to rotate relative to the bearing housing 223a. The motor 227 comprises a base component 227a and a shaft 227b so that the motor may produce a rotation of the shaft 227b relative to the base component 227a. The base component 227a of the motor is rigidly or fixedly connected to the bearing housing 223a via a connector 226, and the shaft 227b of the motor is connected to the shaft 223b by a coupling 225. It should be clear that the motor 227 may produce a rotation of the shaft 223b relative to the bearing housing 223a. The motor 227 is a driving mechanism of the rotational mechanism 223.

It should be noted that the rotation produced by a rotational motion mechanism may be a continuous rotation, an intermittent motion, or a rotation between two end-positions.

Referring to FIG. 2E, a motion mechanism 205 is a combination of two motion mechanisms 201 and 204, which may also be referred to as motion sub-mechanisms; wherein the motion mechanism 201 is as described as in FIG. 2A; wherein the motion mechanism 204 is a motion mechanism comprising a stationary member 204a, and a moving member 204b which is connected to the stationary member 204a, and a driving mechanism (not shown in figure) configured to produce a motion of the moving member 204b relative to the stationary member 204a. The moving member 201b of the motion mechanism 201 is fixedly or rigidly connected to the stationary member 204a of the motion mechanism 204, so the motion mechanism 201 can produce a motion of the stationary member 204a relative to the stationary member 201a of the motion mechanism 201. The combination motion mechanism 205 may be connected to the computer system 99 of FIG. 1 in the sense that the motion sub-mechanisms 201 and 204 are connected to the computer system 99 via wires or by wireless means, and the computer system 99 may be configured to control the motions produced by the motion sub-mechanisms of the combination motion mechanism 205.

The motion mechanism 205 is referred to as a combination motion mechanism. It should be noted that the motion sub-mechanisms 201 and 204 may produce motions simultaneously. This applies to any combination motion mechanism in the following. Combination motion mechanisms are special cases of motion mechanisms.

Figure 2F:
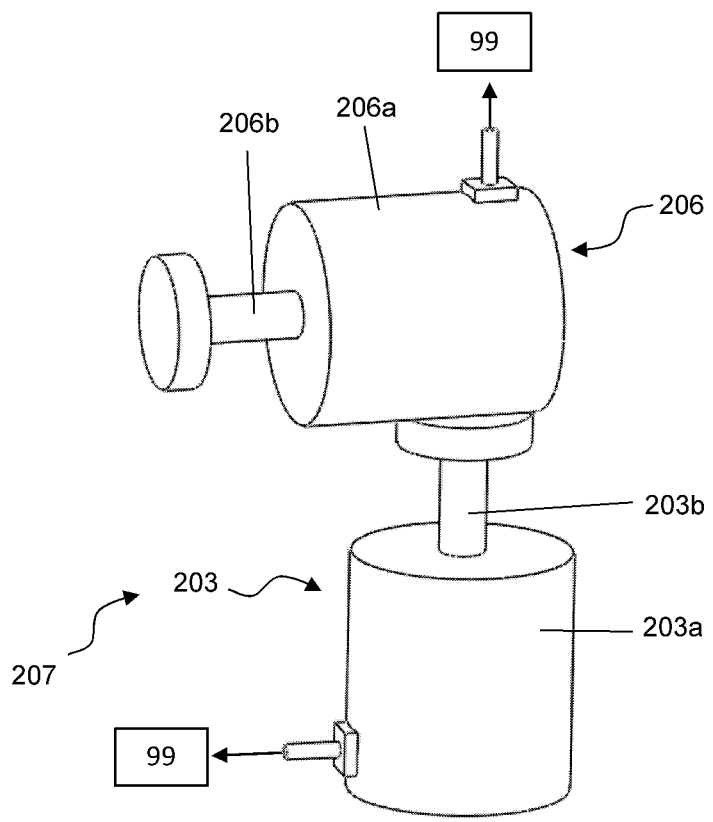
FIG. 2F shows an aerial view of a combination motion mechanism.

Referring to FIG. 2F, a combination motion mechanism 207 comprises rotational motion mechanisms 203 and 206, referred to as motion sub-mechanisms; wherein the motion mechanism 203 is described in FIG. 2C; wherein the motion mechanism 206 is a rotational motion mechanism comprising a stationary member 206a, and a moving member 206b which is constrained to rotate relative to the stationary member 206a, and a driving mechanism (not shown in figure) configured to produce a rotational motion of the moving member 206b relative to the stationary member 206a. The moving member 203b of the motion mechanism 203 is fixedly or rigidly connected to the stationary member 206a of the rotational motion mechanism 206, so the rotational motion mechanism 203 can produce a rotation of the stationary member 206a relative to the stationary member 203a around the axis of the rotational motion mechanism 203. The combination motion mechanisms 207 may be connected to the computer system 99 of FIG. 1 in the sense that the motion sub-mechanisms 203 and 206 are connected to the computer system 99 via wires or by wireless means, and the computer system 99 may be configured to control the motions produced by the motion sub-mechanisms of the combination motion mechanism 207.

Figure 2G:
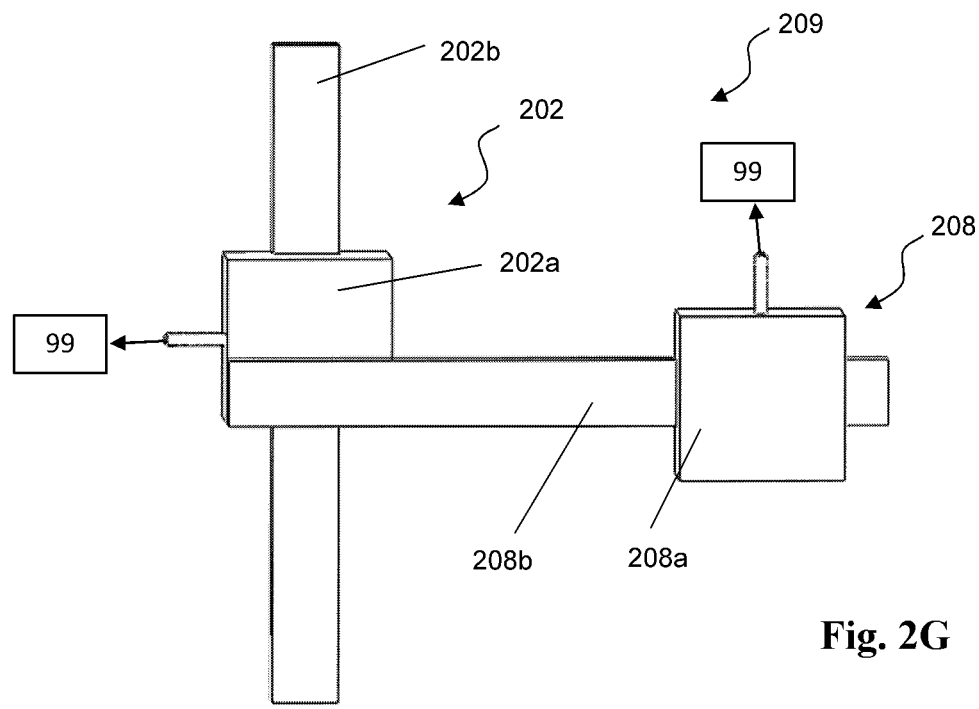
FIG. 2G shows an aerial view of a combination motion mechanism.

Referring to FIG. 2G, a combination motion mechanism 209 comprises two linear motion mechanisms 202 and 208, which may also be referred to as motion sub-mechanisms; wherein the motion mechanism 202 is described in FIG. 2B; wherein the motion mechanism 208 is a linear motion mechanism comprising a stationary member 208a, and a moving member 208b which is constrained to move linearly relative to the stationary member 208a, and a driving mechanism (not shown in figure) configured to produce a linear motion of the moving member 208b relative to the stationary member 208a. The moving member 208b of the linear motion mechanism 208 is rigidly or fixedly connected to the stationary member 202a of the linear motion mechanism 202, so the linear motion mechanism 208 can produce a linear motion of the stationary member 202a relative to the stationary member 208a. The combination motion mechanism 209 may be connected to the computer system 99 of FIG. 1 in the sense that the motion sub-mechanisms 202 and 208 are connected to the computer system 99 via wires or by wireless means, and the computer system 99 may be configured to control the motions produced by the motion sub-mechanisms of the combination motion mechanism 209.

Figure 2H:
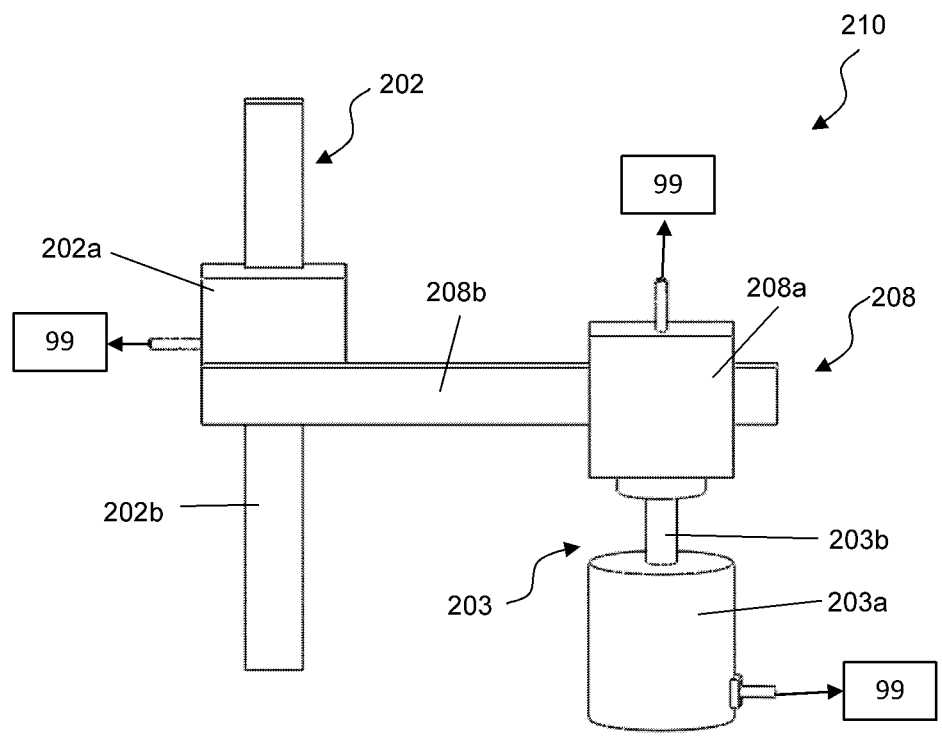
FIG. 2H shows an aerial view of a combination motion mechanism.

Referring to FIG. 2H, a combination motion mechanism 210 comprises a rotational motion mechanism 203 (as shown in FIG. 2C) and two linear motion mechanisms 202 (as shown in FIG. 2B) and 208 (as shown in FIG. 2G); wherein motion mechanisms 203, 202 and 208 are referred to as motion sub-mechanisms. The moving member 208b of the linear motion mechanism 208 is rigidly or fixedly connected to the stationary member 202a of the linear motion mechanism 202, so the linear motion mechanism 208 can produce a linear motion of the stationary member 202a relative to the stationary member 208a of the linear motion mechanism 208. The moving member 203b is fixedly connected to the stationary member 208a, so the rotational motion mechanism 203 can produce a rotation of the stationary member 208a relative to the stationary member 203a. The combination motion mechanisms 210 may be connected to the computer system 99 of FIG. 1 in the sense that the motion sub-mechanisms 202, 203 and 208 are connected to the computer system 99 via wires or by wireless means, and the computer system 99 may be configured to control the motions produced by the motion sub-mechanisms of the combination motion mechanism 210.

Figure 2I:
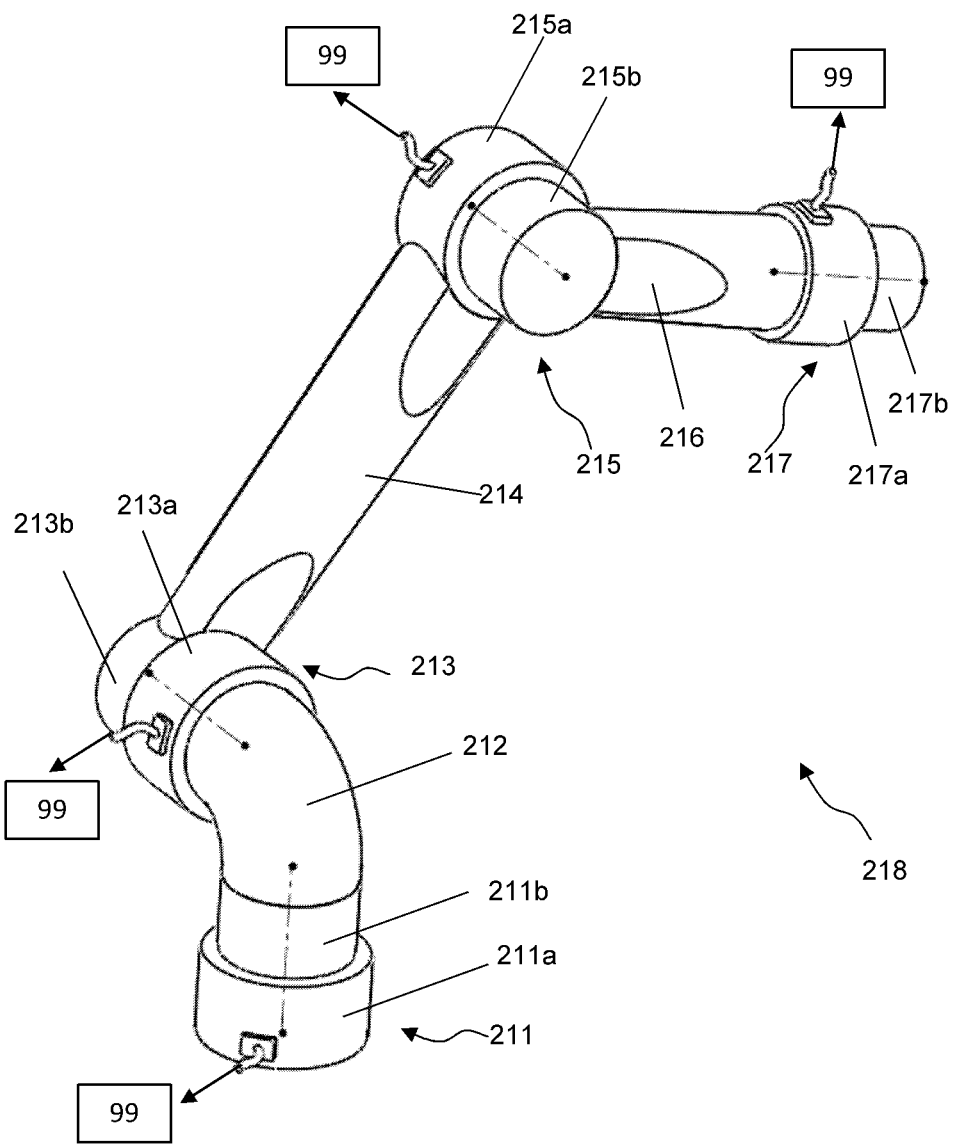
FIG. 2I shows an aerial view of a robot arm.

Referring to FIG. 2I, a robot arm 218 comprises a plurality of rotational motion mechanisms 211, 213, 215 and 217; wherein the motion mechanisms 211, 213, 215 and 217 are referred to as motion sub-mechanisms. The rotational motion mechanism 211, 213, 215 or 217 comprises: a stationary member 211a, 213a, 215a, or respectively 217a; a moving member 211b, 213b, 215b, or respectively 217b which is constrained to rotate relative to the respective stationary member; and a driving member comprising a motor (not shown in figure) configured to drive a rotation of the respective moving member relative to the respective stationary member around an axis. The moving member 211b of the rotational motion mechanism 211 is rigidly connected to the stationary member 213a of the rotational motion mechanism 213 via a connector 212; wherein the axis of the rotational motion mechanism 211 may optionally be perpendicular to the axis of the rotational motion mechanism 213. Thus, the motion mechanism 211 can produce a rotation of the stationary member 213a relative to the stationary member 211a. The moving member 213b of the rotational motion mechanism 213 is rigidly connected to the stationary member 215a of the rotational motion mechanism 215 via a rigid connector 214; wherein the axis of the rotational motion mechanism 213 may optionally be parallel to the axis of the rotational motion mechanism 215. The rotational motion mechanism 213 can produce a rotation of the stationary member 215a relative to the stationary member 213a. The moving member 215b of the rotational motion mechanism 215 is rigidly connected to the stationary member 217a of the rotational motion mechanism 217 via a connector 216; wherein the axis of the rotational motion mechanism 215 may optionally be perpendicular to the axis of the rotational motion mechanism 217, and the rotational motion mechanism 215 can produce a rotation of the stationary member 217a relative to the stationary member 215a. The robot arm 218 may be connected to the computer system 99 of FIG. 1 in the sense that the motion sub-mechanisms 211, 213, 215 and 217 are connected to the computer system 99 via wires or by wireless means, and the computer system 99 may be configured to control the motions produced by the motion sub-mechanisms of the robot arm 218.

The robot arm 218 is a combination motion mechanism which is a combination of the motion sub-mechanisms 211, 213, 215 and 217. Any robot arm of prior art may be used as a motion mechanism for our applications. Any motion mechanism of prior art may be used for our applications.

It should be possible to construct a combination motion mechanism from a rather arbitrary sequence of motion mechanisms, referred to as motion sub-mechanisms.

Figure 3:
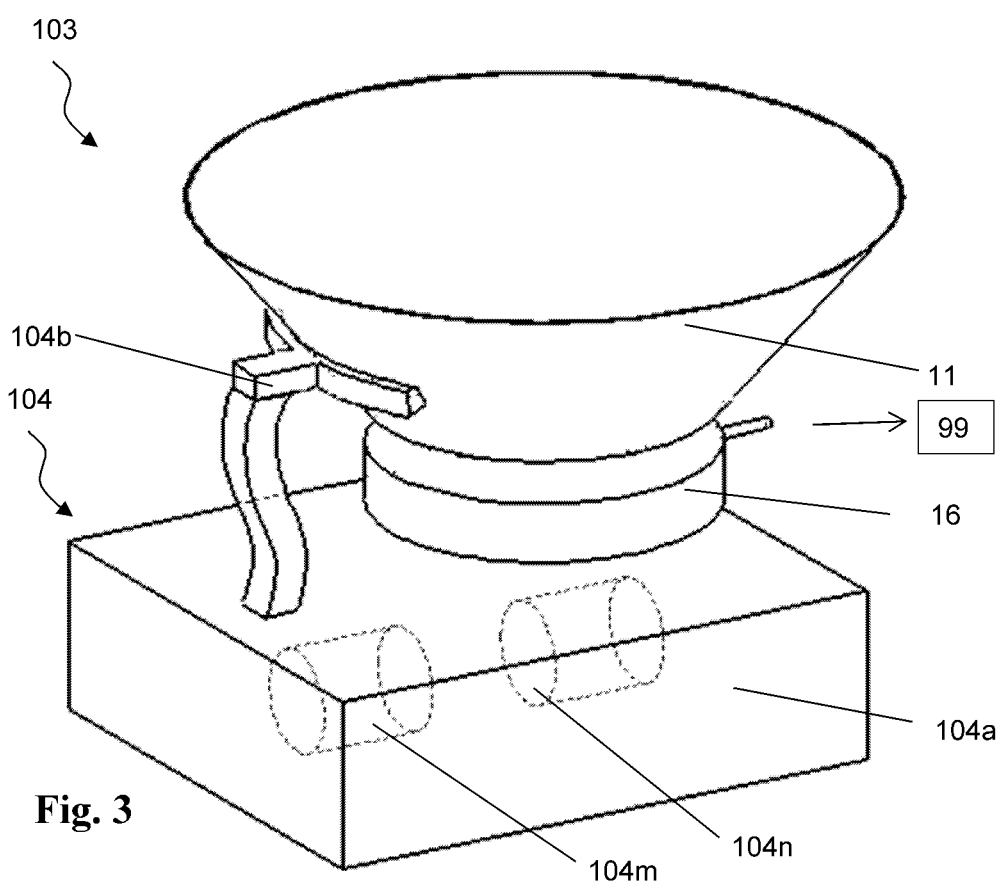
FIG. 3 shows an aerial view of parts of a cooking apparatus.

Referring to FIG. 3, a cooking apparatus 103 comprises: a cookware 11; a heater (such as inductive stove, gas burner, electric burner, etc.) 16; and a motion mechanism 104 comprising a stationary component 104a and a moving component 104b. The moving component 104b is rigidly, fixedly, or otherwise connected to the cookware 11 at least during time of operation. The heater 16 is configured to heat the cookware 11 and hence the food or food ingredients held in said cookware. The motion mechanism 104 may produce a motion of the cookware as to stir or mix the food or food ingredients in the cookware, using known techniques. The motion mechanism 104 may also be able to produce a motion (e.g. a rotation around a horizontal axis) of the cookware 11 to dispense a cooked food from the cookware 11, using know techniques. The motion mechanism 104 is driven by motors 104m and 104n, which are connected to the computer system 99 of FIG. 1 by wires or by wireless means.

As an example, the motion mechanism 104 may comprise a robot arm, wherein a moving part of the robot arm is connected to the cookware. The connection to the cookware may be temporary or permanent, depending on specific application.

It should be noted that the heater may optionally be fixedly connected to the cookware. See, e.g., U.S. patent application Ser. No. 15/801,923, the disclosures of which are hereby incorporated herein by reference in its entirety. In other applications, the heater may optionally be fixedly connected to the ground.

The motion mechanism 104 of the cooking apparatus 103 may be substituted by the stirring motion mechanism, the unloading motion mechanism (or unloading apparatus in the terms of some patent applications), the dispensing apparatus, or the combination of the above, as disclosed in U.S. patent application Ser. Nos. 16/997,196, 15/706,136, 15/801,923, 16/155,895, and 17/069,707. The entire contents of the applications are incorporated herein by reference.

Figure 4A:
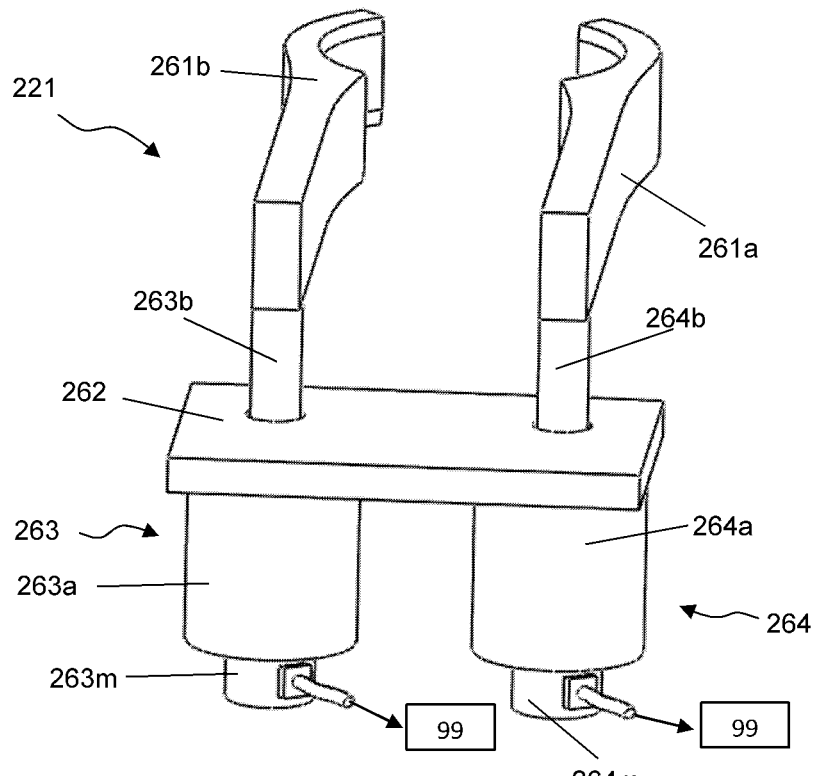
FIG. 4A shows an aerial view of a gripping mechanism.

Referring to FIG. 4A, a gripping mechanism 221 comprises: grippers 261a and 261b which can optionally be rigid or elastic components; rotational motion mechanisms 263 and 264. The rotational motion mechanism 263 comprises a stationary member 263a and a moving member 263b; and the rotational motion mechanism 263 is configured to produce a rotation of the moving member 263b relative to the stationary member 263a. The rotational motion mechanism 264 comprises a stationary member 264a and a moving member 264b; and the rotational motion mechanism 264 is configured to produce a rotation of the moving member 264b relative to the stationary member 264a. The stationary members 263a and 264a are fixedly connected to a support component 262. The gripper 261a is rigidly or fixedly connected to the moving member 264b. The rotational motion mechanism 264 can produce a rotation of the gripper 261a around the axis of the rotational motion mechanism 264 relative to the stationary member 264a. Similarly, the gripper 261b is rigidly or fixedly connected to the moving member 263b. The rotational motion mechanism 263 can produce a rotation of the gripper 261b around the axis of the rotational motion mechanism 263 relative to the stationary member 263a. As the gripper 261a or 261b is rigidly connected to the moving member 264b or respectively 263b, the rotational motion mechanism 264 or 263 can produce a rotation of the gripper 261a or respectively 261b. The axis of rotation of the rotational motion mechanism 264 is parallel to the axis of rotation of the rotational motion mechanism 263, and the rotational motion mechanisms 264 and 263 are configured to rotate the respective grippers 261a and 261b in opposite directions simultaneously. Thus, the grippers 261a and 261b can be rotated anti-synchronously around a pair of parallel axes. Each of the grippers 261a and 261b is rotated between a first end-position and a second end-position. At the first end-positions, the grippers 261a and 261b may together grip a container or other object. At the second end-positions, the grippers 261a and 261b can open and release the container or object. The motion mechanisms 263 or 264 is driven by a motor 263m or respectively 264m. The gripping mechanism 221 may be connected to the computer system 99 of FIG. 1 in the sense that the motors 263m and 264m are connected to the computer system 99 via wires or by wireless means, and the computer system 99 may be configured to control the motions of the grippers 261a and 261b produced by the motion mechanisms 263 and 264. Thus, the gripping mechanism 221 may be controlled by the computer system 99 to grip or loosen a container or other object.

Figure 4B:
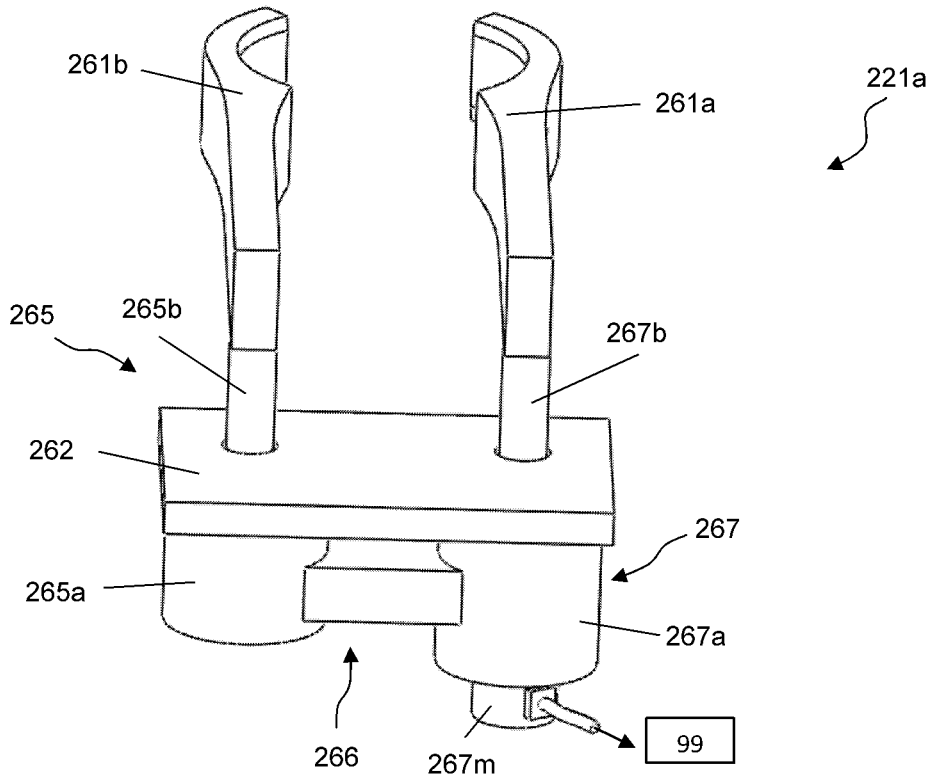
FIG. 4B shows an aerial view of a gripping mechanism.

Referring to FIG. 4B, a gripping mechanism 221a comprises: grippers 261a and 261b which are optionally rigid or elastic components; a rotational motion mechanism 267 comprising a stationary member 267a and a moving member (a shaft) 267b; a rotational mechanism 265 comprising a first mating part 265a and a second mating part (a shaft) 265b which is constrained to rotate relative to the first mating part 265a. The rotational motion mechanism 267 is configured to produce a rotational motion of the moving member 267b relative to the stationary member 267b. The stationary members 267a and the first mating part 265a are rigidly or fixedly connected to a support component 262. The gripper 261a is rigidly or fixedly connected to the moving member 267b. The gripper 261b is rigidly or fixedly connected to the second mating part (a shaft) 265b. The axis of rotation of the rotational motion mechanism 267 and the axis of the rotational mechanism 265 are configured to be parallel to each other. A transmission mechanism 266 is configured to connect the rotational motion mechanism 267 and the rotational mechanism 265, so that a rotation of the shaft 267b relative to the stationary member 267a is transmitted to an anti-synchronous rotation of the shaft 265b. Thus, the grippers 261a and 261b can be rotated anti-synchronously around a pair of parallel axes. Each of the grippers 261a and 261b is rotated between a first end-position and a second end-position. At the first end-positions, the grippers 261a and 261b may together grip a container or other object. At the second end-positions, the grippers 261a and 261b can open and release the container or object. The motion mechanism 267 is driven by a motor 267m. The gripping mechanism 221a may be connected to the computer system 99 of FIG. 1 in the sense that the motor 267m is connected to the computer system 99 via wires or by wireless means, and the computer system 99 may be configured to control the motions of the grippers 261a and 261b produced by the motion mechanism 267. Thus, the gripping mechanism 221a may be controlled by the computer system 99 to grip or loosen a container or other object.

For examples of gripping mechanism 221a described above, see FIGS. 39A-39B ("gripping mechanism 701"), or FIGS. 47A-47C ("gripping mechanism 905"), of U.S. patent application Ser. No. 16/517,705. The entire content of the US patent application is hereby incorporated herein by reference.

Figure 4C:
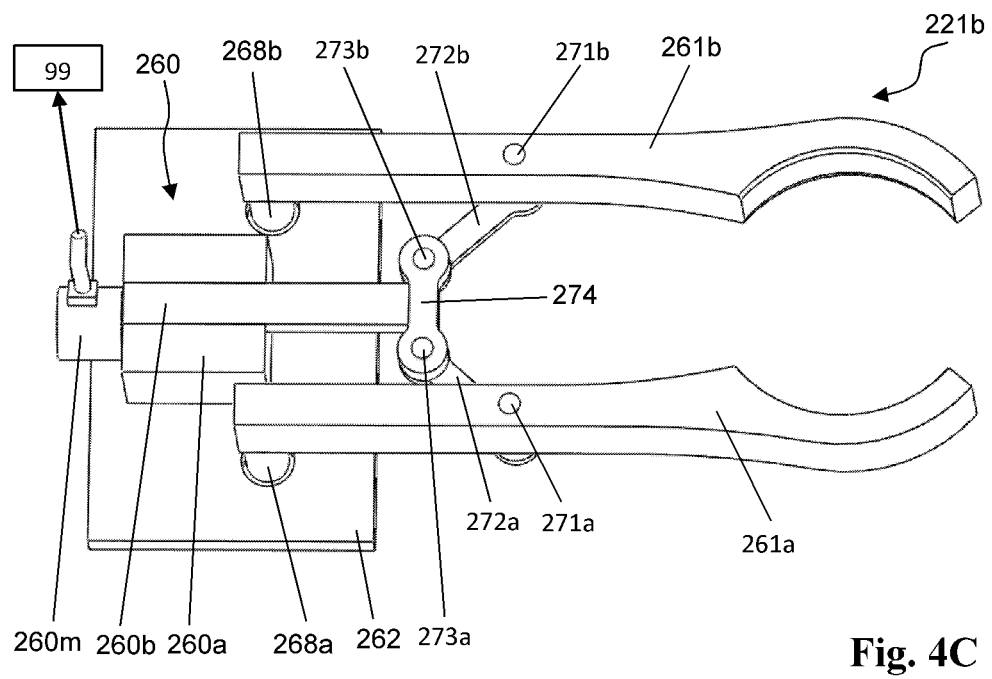
FIG. 4C shows an aerial view of a gripping mechanism.

Referring to FIG. 4C, a gripping mechanism 221b comprises: a support component 262 which is a rigid component; grippers 261a and 261b; a linear motion mechanism 260; a rigid component 274; shafts 273a and 273b; links 272a and 272b; shafts 271a and 271b. The linear motion mechanism 260 comprises a stationary member 260a and a moving member 260b which is constrained to move linearly (along a horizontal direction) relative to the stationary member 260a. A pair of shafts 268a and 268b are constrained to rotate relative to the support component 262 respectively around a pair of vertical axes. The shaft 273a (or respectively 273b) connects the link 272a (or respectively 272b) to the rigid component 274 so that the link 272a (or respectively 272b) is constrained to rotate relative to the rigid component 274 around the axis of the shaft 273a (or respectively 273b). The shaft 271a (or 271b) connects the link 272a (or respectively 272b) to the gripper 261a (or respectively 261b) so that the gripper 261a (or respectively 261b) is rotatable relative to the link 272a (or respectively 272b). The gripper 261a (or 261b) is rigidly or fixedly connected to the shaft 268a (or respectively 268b). Thus, the gripper 261a (or respectively 261b) is constrained to rotate relative to the support component 262 around the axis of the shaft 268a (or respectively 268b). The parts 268a, 271a, 272a, and 273a are mirror images of the parts 268b, 271b, 272b, and 273b about a vertical plane which is parallel to the direction of the linear motion of the moving member 260b relative to the stationary member 260a; wherein said stationary member 260a is rigidly or fixedly connected to the support component 262. The rigid component 274 is rigidly or fixedly connected to the moving member 260b. Thus, the linear motion mechanism 260 may produce a horizontal motion of the rigid component 274 and hence anti-synchronous rotations in the grippers 261a and 261b. Each of the grippers 261a and 261b is rotated between a first end-position and a second end-position. At the first end-positions, the grippers 261a and 261b may together grip a container or other object. At the second end-positions, the grippers 261a and 261b can open and release the container or object. The motion mechanism 260 is driven by a motor 260m. The gripping mechanism 221b may be connected to the computer system 99 of FIG. 1 in the sense that the motor 260m is connected to the computer system 99 via wires or by wireless means, and the computer system 99 may be configured to control the motions of the grippers 261a and 261b produced by the motion mechanism 260. Thus, the gripping mechanism 221b may be controlled by the computer system 99 to grip or loosen a container or other object.

A gripping mechanism may also be referred to as a gripper mechanism.

Figure 4D:
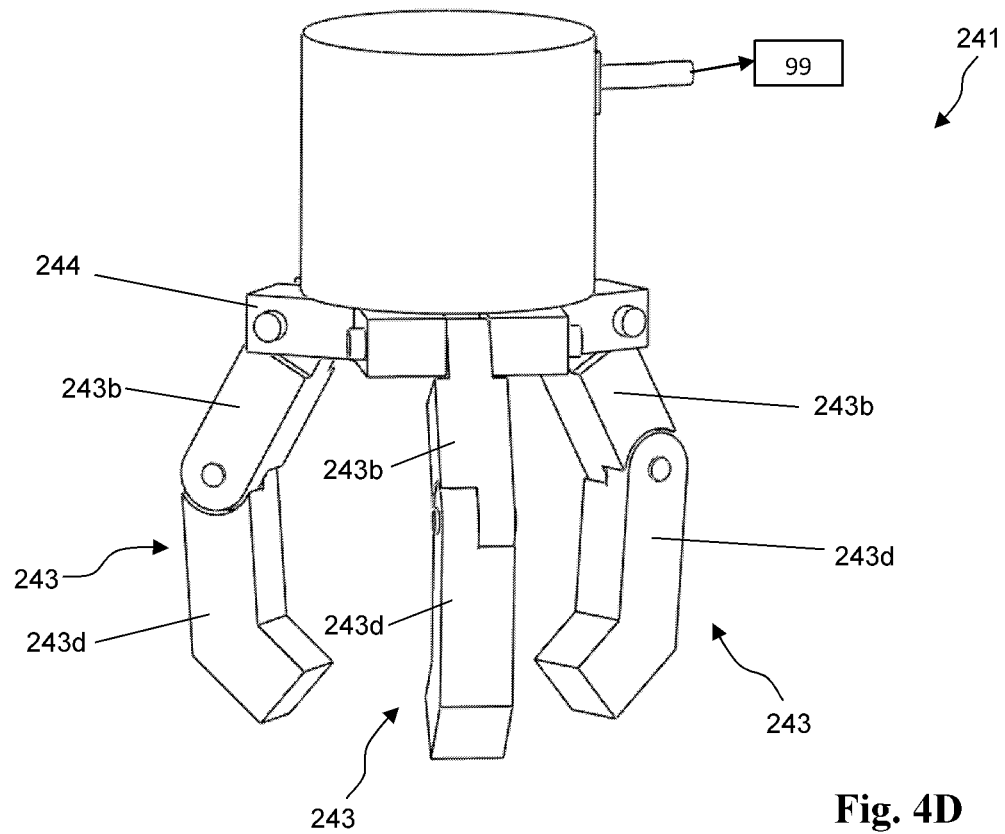
FIG. 4D shows an aerial view of a gripping mechanism.

Referring to FIG. 4D, a gripping mechanism 241 comprises a support component (or base component) 244 and a plurality of gripper sub-mechanisms 243 which are referred to as robotic fingers. Each gripper sub-mechanism 243 comprises: grippers 243d and 243b wherein the gripper 243d is rotatable relative to the gripper 243b and the gripper 243b is rotatable relative to the support component 244; a motion mechanism comprising a motor (hidden in Figure) which drives a rotation of the gripper 243d relative to the gripper 243b; a motion mechanism comprising a motor (hidden in figure) which drives a rotation of the gripper 243b relative to the support component 244. (It should be noted that an optional transmission mechanism may be used to link the rotation of the grippers 243d and 243b and then only one motor is needed to drive the rotations of both grippers). The gripping mechanism 241 may be connected to the computer system 99 of FIG. 1 in the sense that all motors are connected to the computer system 99 via wires or by wireless means, and the computer system 99 may be configured to control the motions produced by the motors in the gripping mechanism 241. The gripping mechanism 241 may be controlled by the computer system 99 to grip or loosen a container or other object.

Figure 4E:
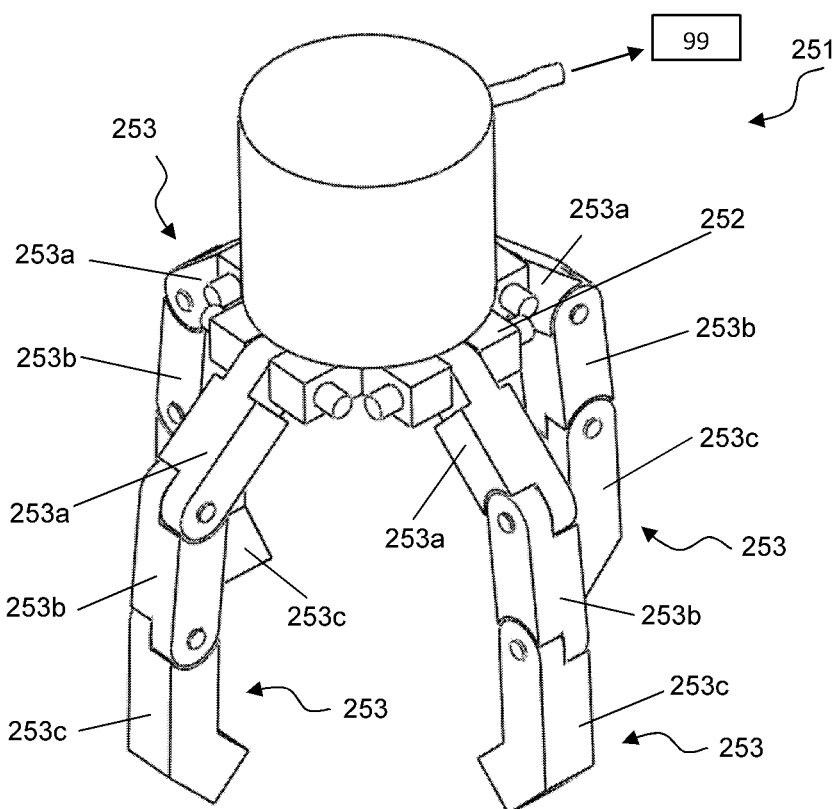
FIG. 4E shows an aerial view of a gripping mechanism

Referring to FIG. 4E, a gripping mechanism 251 comprises: a support component (or base component) 252 and a plurality of gripper sub-mechanisms 253 which are referred to as robotic fingers. Each gripper sub-mechanism 253 comprises: grippers 253a, 253b and 253c, wherein the gripper 253c is rotatable relative to the gripper 253b, the gripper 253b is rotatable relative to the gripper 253a, and the gripper 253a is rotatable relative to the support component 252; a motion mechanism comprising a motor (hidden in Figure) which drives a rotation of the gripper 253c relative to the gripper 253b; a motion mechanism comprising a motor (hidden in Figure) which drives a rotation of the gripper 253b relative to the gripper 253a; a motion mechanism comprising a motor (hidden in figure) which drives a rotation of the gripper 253a relative to the support component 252. (It should be noted that an optional transmission mechanism may be used to link the rotation of the grippers 253a, 253b and 253c and then only one motor is needed to drive the rotations of the grippers). The gripping mechanism 251 may be connected to the computer system 99 of FIG. 1 in the sense that all motors are connected to the computer system 99 via wires or by wireless means, and the computer system 99 may be configured to control the motions produced by the motors in the gripping mechanism 251. The gripping mechanism 251 may be controlled by the computer system 99 to grip or loosen a container or other object.

The gripping mechanisms 241 (FIG. 4D) and 251 (FIG. 4E) are commonly referred to as robot hands. The gripper sub-mechanisms 243 and 253 are referred to as robot fingers. In fact, any robot hand may be used as a gripping mechanism for our purposes here. Robot hands may also be referred to as robot end effectors. Similarly, any robot arm may be used as a motion mechanism for our purpose.

Figure 4F:
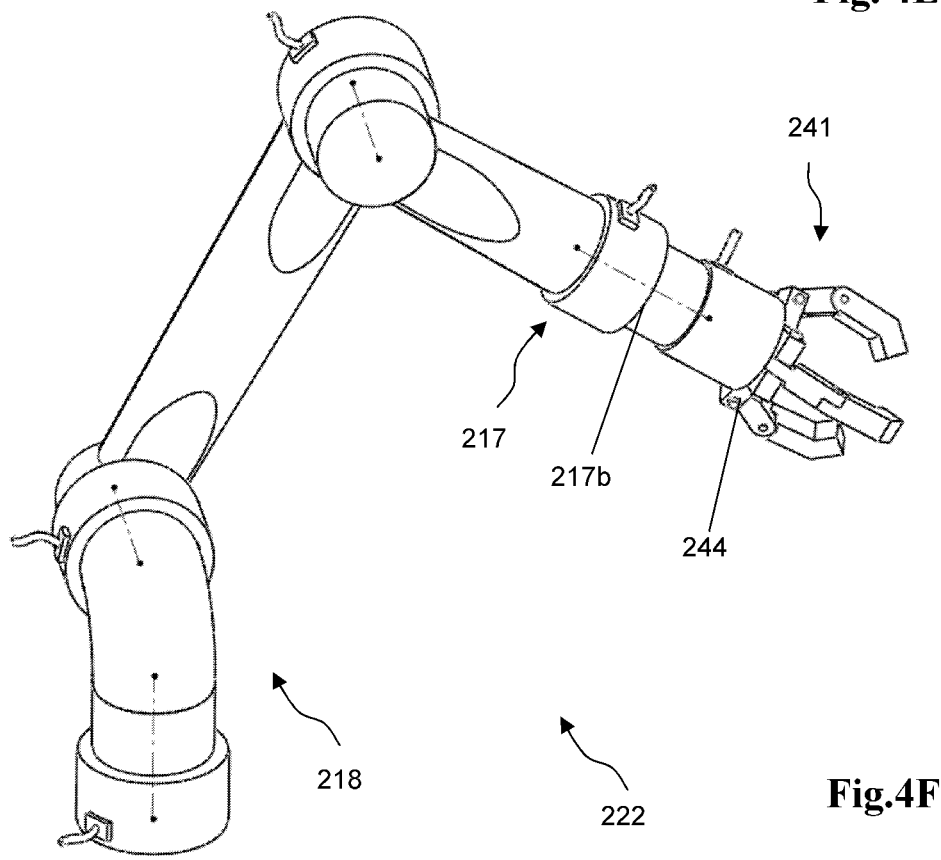
FIG. 4F shows an aerial view of a robotic apparatus.

Referring to FIG. 4F, a robotic apparatus 222 comprises a robot arm 218 and a gripping mechanism 241. The gripping mechanism 241 is configured to grip or loosen a container or other object. The support component 244 of the gripping mechanism 241 is fixedly connected to the moving member 217b of the rotational motion mechanism 217 of the robot arm 218, so the robot arm can move the gripping mechanism 241. When the gripping mechanism 241 grips a container or other object, the robotic apparatus 222 can transfer the container or object to another position. The robot arm 218 and the gripping mechanism 241 may be connected to the computer system 99 of FIG. 1 via wires or by wireless means, and the computer system 99 may be configured to control the motions produced the motion mechanism in the robotic apparatus 222. The robotic apparatus 222 may be controlled by the computer system 99 to grip a container or other object, and then move the container or object, and then release the container or object at a different position. The robotic apparatus 222 may substitute a transfer apparatus to grip and move a container or other object. The robotic apparatus 222 may also substitute a dispensing apparatus to grip and move a container as to dispense food or food ingredients from the container.

It should be noted that the gripping mechanism 241 of the robotic apparatus 222 may be substituted by the gripping mechanism 221a (or 221b) or other gripping mechanism.

It should be noted that the gripping mechanisms 221, 221a, 221b, 241 and 251 are some realizations of gripping mechanisms. They may be substituted by other types of gripping mechanism such as electric gripper, pneumatic gripper, etc.

Referring to FIG. 5, a transfer apparatus 650 comprises a gripping mechanism 607 comprising: a rigid component 672 referred to as a support component; grippers 671a and 671b which can optionally be rigid or elastic components; shafts 674a and 674b; motors 673a and 673b. Each of the motors 673a and 673b comprises a base component which is fixedly connected to the rigid component 672. The gripper 671a is rigidly of fixedly connected to the shaft 674a. The motor 673a can produce a rotation of the shaft 674a and hence of the gripper 671a around the axis of the shaft 674a relative to the rigid component 672. Similarly, the gripper 671b is rigidly or fixedly connected to the shaft 674b. The motor 673b can produce a rotation of the shaft 674b and hence of the gripper 671b around the axis of the shaft 674b relative to the rigid component 672. The motors 673a and 673b are configured to rotate the respective grippers 671a and 671b anti-synchronously around a pair of parallel axes. The gripper 671a or 671b is rotated between two end-positions. At some first end-positions, the grippers 671a and 671b may grip a food container 182 under the condition that the food container is placed in a certain position relative to the rigid component 672. At some second end-positions, the grippers 671a and 671b can let loose and release the food container 182.

The transfer apparatus 650 further comprises a motion mechanism 650a comprising: a vertical motion mechanism 708 and a rotational motion mechanism 609. Said vertical motion mechanism 708 comprises a stationary member 675; a moving member 669. Said rotational motion mechanism 609 comprises: a shaft 677 referred to as a moving member; and a motor 679. The rigid component 672 of the gripping mechanism 607 is rigidly, fixedly, or otherwise connected to the moving member 669, so that the vertical motion mechanism 708 is configured to produce a vertical motion of the moving member 669 and the rigid component 672 between two end-positions. A connector 676 rigidly, fixedly, or otherwise connects the shaft 677 and the stationary member 675. The motor 679 comprises a base component which is fixedly connected to the ground via a connector 678. The motor 679 can produce a rotation of both the shaft 677 and the connector 676 between two end-positions. The transfer apparatus 650 is configured to grip a food container 190 and transfer it combination of vertical motion, and rotational motion to another position. The motors 673a, 673b, and 679 are all connected to the computer system 99 of FIG. 1, so that the computer system 99 may control timings and speeds of their produced motions. The vertical motion mechanism 708 is driven by a motor 675m, which is connected to the computer system 99 by wires or by wireless means. The connector 678 may be referred to as the support component of the transfer apparatus 650.

Referring to FIG. 6A, a dispensing apparatus 301 comprises a gripping mechanism 311 comprising: a rigid component 345 referred to as a support component; grippers 341a and 341b which can optionally be rigid or elastic components; shafts 343a and 343b; motors 344a and 344b. Each of the motors 344a and 344b comprises a base component which is fixedly connected to the rigid component 345. The gripper 341a is rigidly of fixedly connected to the shaft 343a. The motor 344a is configured to produce a rotation of the shaft 343a and hence of the gripper 341a around the axis of the shaft 343a relative to the rigid component 345. Similarly, the gripper 341b is rigidly or fixedly connected to the shaft 343b. The motor 344b is configured to produce a rotation of the shaft 343b and hence of the gripper 341b around the axis of the shaft 343b relative to the rigid component 345. The shafts 343a and 343b have parallel axes, and the motors 344a and 344b are configured to rotate the respective grippers 341a and 341b anti-synchronously around said parallel axes. The gripper 341a or 341b is rotated between two end-positions. At some first end-positions, the grippers 341a and 341b are configured to work together to grip an ingredient container 81 under the condition that the ingredient container is placed in a certain position relative to the rigid component 345; wherein the ingredient container 81 is configured to hold food ingredients. The ingredient container is not part of the ingredient dispensing apparatus 301.

The ingredient dispensing apparatus 301 further comprises a motion mechanism 312 comprising: a shaft 347; a rigid connector 349; and a motor 348. The shaft 347 comprises a horizontal axis; and said axis is perpendicular to the axes of the shafts 343a and 343b, although these are not strict requirements. The motor 348 comprises a base component which is fixedly connected to the ground by the rigid connector 349. The motor 348 is configured to produce a rotation of the shaft 347, between two end-positions, around the axis of the shaft 347. The rigid connector 349 is referred to as the support component of the ingredient dispensing apparatus 301.

The shaft 347 is rigidly, fixedly, or otherwise connected to the rigid component 345 of the gripping mechanism 311, the motor 348 can produce a rotation of the rigid component 345 between two end-positions. At a first end-position of the rigid component 345 in the rotation, the axes of the shaft 343a and 343b are vertical and the grippers 341a and 341b, when rotated to their first end-positions relative to the rigid component 345, are configured to grip an ingredient container, in an upright position, which contains food ingredients, under the condition that the ingredient container is at a certain position relative to the support component 349. Said position of the ingredient container is referred to as the dispensing position relative to the support component 349. Then, the rigid component 345 is rotated to the second end-position while the ingredient container is gripped by the grippers 341a and 341b, so that the ingredient container is turned by an angle as to dispense the food ingredients into a cookware. Virtually entire contents of the ingredient container are dispensed by the turning of the ingredient container. The angular degree between the first end-position and the second end-position in the rotation of the rigid component 345 is usually between 90 degrees and 180 degrees. The motors 344a, 344b and 348 are connected to the computer system 99 of FIG. 1 via wires, so that the computer system 99 may control the timing and speed of the motors.

Figure 6B:
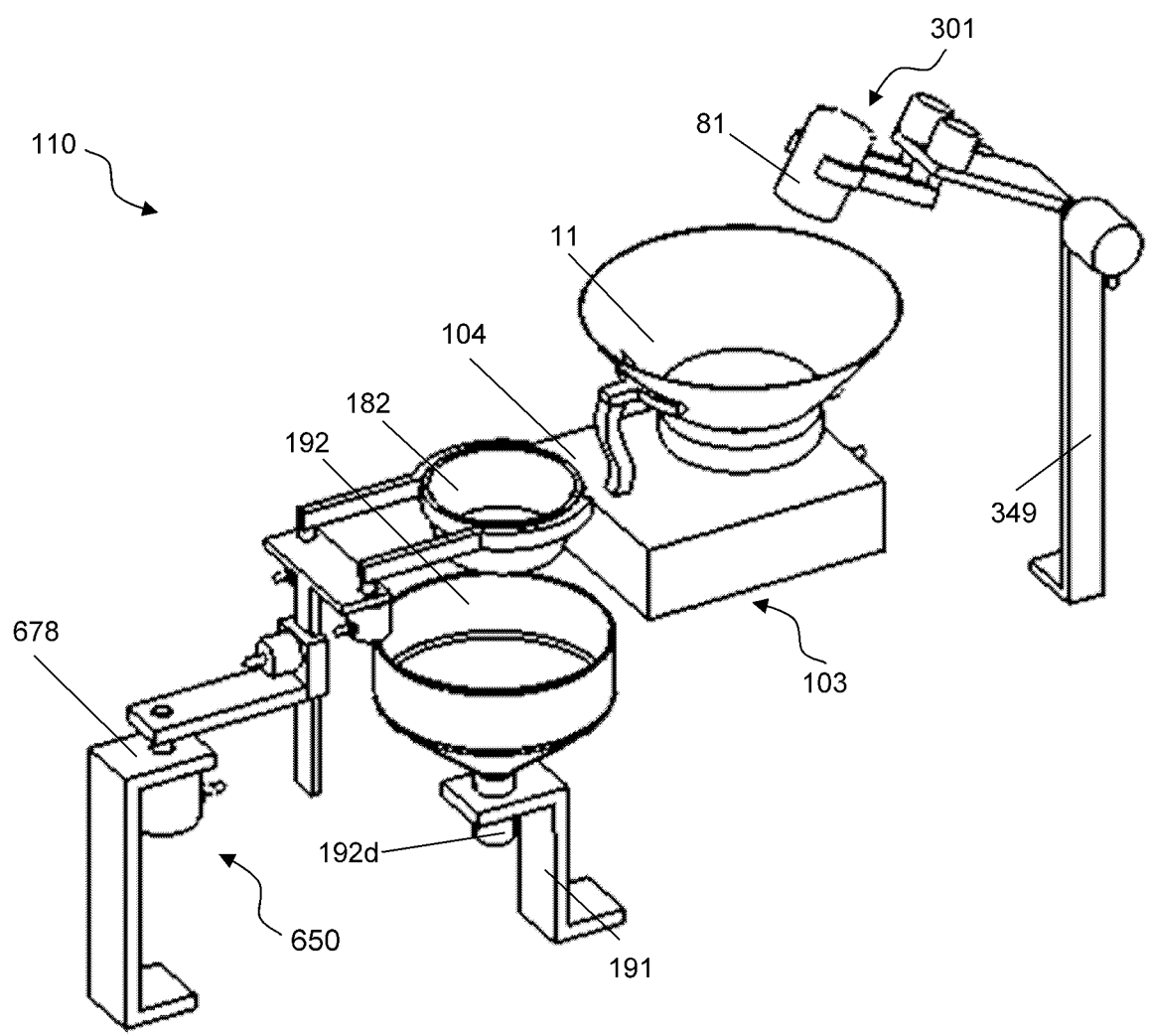
FIGS. 6B-6C show aerial views of a cooking apparatus comprising the cooking apparatus of FIG. 3, the transfer apparatus of FIG. 5 and the ingredient dispensing apparatus of FIG. 6A.
Figure 6C:
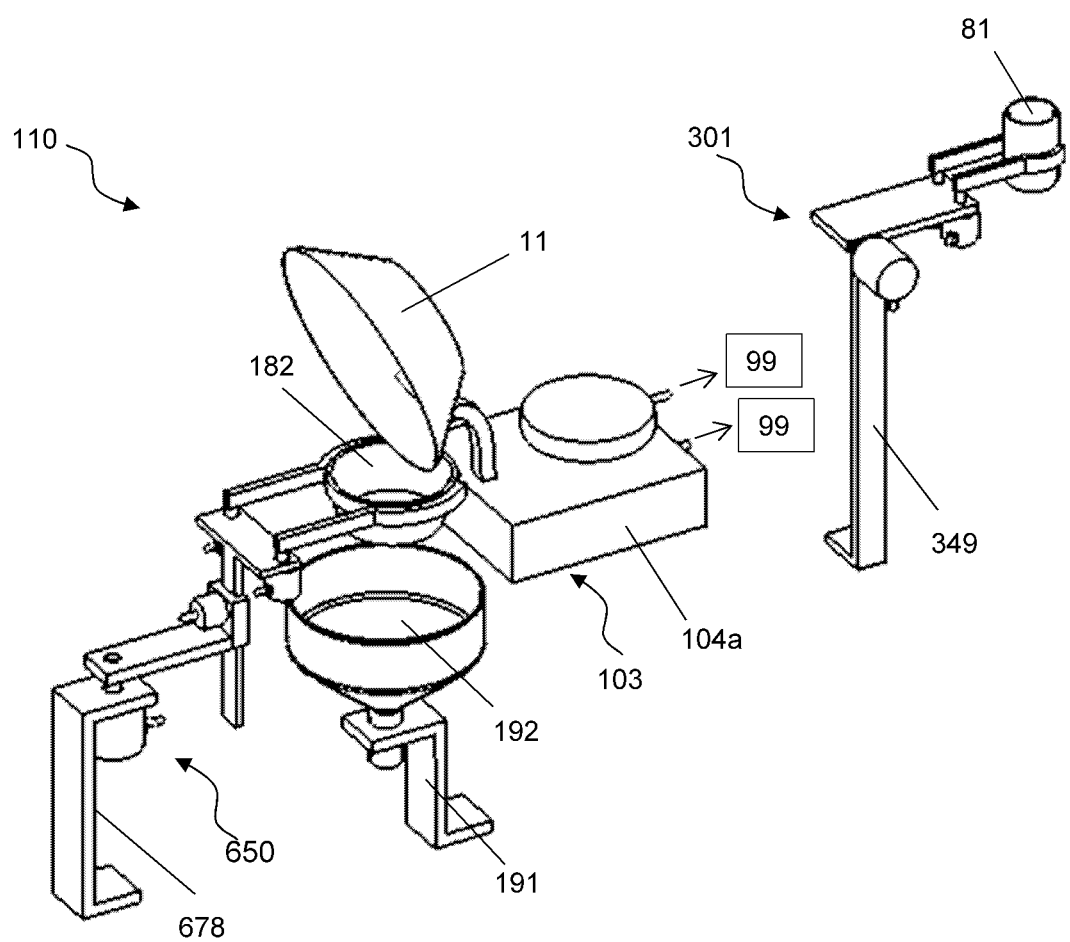

Referring to FIGS. 6B-6C, a cooking apparatus 110 (to be referred to as a first cooking apparatus) comprises: a cooking apparatus 103 (as in FIG. 3); a transfer apparatus 650 (as in FIG. 5); a sink 192; a garbage disposal 192d connected to the sink wherein the garbage disposal is below the sink; and a dispensing apparatus 301 (as in FIG. 6A). The sink 192 and the garbage disposal 192d are fixedly connected to the ground via a connector 191. A liquid pipe (not shown in figures) connects an exit of the garbage disposal 192d to a sewage (or a storage tank of wastewater). The positions of the support component 678 of the transfer apparatus 650, the connector 191, the support component of the cooking apparatus 103 and the support component 349 of the dispensing apparatus 301 are fixed relative to each other. When the rigid component 345 of the ingredient dispensing apparatus 301 is rotated to the second end-position, the food ingredients in the ingredient container 81 gripped by the ingredient dispensing apparatus 301 can be dispensed into the cookware 11 of the cooking apparatus 103 (see FIG. 6B). When a food container 182 gripped by the gripping mechanism 607 is moved by the motion mechanisms 708 and 609 to a receiving position relative to the support component of the cooking apparatus 103, the cookware 11 can be rotated to a certain "dispensing position" by the motion mechanism 104 of the cooking apparatus 103, a cooked food held in the cookware 11 can be dispensed into the food container 182 (optionally through a funnel) (see FIG. 6C). When the food container 182 gripped by the gripping mechanism 607 is moved away from the receiving position, in case the cookware 11 contains wastewater (say, from a cleaning after a dish is cooked), the cookware 11 of the cooking apparatus 103 can be rotated to the dispensing position by the motion mechanism 104, as to dispense the wastewater held in the cookware 11 into the sink 192.

Figure 7A:
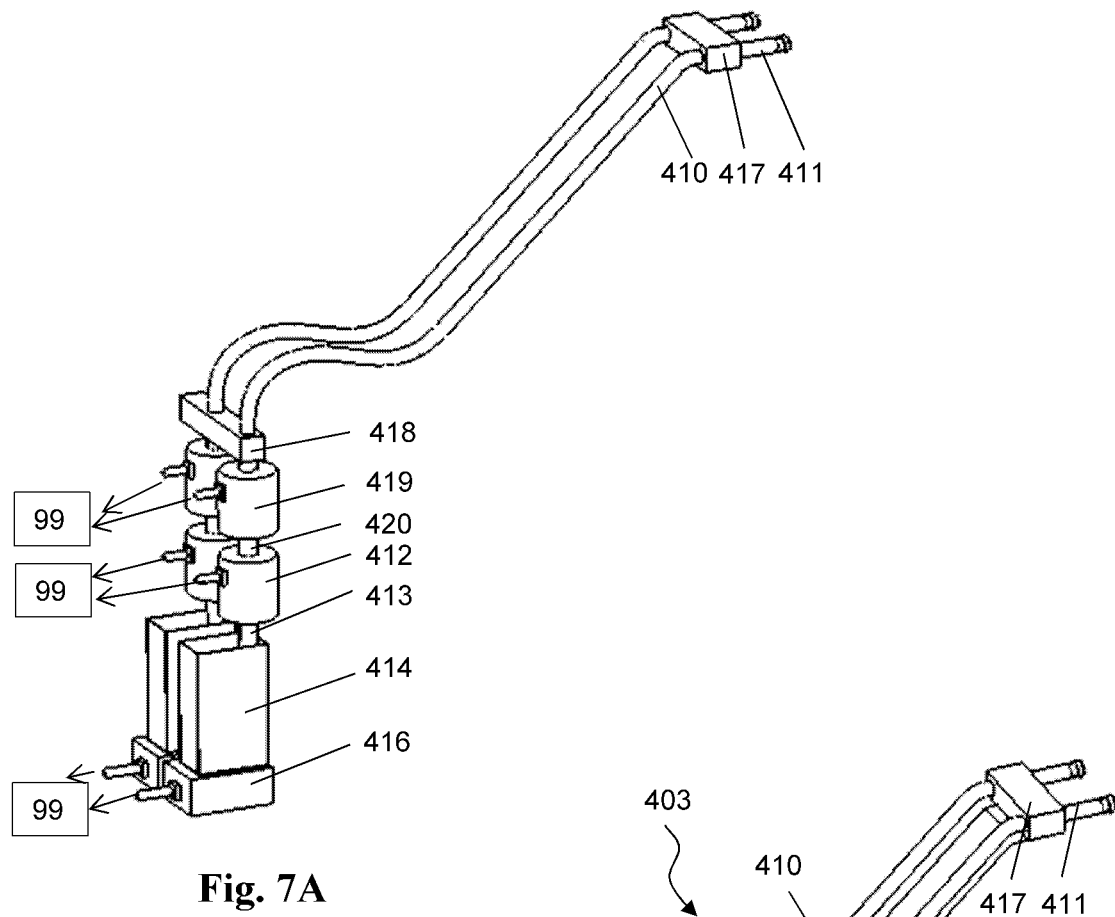
FIG. 7A shows an aerial view of parts a liquid dispensing mechanism.
Figure 7B:
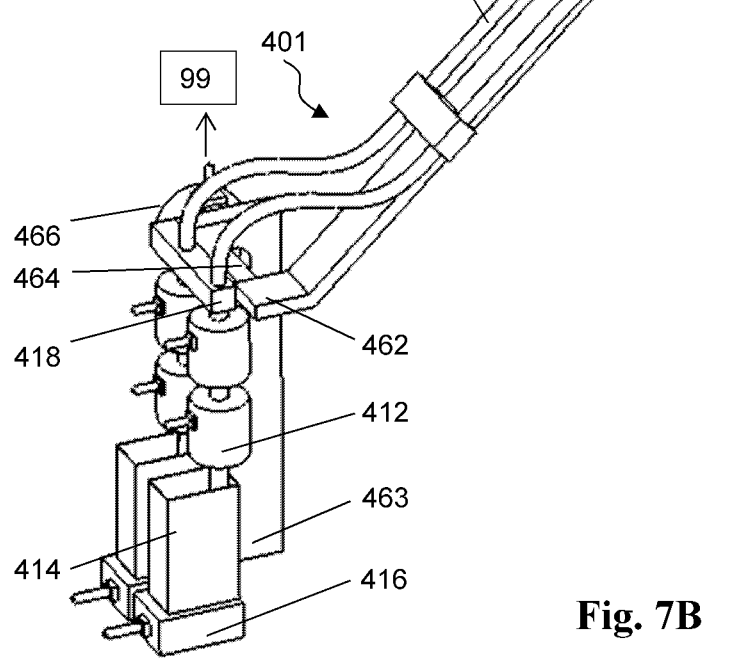
FIG. 7B shows an aerial view of the liquid dispensing apparatus.

Referring to FIGS. 7A-7B, a liquid dispensing mechanism 403 comprises a rotational motion mechanism comprising: a shaft 464 comprising a horizontal axis; a support component 463 which is attached to the ground; and a motor 466. A rotatable component 462 is rigidly or fixedly connected to the shaft 464 and to the connector 417. The shaft 464 is constrained to rotate relative to the support component 464. The motor 466 comprises a base component which is fixedly connected to the support component 463. The motor 466 is configured to produce a motion of the shaft 464 and hence of the rotatable component 462, between two end-positions, around the axis of the shaft 464. The motor 466 can produce a rotation of the connectors 462 and 417 between two end-positions (relative to the ground). The motor 466 is connected to the computer system 99 of FIG. 1 via wires, so that the computer system 99 may control the timing and speed of the motor 466.

The liquid dispensing mechanism 403 further comprises: a plurality of liquid pipes 411, 413 and 420; a plurality of flexible pipes 410; a plurality of flowmeters 419; a plurality of liquid pumps 412; a plurality of electronic scales 416; a plurality of liquid containers 414. Each liquid container 414 is configured to contain a liquid ingredient, e.g., cooking oil, vinegar, soy sauce, or water, etc. Each liquid pipe 411 is connected to a flexible pipe 410. Each flowmeter 419 is connected to a pair of pipes 420 and 410. Each pump 412 is connected to a pair of pipes 420 and 413; and said pipe 413 is inserted into a corresponding liquid container 414, so that the pump can pump liquid from the liquid container and the flowmeter can measure the flow of the corresponding pipes. Each container 414 is positioned on an electronic scale 416 which is connected to the computer system 99, so that the electronic scale 416 can weigh the corresponding container 414. Connectors 417 and 418 are configured to fixedly connect the pipes 410 to improve stability of the pipes. The pumps 412, flowmeters 419, and electronic scales 416 are connected by wired or wireless means to the computer system 99, so that the computer system may control the timing and amount of liquid to be drawn from the corresponding liquid container. The connector 416 fixedly connects the pipes 411 to improve rigidity or stability of the pipes. The rotatable component 462 is fixedly connected to the connector 417. The pipes 410 are attached to the rotatable component 462. The connector 418 is fixedly connected to the rigid component 463.

It should be noted that the electronic scales 416 may be substituted by other types of scale, such as electronic balances.

It should be noted the flowmeters 419, the liquid pumps 412, the electronic scale 416 may be fixedly connected to the ground.

Figure 8A:
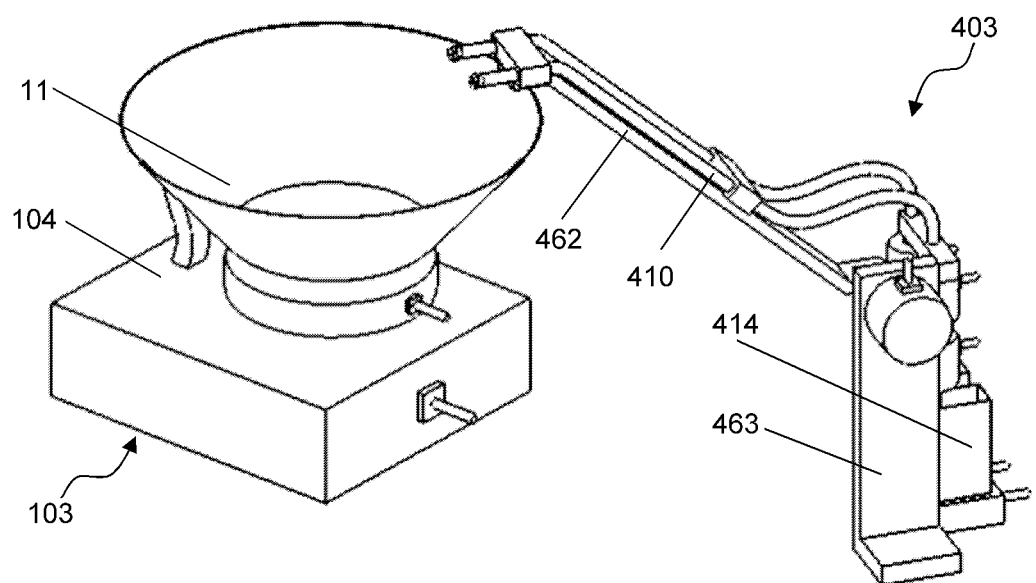
FIGS. 8A-8B show aerial views of the relative positions of the cooking apparatus of FIG. 3 and the liquid dispensing apparatus.
Figure 8B:
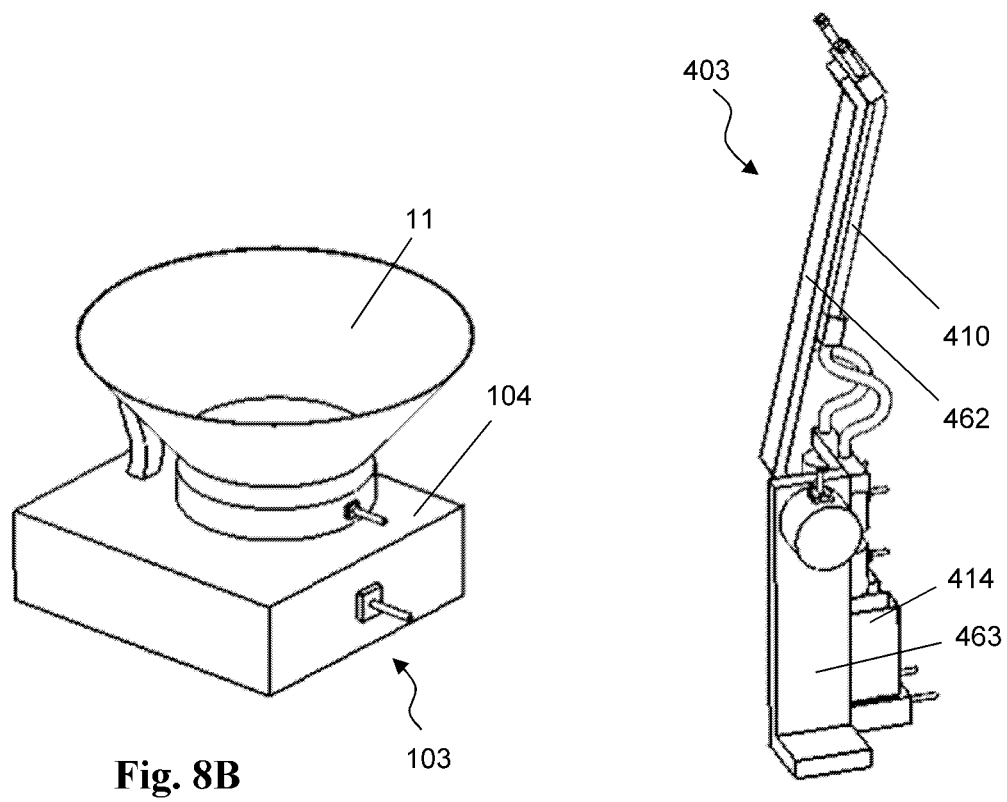

FIGS. 8A-8B show two end-positions of the rotatable component 462 of the liquid dispensing mechanism 403 relative to the cookware 11 of a cooking apparatus 103. At a first end-position of the rotatable component 462, the open end of the pipes 411 is to be positioned above the cookware 11 when the cookware 11 is at the upright position (see FIG. 8A), so that the liquid may be flown to and dispensed into the cookware 11. The liquid dispensing mechanism 403 is used to dispense a plurality of liquid ingredients into the cookware 11 of a cooking apparatus 103 when the rotatable component 462 is at the first end-position and the cookware 11 is at the upright position.

When the rotatable component 462 is rotated to the second end-position, the components 462 and 411 are all away from the cookware 11. The angular degree between the first end-position and the second end-position may be about 90 degrees, although this is not a strict requirement.

Figure 9A:
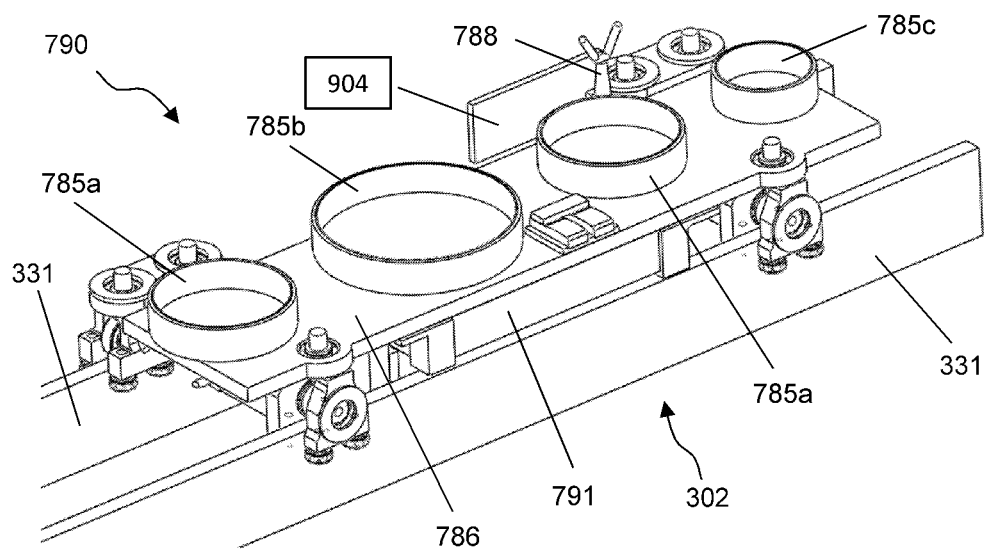
FIG. 9A shows an aerial view of a part of a transport system which includes a vehicle on tracks.

Referring to FIG. 9A, a transport system 302 comprises a plurality of vehicles 790, wherein each vehicle 790 comprises: a support component 786; a computer 904; a plurality of wheels; motors configured to drive rotations of some of the wheels; a rechargeable battery 791; a plurality of container holders 785a, 785b and 785c wherein each container holder 785a, 785b or 785c is rotationally symmetric with a vertical axis. Each container holders 785a, 785b or 785c is configured to hold an ingredient container 81 of a specific diametrical size. Each container holder 785a on a vehicle 790 may hold an ingredient container 81 so that the movement of said ingredient container may be restricted or limited when the vehicle 790 is moving.

The transport system 302 further comprises tracks each comprising pairs of mini rails 331. Each mini rail 331 of the transport system 302 is fixedly connected to the ground. One of the vehicles 790 and the container holders 785a that is held on the vehicle 790 may move along the mini rails 331. The transport system 302 can transport the ingredient containers. The computer 904 is connected to the computer system 99 of FIG. 1 via wireless means, and the computer system 99 is configured to control the timing and speed of the vehicles 790. More parts of the transport system 302 will be described below (see the descriptions of FIG. 14B and FIGS. 16A-16E).

It should be noted that the vehicle 790 may move on a pair of curved rail tracks whose widths are smaller than the widths of straight rail tracks. The vehicle 790 can carry and transport a plurality of ingredient containers. When the vehicle 790 moves, then the vehicle 790 can transport the ingredient containers held by the holding cups of the vehicle.

It should be noted that the any of container holders in the vehicle 790 may be substituted by a solid shape which can position or hold an ingredient container.

See U.S. patent application Ser. Nos. 16/517,705 and 16/997,933 for more details of the vehicle 790. The entire contents of these applications are hereby incorporated herein.

Figure 9B:
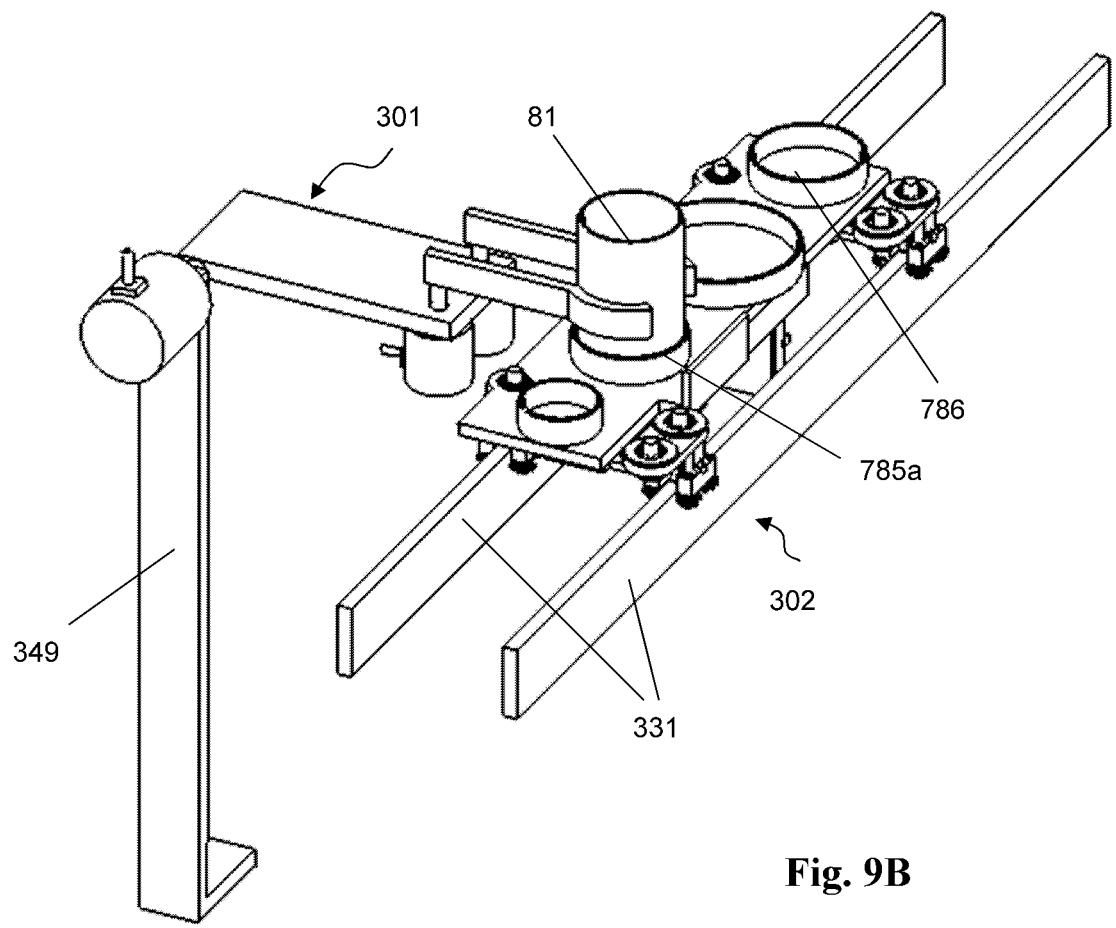
FIG. 9B shows an aerial view of some tracks, a vehicle on the tracks and the ingredient dispensing apparatus of FIG. 6A.

As shown in FIG. 9B, a vehicle 790 in the transport system 302 may move an ingredient container 81 to a dispensing position relative to the support component 349 of the ingredient dispensing apparatus 301. Then the support component 345 of the gripping mechanism 303 may be rotated to the first end-position relative to the support component 349 while the gripping devices 341a and 341b are kept at their second end-positions, and then, the gripping devices 341a and 341b are rotated to their first end-position as to grip the ingredient container 81.

Figure 10:
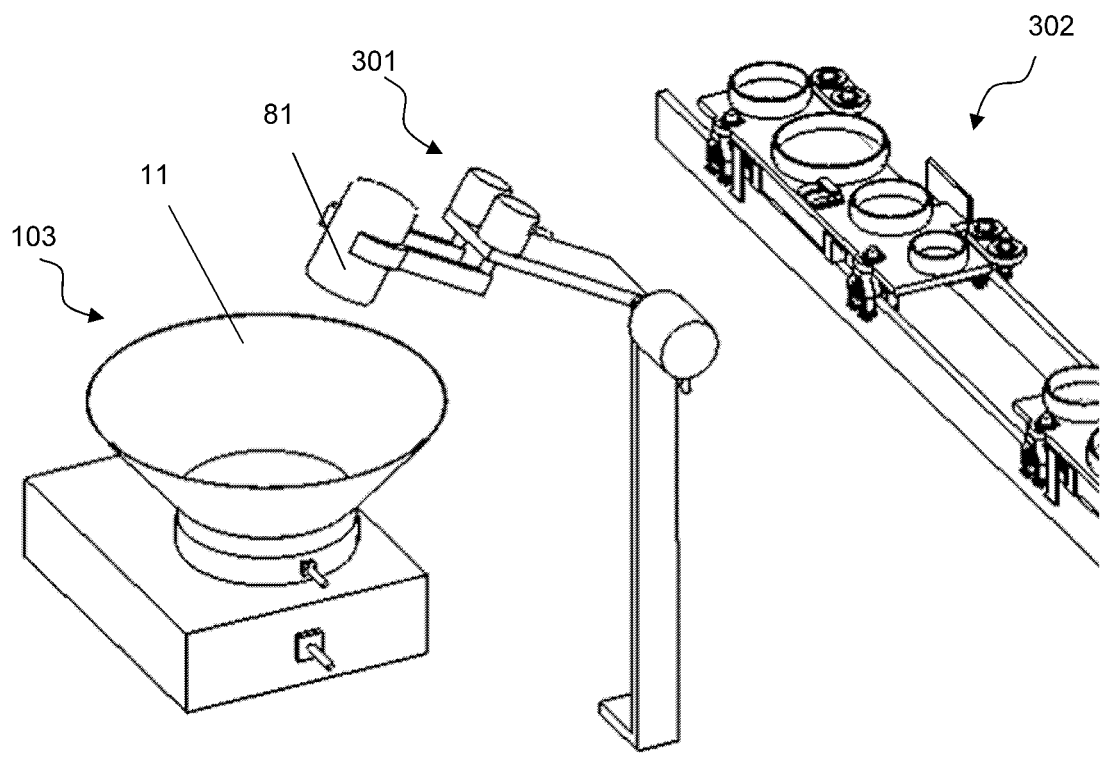
FIG. 10 shows an aerial view of the relative positions of the cooking apparatus of FIG. 3, the ingredient dispensing apparatus of FIG. 6A, and the transport system of FIG. 9A.

FIG. 10 shows the relative position of the cooking apparatus 103, the ingredient dispensing apparatus 301 and the transport system 302. A vehicle 790 of the transport system 302 moves an ingredient container 81, which contains food ingredients, to a dispensing position relative to the support component 349 of the ingredient dispensing apparatus 301. The rigid component 345 of the ingredient dispensing apparatus 301 may be rotated to the first end-position, and then the grippers 341a and 341b can move to their first end-positions to grip the ingredient container 81. Then the rigid component 345 is rotated to the second end-position, as to dispense the food ingredients from the ingredient container 81 into the cookware 11 of the cooking apparatus 103. The ingredient dispensing apparatus 301 is configured to dispensed virtually entire content held in the ingredient container 81 into the cookware 11; wherein exception (to the "virtually entire content") may be a very small quantity of ingredients which are undesirably stubbornly sticking to a surface of the ingredient container 81 and this small quantity of ingredients will be waste. Afterwards, the rigid component 345 is rotated back to the first end-position, and after that, the grippers 341a and 341b can move to their second end-positions to let loose the emptied container 81, as to be placed on the container holders 785a of the vehicle 790. It should be noted that the vehicle 790 is braked during the time of the above procedures.

Figure 11:
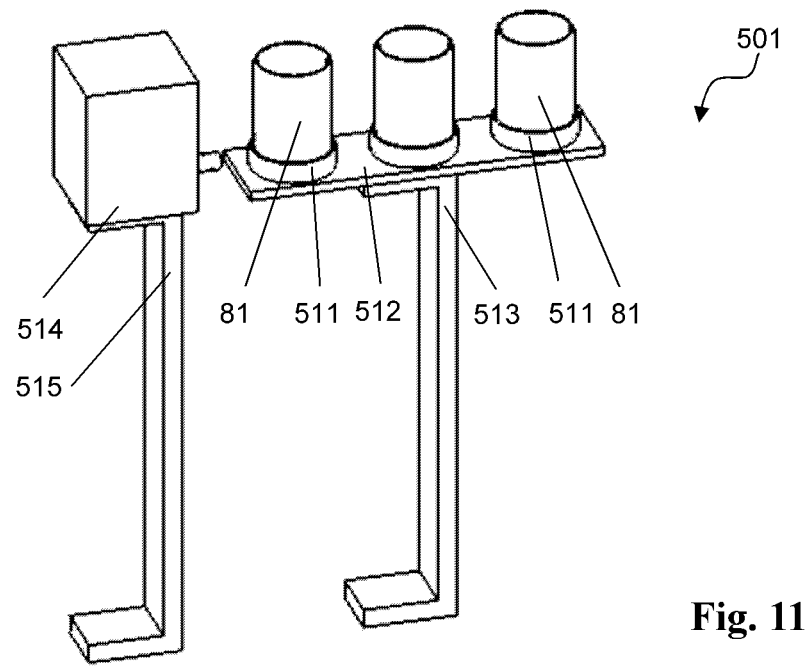
FIG. 11 shows an aerial view of a storage apparatus which can store ingredient containers.

Referring to FIG. 11, a storage apparatus 501 comprises: a plurality of container holders 511; and a support component 512; wherein each container holder 511 is configured to position or otherwise hold one or more ingredient containers 81. Each container holder 511 is fixedly connected to the support component 512. The support component 512 is fixedly connected to the ground by a rigid connector 513. The storage apparatus 501 also comprises a refrigeration mechanism 514 configured to refrigerate the ingredient containers 81 as to keep the food ingredient in the ingredient containers fresh. The refrigeration mechanism 514 is fixedly connected to the ground by a rigid connector 515.

Note that the storage apparatus 501 may be substituted by the storage system 560 of FIGS. 20A-24 of U.S. patent application Ser. No. 16/517,705 and similar storage system disclosed of U.S. patent application Ser. No. 16/997,933. The Entire contents of the application are incorporated herein by reference.

Figure 12:
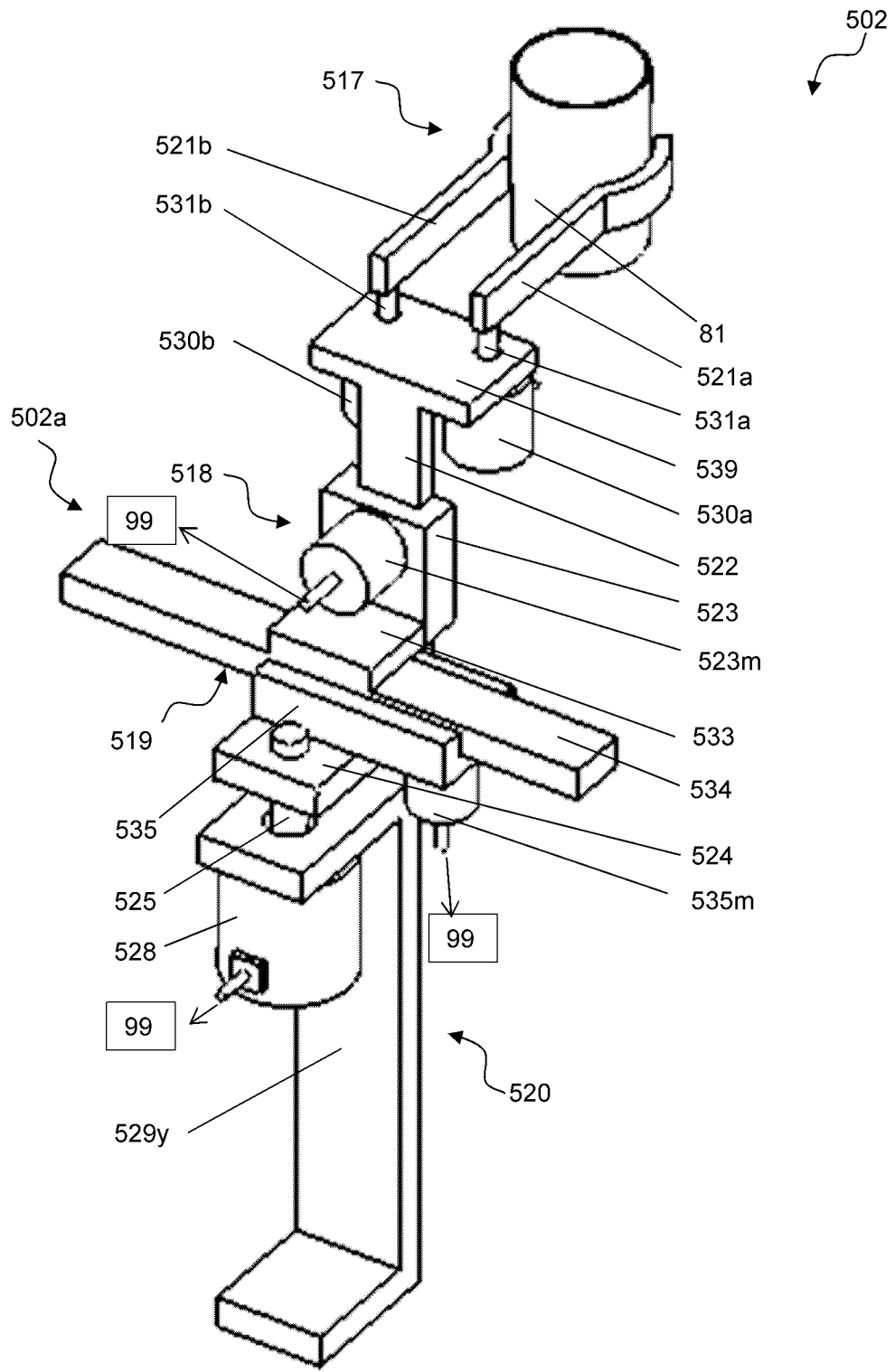
FIG. 12 shows an aerial view of a transfer apparatus.
Figure 13A:
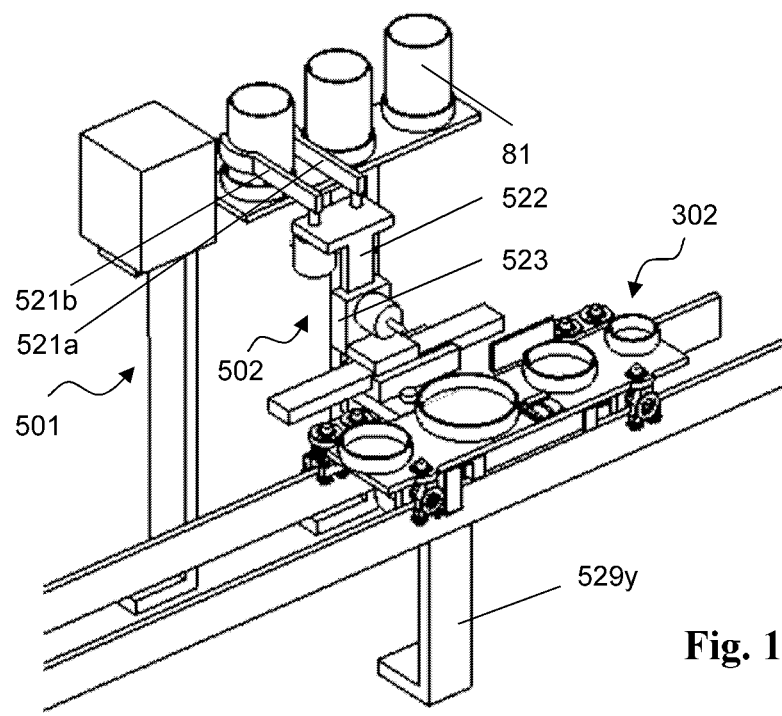
FIGS. 13A-13D show aerial views of the relative positions of the storage apparatus of FIG. 11, the transfer apparatus of FIG. 12, and the transport system of FIG. 9A.
Figure 13B:
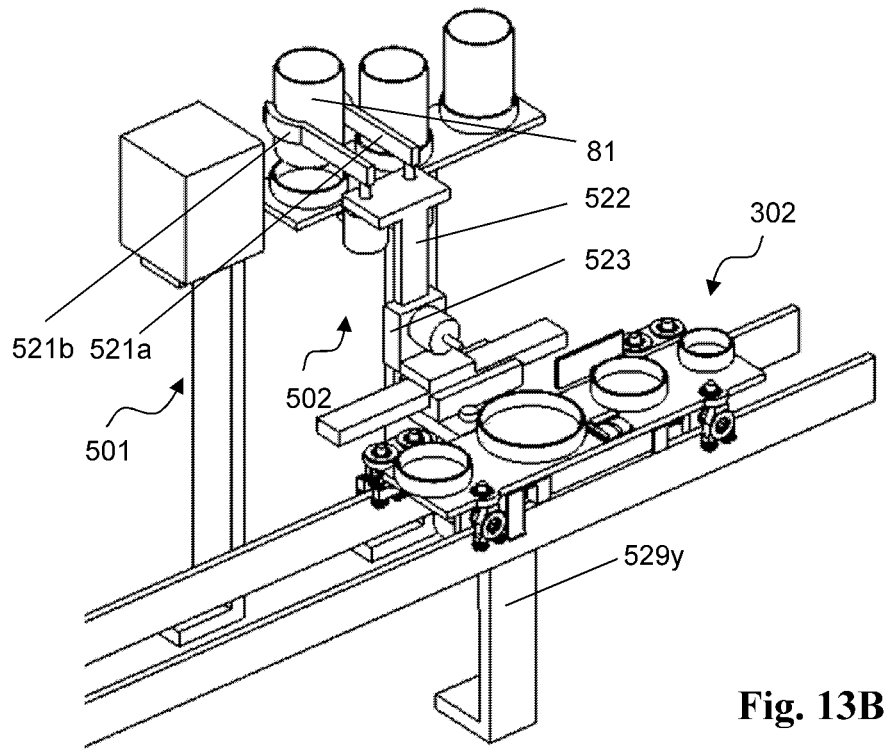
Figure 13C:
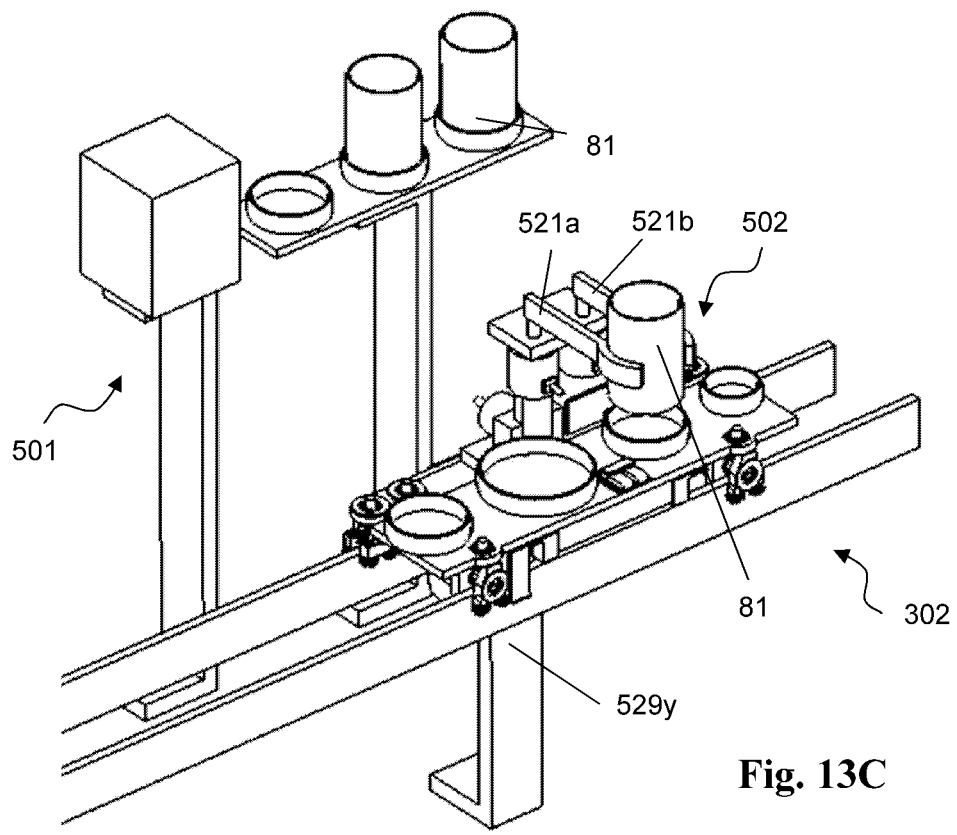
Figure 13D:
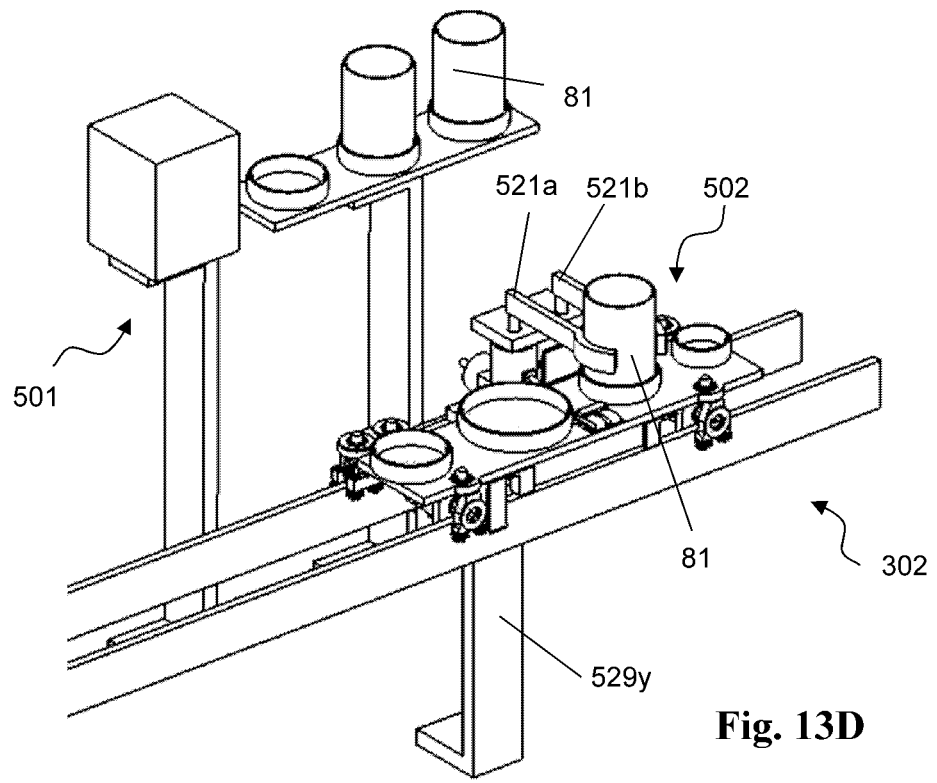

Referring to FIG. 12, a transfer apparatus 502 comprises a gripping mechanism 517 comprising: a rigid component 539 referred to as a support component; grippers 521a and 521b which can optionally be rigid or elastic components; shafts 531a and 531 b; motors 530a and 530b. Each of the motors 530a and 530b comprises a base component which is fixedly connected to the rigid component 539. The gripper 521a is rigidly of fixedly connected to the shaft 531a. The motor 530a can produce a rotation of the shaft 531a and hence of the gripper 521a around the axis of the shaft 531a relative to the rigid component 539. Similarly, the gripper 521b is rigidly or fixedly connected to the shaft 531b. The motor 530b can produce a rotation of the shaft 531b and hence of the gripper 521b around the axis of the shaft 531b relative to the rigid component 539. The motors 530a and 530b are configured to rotate the respective grippers 521a and 521b anti-synchronously around a pair of parallel axes. The gripper 521a or 521b is rotated between two end-positions. At some first end-positions, the grippers 521a and 521b may grip an ingredient container 81 under the condition that the food container is placed in a certain position relative to the rigid component 539. At some second end-positions, the grippers 521a and 521b can let loose and release the ingredient container 81.

The transfer apparatus 502 further comprises a motion mechanism 502a comprising: a vertical motion mechanism 518; a linear motion mechanism 519; and a rotational motion mechanism 520. Said vertical motion mechanism 518 comprises a stationary member 523; a moving member 522. Said linear motion mechanism 519 comprises a stationary member 535; a moving member 534. Said rotational motion mechanism 520 comprises: a shaft 525 referred to as a moving member; a rigid component 529y referred to as a stationary member; and a motor 528. The rigid component 539 of the gripping mechanism 517 is fixedly or rigidly connected to the moving member 522, so that the vertical motion mechanism 518 is configured to produce a vertical motion of the moving member 522 and the rigid component 539 between two end-positions. A connector 533 is configured to fixedly or rigidly connects the stationary member 523 and the moving member 534, so that the linear motion mechanism 519 is configured to produce a linear motion of the moving member 534 and the stationary member 523 between two end-positions. A connector 524 fixedly or rigidly connects the shaft 525 and the stationary member 535. The motor 528 comprises a base component which is fixedly connected to the ground via the rigid component 529y. The motor 528 of the rotational motion mechanism 520 can produce a rotation of the shaft 525 and the connector 524 between two end-positions and hence of the stationary member 535. The motors 530a, 530b, and 528 are all connected to the computer system 99 of FIG. 1, so that the computer system 99 may control timings and speeds of their produced motions. The vertical motion mechanism 518 is driven by a motor 523m, which is connected to the computer system 99 by wires or by wireless means. The linear motion mechanism 519 is driven by a motor 535m, which is connected to the computer system 99 by wires or by wireless means. The transfer apparatus 502 is configured to grip an ingredient container 81 and transfer it combination of vertical motion, linear motion, and rotational motion to another position. The rigid component 529y may be referred to as the support component of the transfer apparatus 502.

FIGS. 13A-13D show the relative positions of the storage apparatus 501, the transfer apparatus 502 and the transport system 302. A vehicle 790 of the transport system 302 moves to a certain position relative to the support component 529y of the transfer apparatus 502. When the shaft 525 (or the horizontal motion mechanism 535) is at a first end-position of the shaft 525 in the rotation produced by the motor 528, and when the moving member 522 is at the lower end-position in the vertically linear sliding produced by the vertical motion mechanism 518, and when the moving member 534 is moved to a certain position by the horizontal motion mechanism 519, the grippers 521a and 521b can move to their first end-positions to grip an ingredient container, in an upright position, which contains food ingredients, under the condition that the ingredient container is at a certain position relative to the support component 529y (see FIG. 13A). Then, the moving member 522 is moved to the upper end-position while the ingredient container is gripped by the grippers 521a and 521b (see FIG. 13B). And then, the shaft 525 and the vertical motion mechanism 523 are rotated by the motor 528 to the second end-position while the ingredient container is gripped by the grippers 521a and 521b (see FIG. 13C). Then, the moving member 522 is moved to the lower end-position, and then the grippers 521a and 521b, when rotated to their second end-positions may release the ingredient container to a container holder 785a of a vehicle 790 (see FIG. 13D). The computer system 99 of FIG. 1 may control the timing and speed of the motor 528, the horizontal motion mechanism 535 and the vertical motion mechanism 523. It should be noted that the vehicle 790 is braked during the time of the above procedures.

Figure 14A:
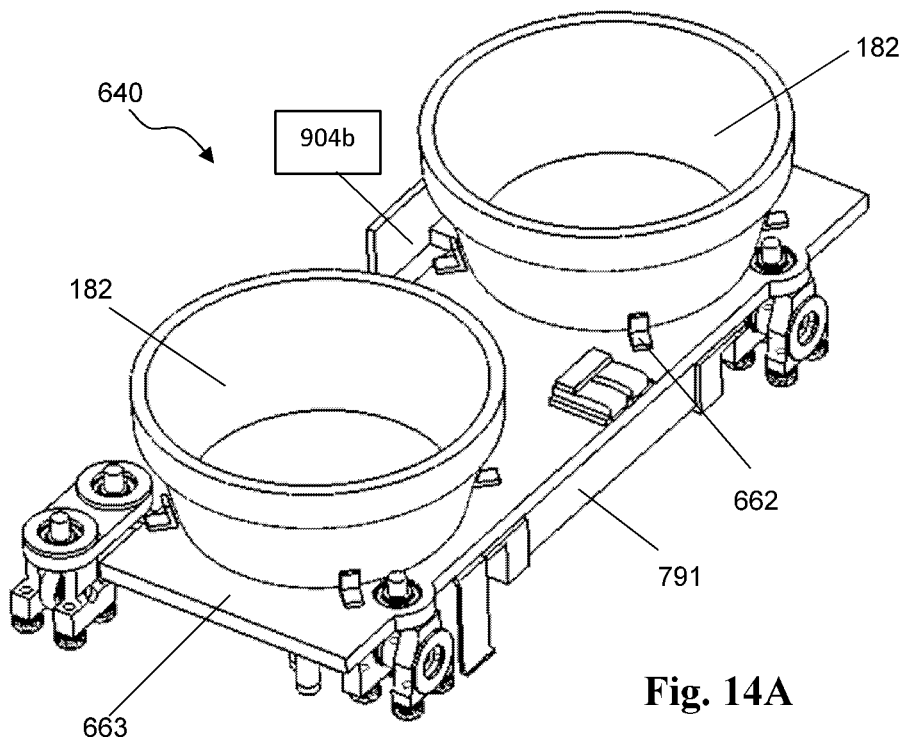
FIG. 14A shows an aerial view of a vehicle.

Referring to FIG. 14A, a vehicle 640 is similarly configured as the vehicle 790 except that: the support component 786 is substituted by a support component 663; the round container holders 785a, 785b and 785c are substituted by a plurality of food container holders 662; and the computer 904 is substituted by a computer 904b. The other part numbers in the vehicle 640 are the same as the corresponding part numbers in the vehicle 790. The food container holders 662 are configured to hold a food container 182 so that the movement of said food container 182 may be restricted or limited when the vehicle is moving. The computer 904b may control the operations of the electrical or electronic devices of the vehicle 640 by sending signals to the electrical or electronic device. The computer 904b may communicate with the computer system 99 via a wireless communication device.

Figure 14B:
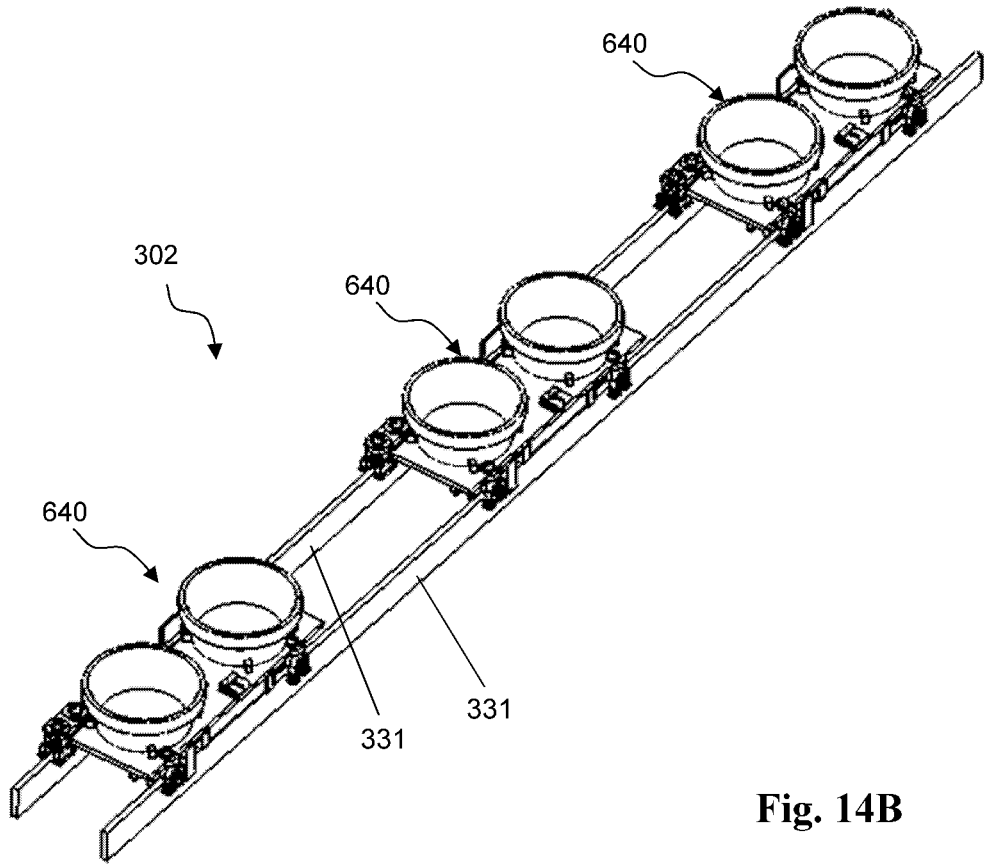
FIG. 14B shows an aerial view of another part of the transport system that is partially shown in FIG. 9A.

Referring to FIG. 14B, following the description of FIG. 9A, the transport system 302 further comprises a plurality of vehicles 640. The vehicles 640 and the food containers 182 held by the food container holders 662 on the vehicles 640 may move along the mini rails 331. The transport system 302 can transfer food containers 182. The computer 904b is connected to the computer system 99 of FIG. 1 via wireless means, so that the computer system 99 may control the timing and speed of the vehicles 640. More parts of the transport system 302 will be presented below (see the description of FIGS. 16A-16E).

It should be noted that the vehicles 640 may comprise additional components for the purpose of staying on track.

It should be noted that the transport system 302 may comprise track switch mechanisms. The vehicles 640 or 790 may move on different mini rails by means of a track switch mechanism.

Figure 15A:
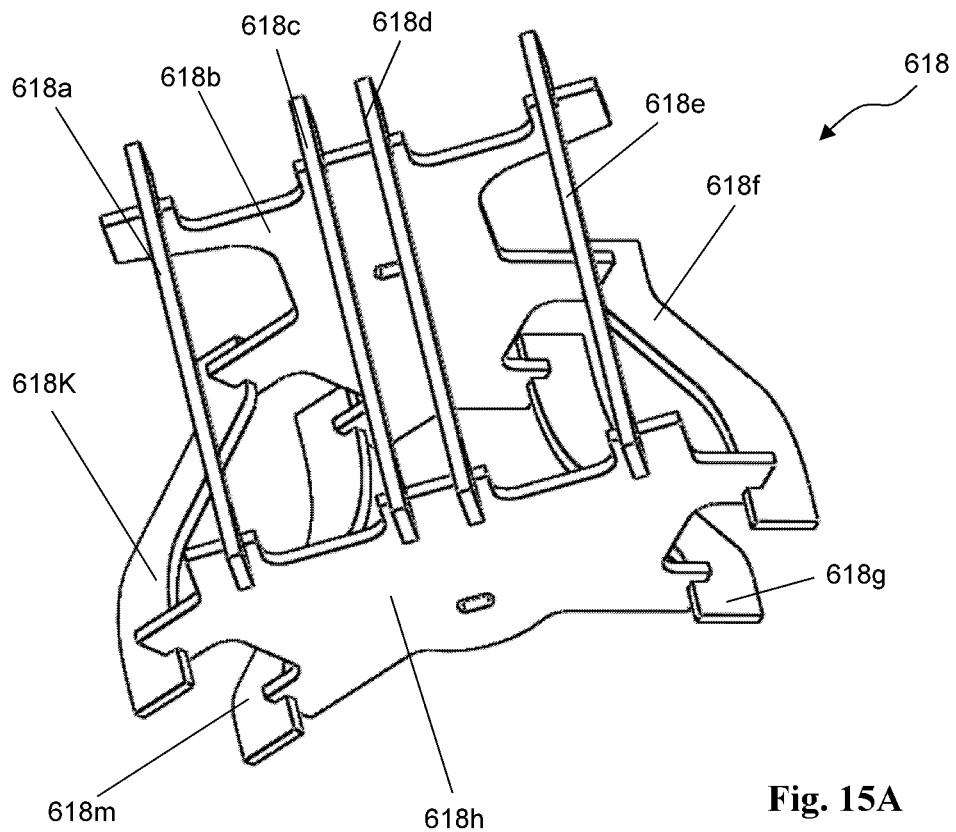
FIG. 15A shows an aerial view of a device.

Referring to FIG. 15A, a device 618 comprises: two vertical boards 618h and 618b, a first group of rail tracks comprising two pairs of linear rail tracks 618a and 618c, 618d and 618e; a second group of rail tracks comprising a pair of curved rail tracks 618f and 618g; a third group of rail tracks comprising a pair of curved rail tracks 618k and 618m. All rail tracks 618a, 618c, 618d, 618e, 618f, 618g, 618k and 618m are configured to be fixedly connected to the vertical boards 618h and 618b. The rail tracks in each group of rail tracks are configured to be coplanar. The boards and the rail tracks are configured to be rigidly connected to each other, so the device 618 may be regarded as a rigid body.

Figure 15B:
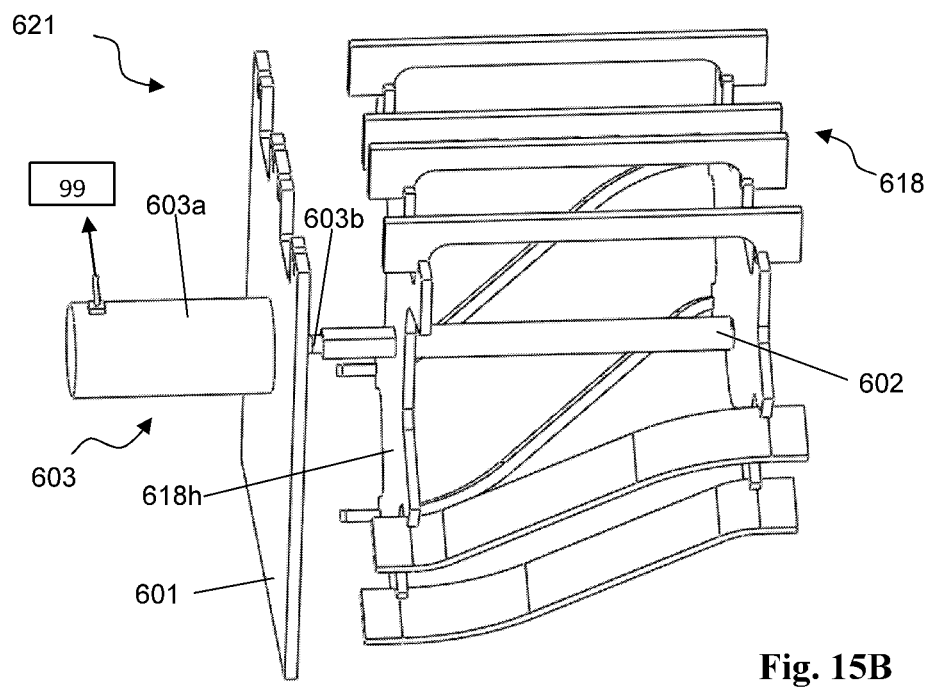
FIG. 15B shows an aerial view of a track switch mechanism (type I).

Referring to FIG. 15B, a track switch mechanism 621 comprises a rotational motion mechanism 603 and a device 618. The rotational motion mechanism 603 comprises a moving member 603b and a stationary member 603a. The vertical boards 618h and 618b of the device 618 are fixedly connected to the moving member 603b via a connector 602. The stationary member 603a is fixedly connected to a connector 601. The rotational motion mechanism 603 may produce an intermittent rotation of both the moving member 603b and the device 618 relative to the stationary member 603a (or the connector 601) around the axis of the rotational motion mechanism 603. The rotational motion mechanism 603 may be connected to the computer system 909 via wires or by wireless means, and the computer system 909 may be configured to control the timing and speed of the rotational motion mechanism 603. The computer system 909 may control the rotational motion mechanism 603 as to complete one, two, or more intermittent rotations in the device 618.

When the device 618 is at one of stopping positions, a group of rail tracks of the device 618 is configured to connect pairs of ends of rail tracks that are fixedly mounted.

It should be noted that the above intermittent motions can be produced in the known technique. Same applies to an intermittent motion in the following.

Figure 15C:
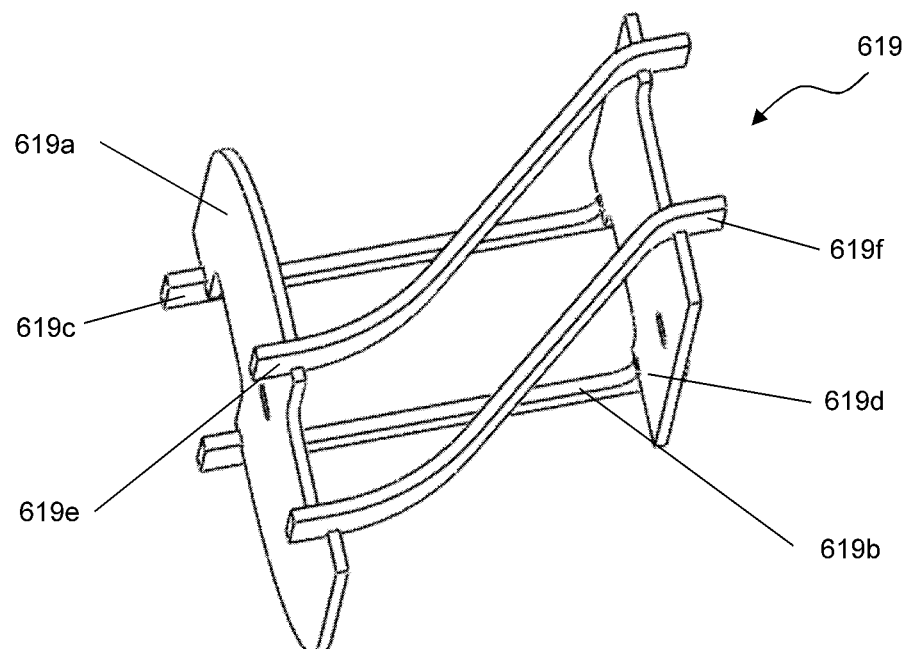
FIG. 15C shows an aerial view of a device.

Referring to FIG. 15C, a device 619 comprises: two vertical boards 619a and 619d; a first group of rail tracks comprising a pair of curved rail tracks 619e and 619b; a second group of rail tracks comprising a pair of linear rail tracks 619c and 619f. All rail tracks 619e, 619b, 619c and 619f are configured to be fixedly connected to the vertical boards 619a and 619d. The boards and the rail tracks are configured to be rigidly connected to each other, so the device 619 may also be regarded as a rigid body.

Figure 15D:
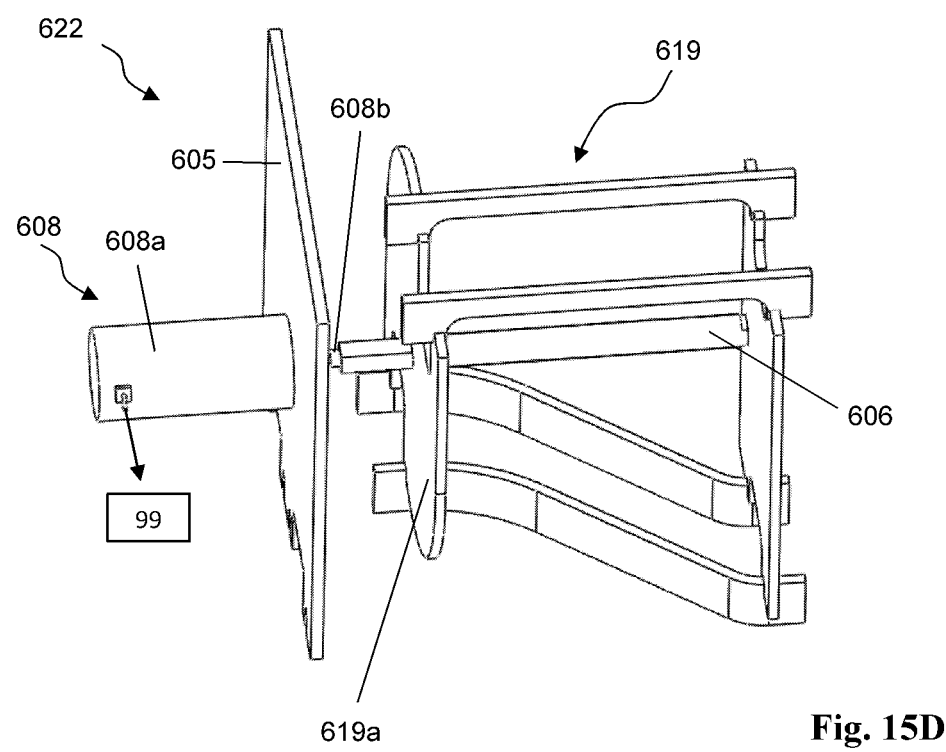
FIG. 15D shows an aerial view of a track switch mechanism (type II).

Referring to FIG. 15D, a track switch mechanism 622 comprises a rotational motion mechanism 608 and a device 619. The rotational motion mechanism 608 comprises a moving member 608b and a stationary member 608a. The vertical boards 619a and 619d of the device 619 are fixedly connected to the moving member 608b via a connector 606. The stationary member 608a is fixedly connected to a connector 605. The rotational motion mechanism 608 may produce an intermittent rotation of both the moving member 608b and the device 619 relative to the stationary member 608a (or the connector 605) around the axis of the rotational motion mechanism 608. The rotational motion mechanism 608 may be connected to the computer system 909 via wires or by wireless means, and the computer system 909 may be configured to control the timing and speed of the rotational motion mechanism 608 by known techniques. The computer system 909 may control the rotational motion mechanism 608 as to complete one, two, or more intermittent rotations in the device 619.

When the device 619 is at one of stopping positions, a group of rail tracks of the device 619 is configured to connect pairs of ends of rail tracks that are fixedly mounted.

The track switch mechanism 621 is referred to as a track switch mechanism of type I. A track switch mechanism 622 is referred to as a track switch mechanism of type II.

Figure 16A:
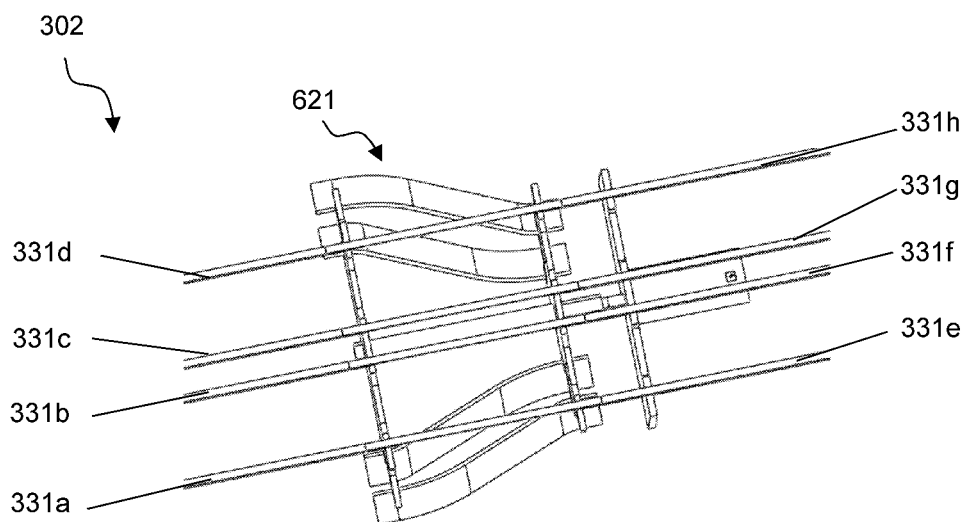
FIGS. 16A-16E show aerial views of the remaining parts of the transport system that is partially shown in of FIG. 9A and FIG. 14B.
Figure 16B:
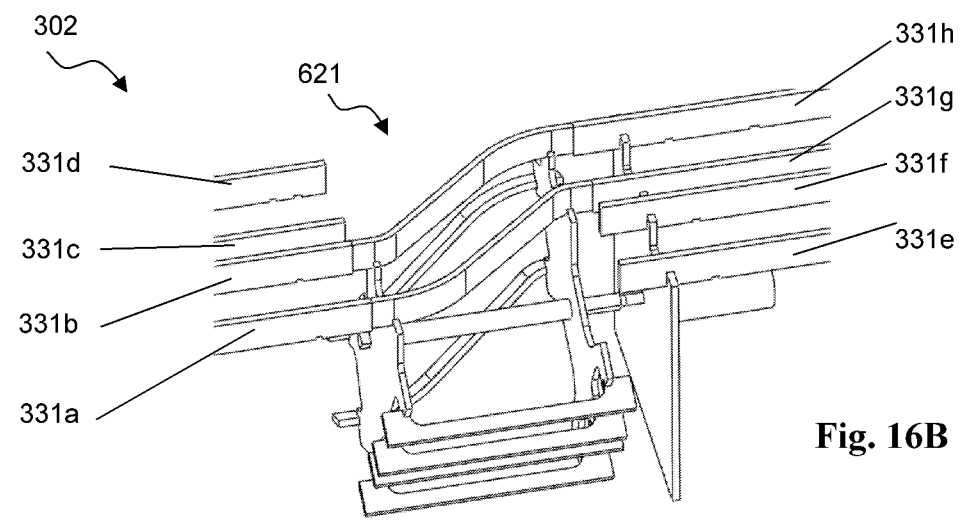
Figure 16C:
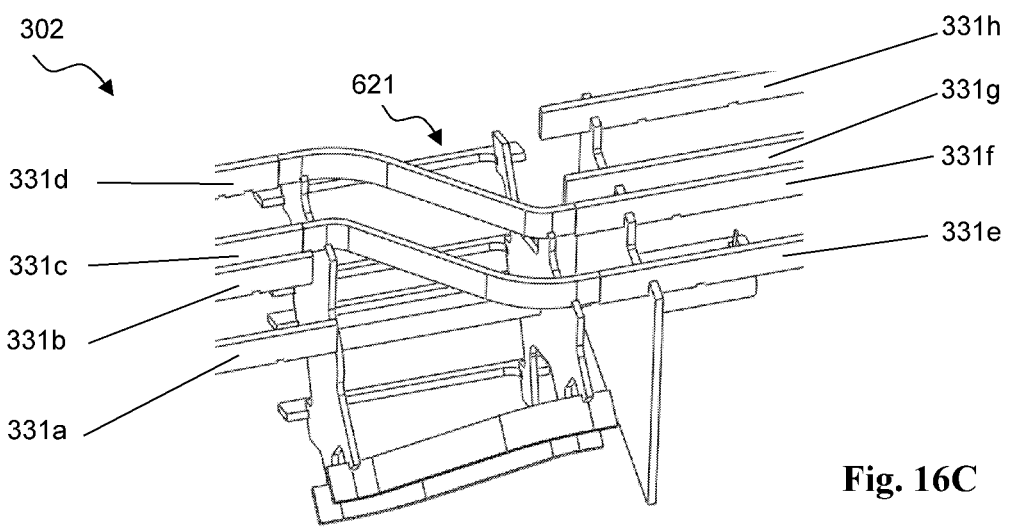

Referring to FIGS. 16A-16E, following the descriptions of FIG. 9A and FIG. 14B, the transport system 302 further comprises: a plurality of track switch mechanisms 621; and a plurality of track switch mechanisms 622; One track switch mechanism 621 is configured to be mounted in between: (1) a pairs of rail tracks, 331a and 331b, and 331c and 331d and, (2) a pairs of rail tracks, 331e and 331f, 331g and 331h. As shown in FIG. 16A, when the track switch mechanism 621 is at a first locking position, the first group of rail tracks in the track switch mechanism 621 are configured to connect the pair of rail tracks 331e and 331f to the pair of rail tracks 331a and 331b, and also to connect the pair of rail tracks 331g and 331h to the pair of rail tracks 331c and 331d. As shown in FIG. 16B, when the track switch mechanism 621 is at a second locking position, the second group of rail tracks in the track switch mechanism 621 are configured to connect the pair of rail tracks 331g and 331h to the pair of rail tracks 331a and 331b. As shown in FIG. 16C, when the track switch mechanism 621 is at a third locking position, the third group of rail tracks in the track switch mechanism 622 are configured to connect the pair of rail tracks 331e and 331f to the pair of rail tracks 331c and 331d.

Figure 16D:
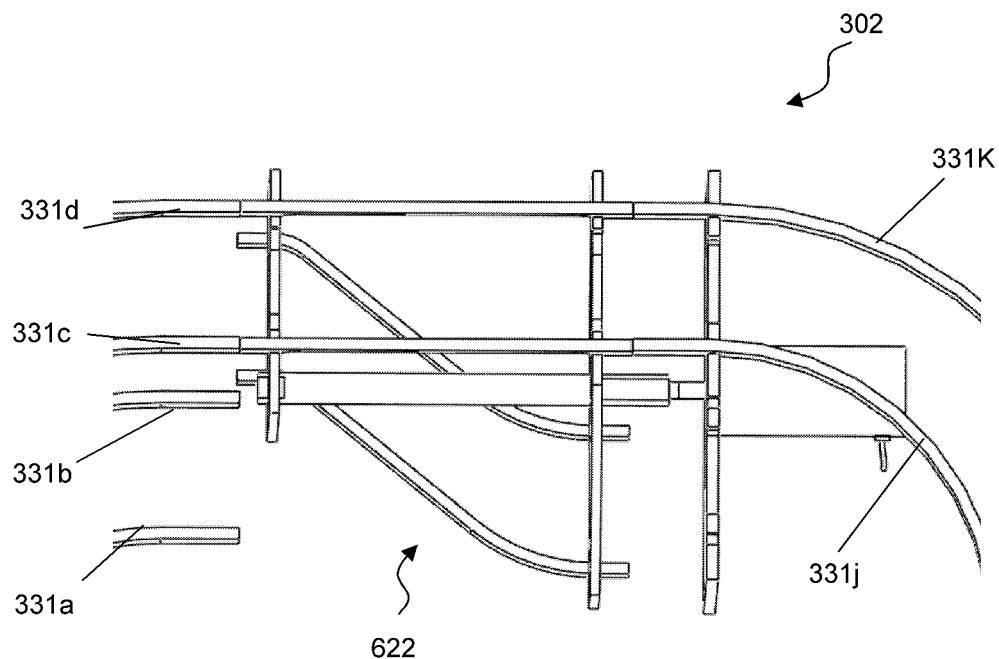
Figure 16E:
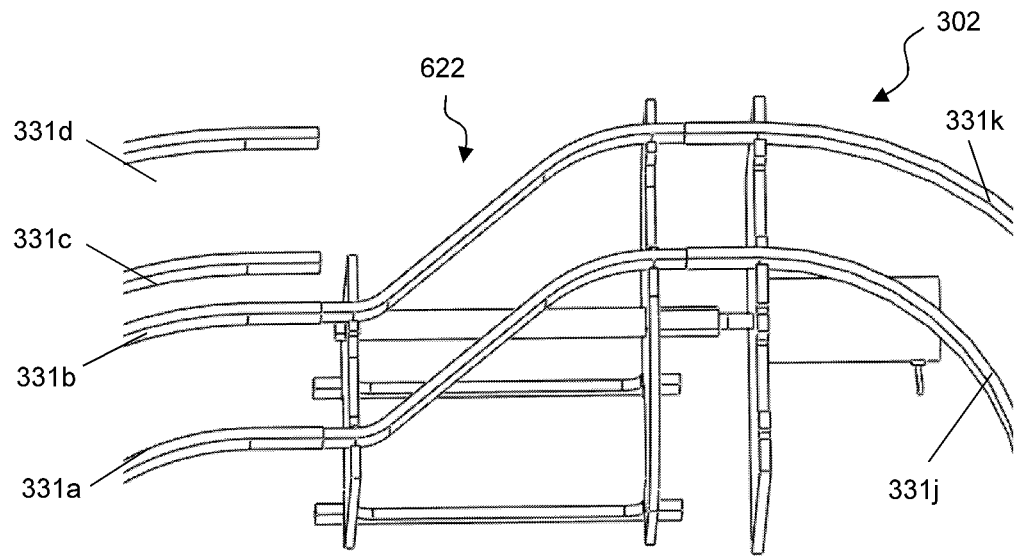

One of the track switch mechanisms 622 is configured to be mounted in between (1) a pair of rail tracks 331j and 331k, and (2) the pairs of rail tracks 331a and 331b, 331c and 331d. As shown in FIG. 16D, when the track switch mechanism 622 is at a first locking position, the first group of rail tracks in the track switch mechanism 622 are configured to connect the pair of rail tracks 331j and 331k to the pair of rail tracks 331c and 331d. As shown in FIG. 16E, when the track switch mechanism 622 is at a second locking position, the second group of rail tracks in the track switch mechanism 622 are configured to connect the pair of rail tracks 331j and 331k to the pair of rail tracks 331a and 331b.

It should be noted that the rail tracks 331a, 331b, 331c, 331d, 331e, 331f, 331g, 331h, 331j and 331k are configured the same as the rail track 331.

Referring to FIG. 17, an intermittent motion mechanism 680 comprises: a shaft 681 as a moving member, said shaft comprising a rotational axis; a support component 683 as a stationary member; a motor 686 as a driving mechanism; wherein the shaft is constrained to rotate relative to the support component around the axis of the shaft; wherein the motor is configured to drive an intermittent rotation of the shaft. The motion produced by the intermittent motion mechanism 680 is configured to be cyclic, so that the shaft may return to the same angular position from time to time. The motor is connected to the computer system 99 of FIG. 1, which is configured to control the motor by known techniques. Sensors (not shown in figures) may be configured to monitor the position of the shaft relative to the stationary member and send the information to the computer system 99 by known techniques.

Referring to FIG. 18A, a basket 450 comprises a truncated cone 450w, a porous bottom 450f, an edge 450b at the top, and a handle 471 at the top. The truncated cone 450w may optionally be made by metal sheet with or without holes. The porous bottom 450f may comprise a mesh, a net, or a sheet (e.g., metal sheet) with small holes. The (truncated cone 450w and the porous bottom 450f of the) basket 450 can hold food or food ingredients. The basket 450 may be placed into a cooking liquid (heated water or heated oil) so the food or food ingredients held in the cooking container can be boiled or deep fried.

Referring to FIG. 18B, a basket 350 comprises a mesh 350a (in the shape of a truncated cone with a bottom), an edge 350b at the top, and a handle 471 at the top. The (mesh 350a of the) basket 350 can hold food or food ingredients.

It should be noted that the basket 450, or 350 may be made by stainless steel or other material which can endure high heat (of heated oil) and be safe for touching food.

It should be noted that the basket 450 or 350, is a special type of cooking container which can contain or otherwise hold food or food ingredients during a cooking process, e.g., deep frying, boiling, etc. The food or food ingredients held by the basket may not be liquid (or gel) and each piece may need to have a big enough diameter as to be not dropped out from the basket. The minimum diameter depends on the size of the holes or the density of the net in the basket.

It should also be noted that a basket may optionally have a sectional shape of circle, oval, square, or other shape.

In the following applications, the basket 450 may be substituted by basket 350, or by other types of basket.

Referring to FIG. 19A, a gripping mechanism 460 comprising: a support component 475; grippers 472a and 472b referred to as gripping devices; shafts 473a and 473b; motors 474a and 474b. Each of the motors 474a and 474b comprises a base component which is fixedly connected to the support component 475. The gripper 472a is rigidly connected to the shaft 473a. The motor 474a can produce a rotation of the shaft 473a around the axis of the shaft 473a relative to the support component 475. Similarly, the gripper 472b is rigidly connected to the shaft 473b. The motor 474b can produce a rotation of the shaft 473b around the axis of the shaft 473b relative to the support component 475. As the gripper 472a or 472b is rigidly connected to the shaft 473a or respectively 473b, the motor 474a or 474b can produce a rotation of the gripper 472a or respectively 472b. The shafts 473a and 473b have parallel axes, and the motors 474a and 474b are configured to rotate the respective grippers 472a and 472b in opposite directions simultaneously. In fact, the grippers 472a and 472b may be configured to rotate anti-synchronously. The motions produced by the motors 474a and 474b may be linked by a transmission mechanism and then a single motor may drive their motions. The gripper 472a or 472b is rotated between two end-positions. At some first end-positions, the grippers 472a and 472b may grip a basket 450 under the condition that the basket is placed in a certain position relative to the support component 475. At some second end-positions, the grippers 472a and 472b can let loose and release the basket 450. The motors 474a and 474b are connected to the computer system 99 of FIG. 1 by wires or by wireless means, so that the computer system 99 may control timings and speeds of their produced motions.

Referring to FIG. 19B, a transfer apparatus 480 comprises: a gripping mechanism 460 (as in FIG. 19A); and a rotational motion mechanism 404. Said rotational motion mechanism 404 comprises: a shaft 477 referred as a moving member; a stationary member 479; and a motor 478 comprising a base component. The support component 475 of the gripping mechanism 460 is rigidly, fixedly, or otherwise connected to the shaft 477 via a connector 476. The base component of the motor 478 is rigidly, fixedly, or otherwise connected to the stationary member 479. The motor 478 of the rotational motion mechanism 404 can produce a rotation of both the shaft 477 and the support component 475 between two end-positions relative to the stationary member 479. The motors 474a, 474b, and 478 are all connected to the computer system 99 of FIG. 1 by wires or by wireless means, so that the computer system 99 may control timings and speeds of their produced motions by known techniques. The stationary member 479 is a rigid component and may also be referred to as the support component of the transfer apparatus 480.

Figure 19C:
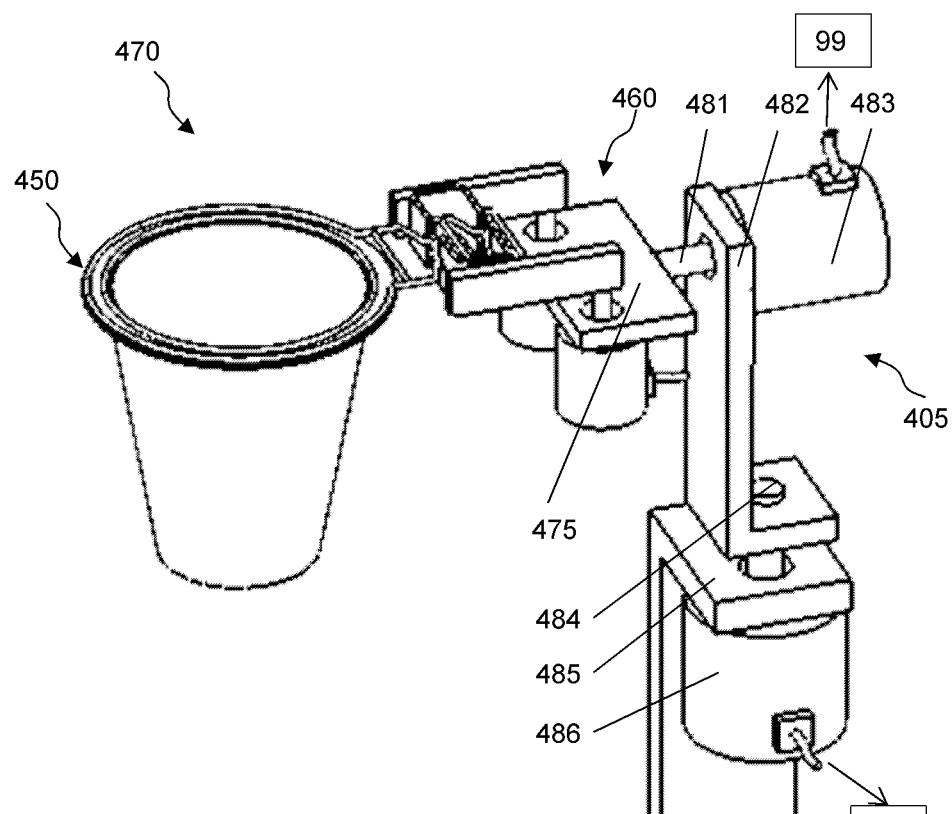
FIG. 19C shows an aerial view a dispensing apparatus comprising the gripping mechanism of FIG. 19A.

Referring to FIG. 19C, a dispensing apparatus 470 comprises: a gripping mechanism 460 (as in FIG. 19A) and a motion mechanism 490, wherein the motion mechanism 490 comprises: a rotational motion mechanism 405 referred to as a first motion sub-mechanism; and a rotational mechanism 406 referred to as a second motion sub-mechanism. Said rotational motion mechanism 405 comprises: a shaft 481 referred to as a moving member; a stationary member 482; and a motor 483 comprising a base component. The base component of the motor 483 is rigidly, fixedly, or otherwise connected to the stationary member 482. The support component 475 of the gripping mechanism 460 is rigidly, fixedly, or otherwise connected to the shaft 481. The motor 483 can produce a rotation of both the shaft 481 and the support component 475 between two end-positions relative to stationary member 482, wherein at the first end-position, the basket 450 gripped by the gripping mechanism 460 is in the upright position; wherein at the second end-position, said basket 450 is turned over about 180 degrees as to dispense the semi-cooked food into a cookware 11. Said rotational motion mechanism 406 comprises: a shaft 484; referred to as a moving member; a stationary member 485; and a motor 486 comprising a base component. The base component of the motor 486 is fixedly connected to the stationary member 485. The stationary member 482 is rigidly, fixedly, or otherwise connected to the shaft 484. The motor 486 of the rotational motion mechanism 406 can produce a rotation of both the shaft 484 and the stationary member 482 between two end-positions relative to the stationary member 485. The motors 474a, 474b, 483, and 486 are all connected to the computer system 99 of FIG. 1 by wires or by wireless means, so that the computer system 99 may control timings and speeds of their produced motions by known techniques. The stationary member 485 fixedly connected to the ground is referred to as the support component of the dispensing apparatus 470.

Figure 19D:
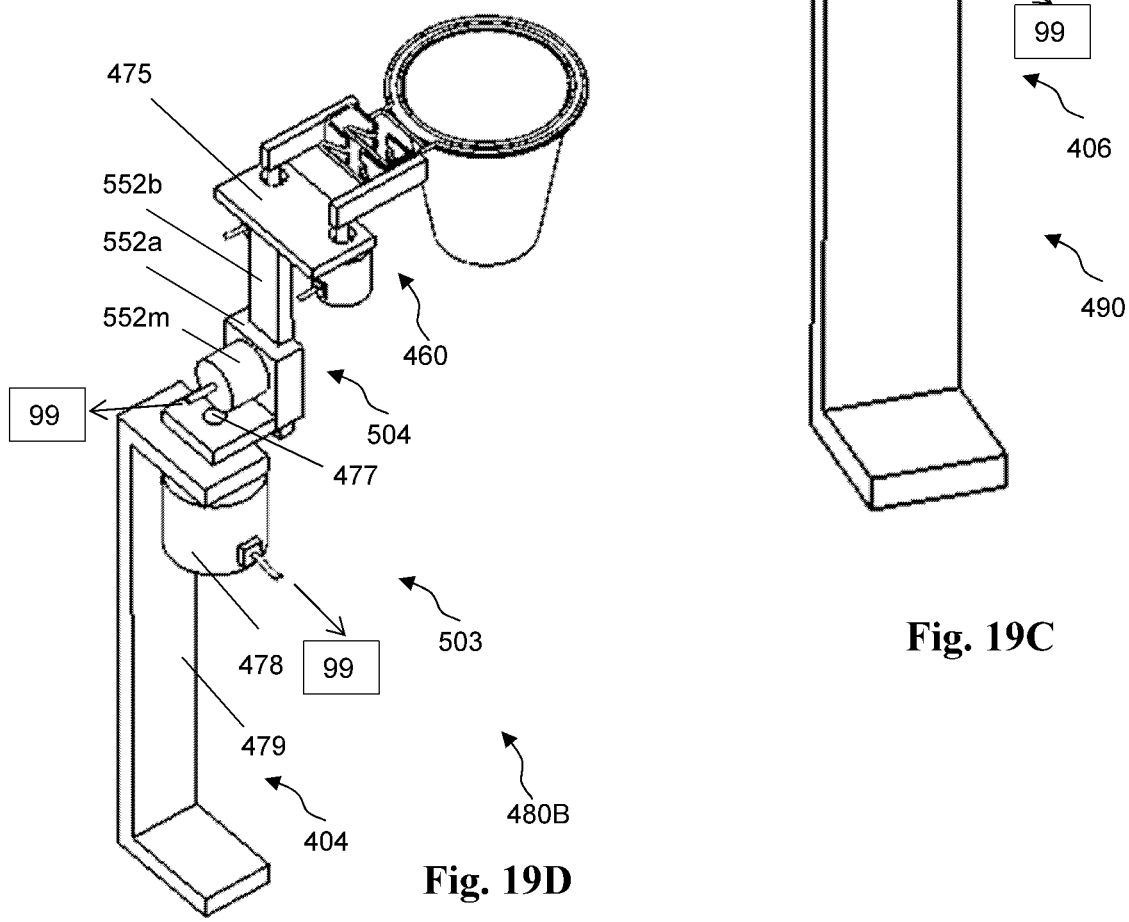
FIG. 19D shows an aerial view another transfer apparatus comprising the gripping mechanism of FIG. 19A.

Referring to FIG. 19D, a transfer apparatus 480b comprises: a gripping mechanism 460 (as in FIG. 19A); a motion mechanism 503 comprising a vertical motion mechanism 504 as a first motion sub-mechanism and a rotational motion mechanism 404 as a second motion sub-mechanism. Said vertical motion mechanism 504 comprises: a stationary member comprising a linear track 552a; a moving member comprising a slider 552b which is constrained to move linearly relative to the stationary member 552a; and a driving mechanism comprising a motor 552m configured to drive a vertical linear motion of the slider 552b relative to the stationary member 552a. The support component 475 of the gripping mechanism 460 is rigidly, fixedly, or otherwise connected to the slider 552b. Said rotational motion mechanism 404 comprises: a shaft 477 referred as a moving member; a stationary member 479; and a motor 478 comprising a base component, which is rigidly, fixedly or otherwise connected to the stationary member 479. The shaft 477 is rigidly, fixedly, or otherwise connected to the linear track 552a. The motor 478 of the rotational motion mechanism 404 can produce a rotation of both the shaft 477 and the linear track 552a between two end-positions relative to the stationary member 479. The motors 474a, 474b, 552m, and 478 are all connected to the computer system 99 of FIG. 1 by wires or by wireless means, so that the computer system 99 may control timings and speeds of their produced motions by known techniques. The stationary member 479 is a rigid component and may also be referred to as the support component of the transfer apparatus 480b.

Figure 19E:
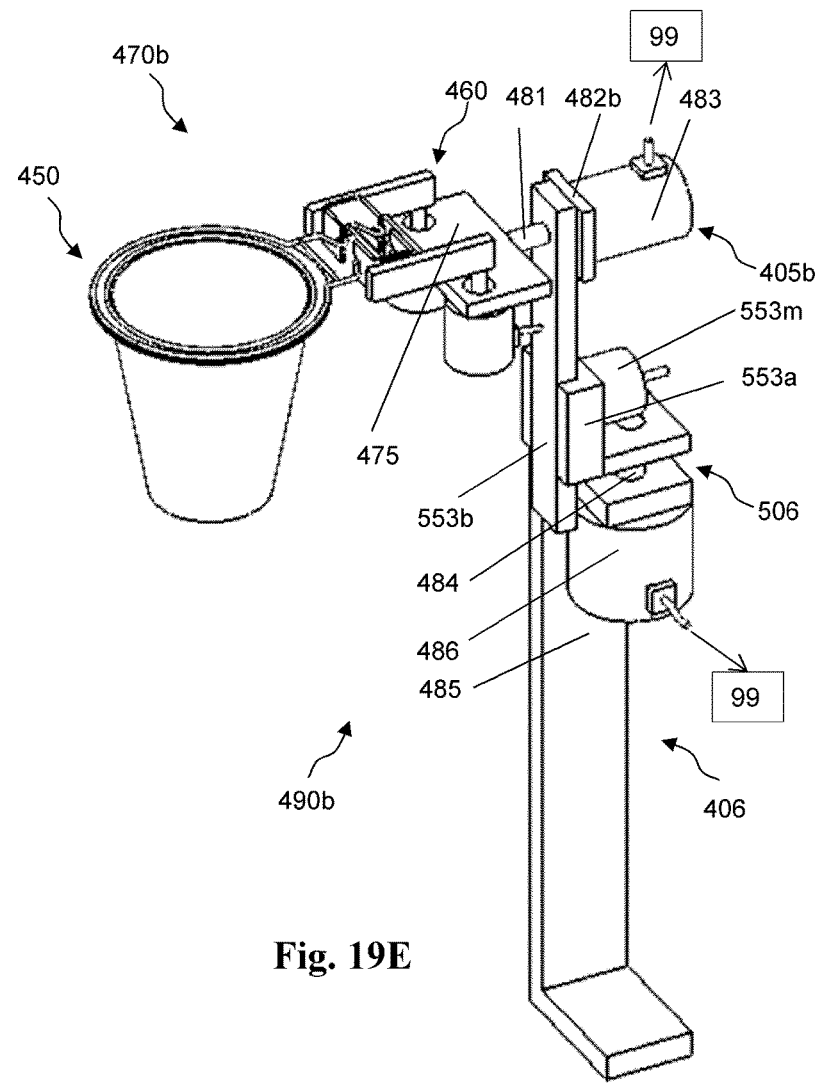
FIG. 19E shows an aerial view of another dispensing apparatus, also comprising the gripping mechanism of FIG. 19A.

Referring to FIG. 19E, a dispensing apparatus 470b comprises: a gripping mechanism 460 (as in FIG. 19A); and a motion mechanism 490b, wherein the motion mechanism 490b comprises: a rotational motion mechanism 405b referred to as a first motion sub-mechanism; a vertical motion mechanism 506 referred to as a second motion mechanism; and a rotational mechanism 406 referred to as a third motion sub-mechanism. Said rotational motion mechanism 405b comprises: a shaft 481 referred to as a moving member; a stationary member 482b; and a motor 483 comprising a base component. The base component of the motor 483 is rigidly, fixedly, or otherwise connected to the stationary member 482b. The support component 475 of the gripping mechanism 460 is rigidly, fixedly, or otherwise connected to the shaft 481. The motor 483 can produce a rotation of both the shaft 481 and the support component 475 between two end-positions relative to stationary member 482b, wherein at the first end-position, a basket 450 gripped by the gripping mechanism 460 is in the upright position; wherein at the second end-position, said basket 450 is turned over about 180 degrees as to dispense the semi-cooked food into a cookware 11. The vertical motion mechanism 506 comprises: a stationary member comprising a linear track 553a; a moving member comprising a slider 553b which is constrained to move linearly relative to the stationary member 553a; and a driving mechanism comprising a motor 553m. The stationary member 482b is rigidly, fixedly, or otherwise connected to the slider 553b. The motor 553m is configured to drive a vertical linear motion of the slider 553b and the stationary member 482b relative to the stationary member 553a. The rotational motion mechanism 406 comprises: a shaft 484; referred to as a moving member; a stationary member 485; and a motor 486 comprising a base component. The base component of the motor 486 is fixedly connected to the stationary member 485. The linear track 553a is rigidly, fixedly, or otherwise connected to the shaft 484. The motor 486 can produce a rotation of both the shaft 484 and the stationary member 553b between two end-positions relative to the stationary member 485. The motors 474a, 474b, 483, 553m, and 486 are all connected to the computer system 99 of FIG. 1 by wires or by wireless means, so that the computer system 99 may control timings and speeds of their produced motions by known techniques. The stationary member 485 is fixedly connected to the ground and is referred to as the support component of the dispensing apparatus 470b.

Figure 20A:
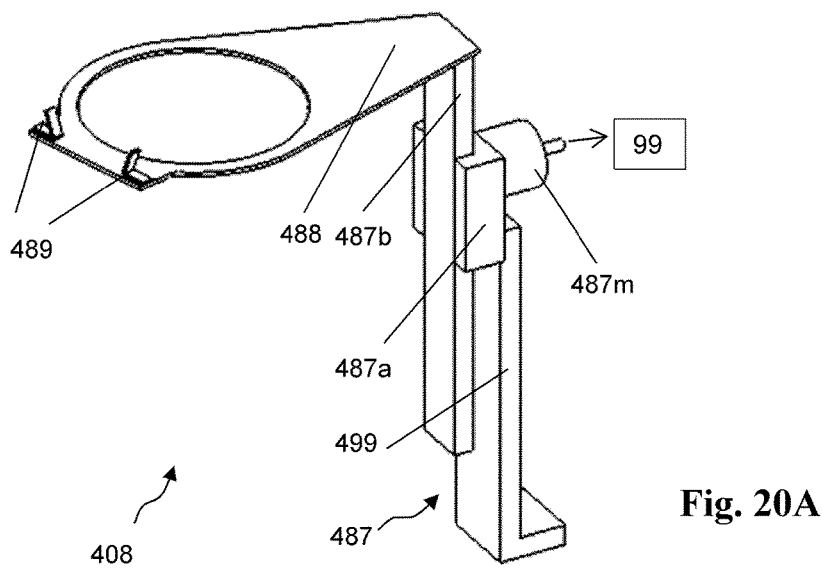
FIG. 20A shows an aerial view of a movable holder mechanism.

Referring to FIG. 20A, a movable holder mechanism 408 comprises: a linear actuator 487 as a linear motion mechanism comprising a moving member 487b, a stationary member 487a, and a motor 487m as a driving mechanism that is configured to move the moving member vertically relative to the stationary member between two end-positions; and a holder 488 comprising a solid shape configured to position or hold a basket 450, said solid shape comprising two restraining devices 489 which can limit the (rotational)

movement of the handle 471 of the basket 450. The solid shape may touch a bottom part of the edge 450*b* of the basket 450. The moving member 487*b* of the linear actuator 487 is rigidly or fixedly connected to the holder 488, so that the linear actuator 487 can move the holder 488 vertically relative to the base component 487*a* between two end-positions. The linear actuator 487 is driven by the motor 487*m* which is connected to the computer system 99 of FIG. 1 by wires or by wireless means, and the computer system 99 may control timings and speeds of the produced motion by known techniques (same below).

Figure 20B:
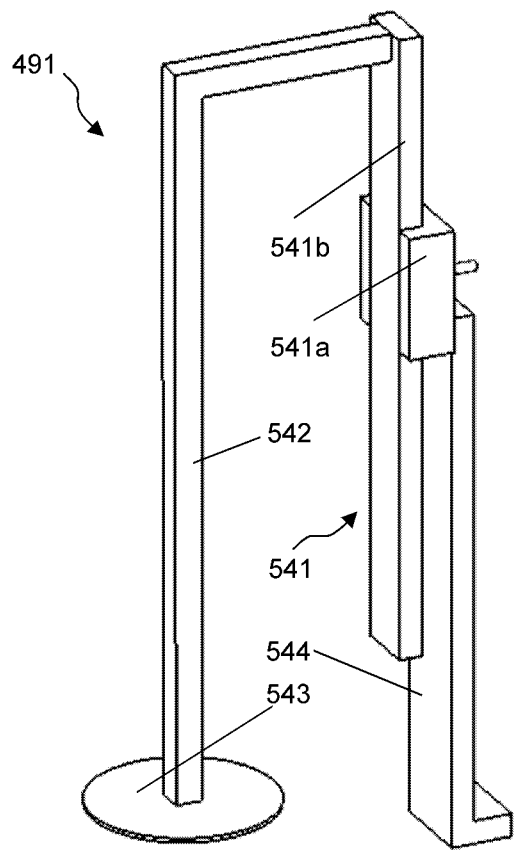
FIG. 20B shows an aerial view of a lid mechanism.

Referring to FIG. 20B, a lid mechanism 491 comprises: a lid 543; and a linear actuator 541 comprising a base component 541*a* as a stationary member, a moving member 541*b*, and a driving mechanism configured to move the moving member vertically relative to the stationary member between two end-positions. The lid 543 has a round shape, matching the shape of the basket 450. The moving member 541*b* is fixedly connected to the lid 543 via a connector 542, so that the linear actuator 541 can move the lid 543 vertically relative to the base component 541*a* between two end-positions. The linear actuator 541 is connected to the computer system 99 of FIG. 1 via wire or wireless means and the computer system 99 may control timings and speeds of the produced motion.

A linear actuator may be substituted by other type of linear motion mechanism.

Figure 20C:
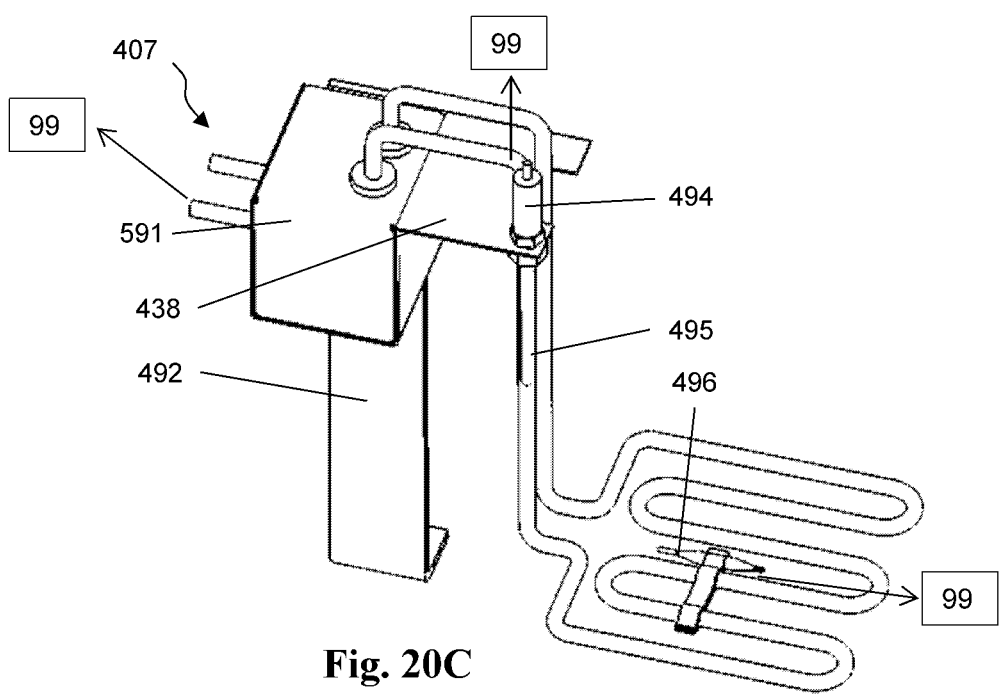
FIG. 20C shows an aerial view of a heating device.

Referring to FIG. 20C, an electric heater 407 comprises: an electric heating rod 495 as a heating device configured to be immersed into a liquid (such as oil or water) as to heat the liquid; a metal box 591; and a rigid component 492 referred to as a support component. The metal box 591 can be hooked to the rigid component 492. The heating device 495 is fixedly connected to the metal box 591 and is powered by electricity. The heating device 495 can heat a liquid when said heating device is inserted in the liquid. The heating device 495 is connected by wires to the computer system 99 of FIG. 1, and the computer system 99 can control the timing and power of the heating device 495.

The electric heater 407 further comprises a level detector 494 which is fixedly mounted on a connector 438, which is extended from the metal box 591. The level detector 494 is used to detect the height of the liquid contained in a liquid container. The level detector 494 is connected to the computer system 99 of FIG. 1 by wires or wireless means and the computer system 99 can keep track of the height of the liquid. A temperature sensor 496 is fixedly connected to a connector 496 which is attached to the heating device 495. The temperature sensor 496 is connected to the computer system 99 by wired or wireless means and the computer system 99 can keep track of the temperatures of the temperatures of a liquid when said heating device 495 and the temperature sensor 496 are inserted in the liquid.

Figure 20D:
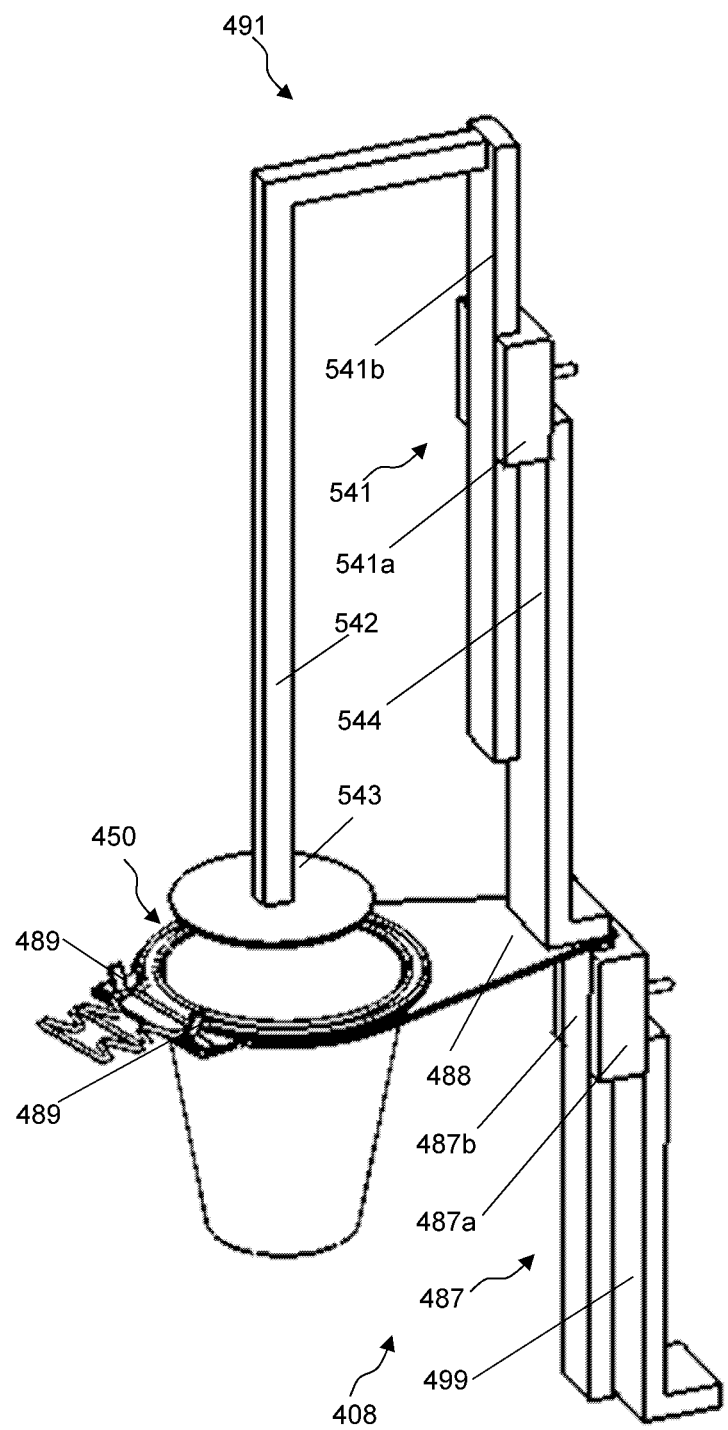
FIG. 20D shows an aerial view of parts of a cooking apparatus.
Figure 20E:
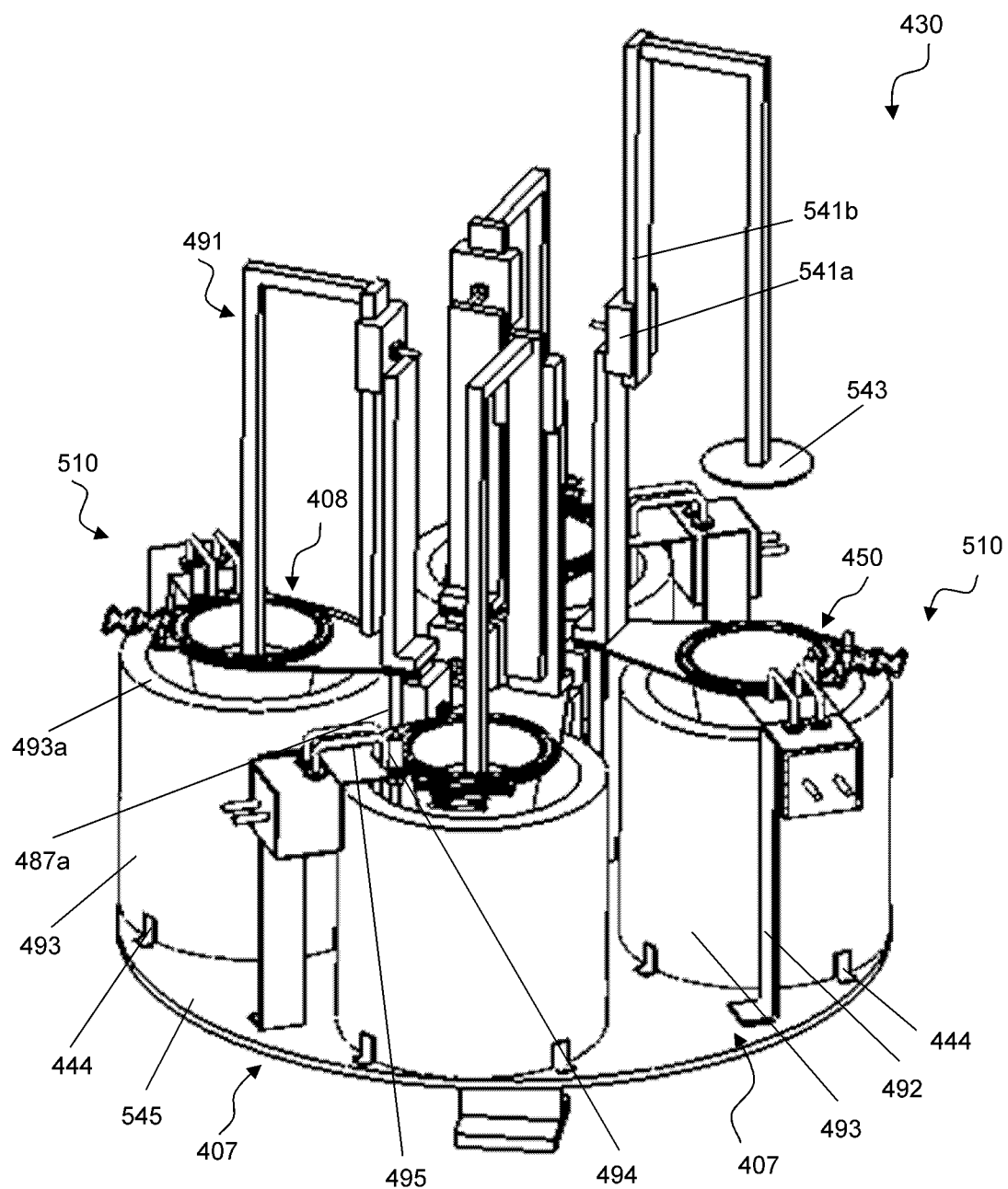
FIGS. 20E-20F show aerial views of the cooking apparatus comprising: the rotational motion mechanism of FIG. 17; a plurality of linear motion mechanisms of FIG. 20A; a plurality of lid mechanisms of FIG. 20B; and a plurality of heating devices of FIG. 20C.
Figure 20F:
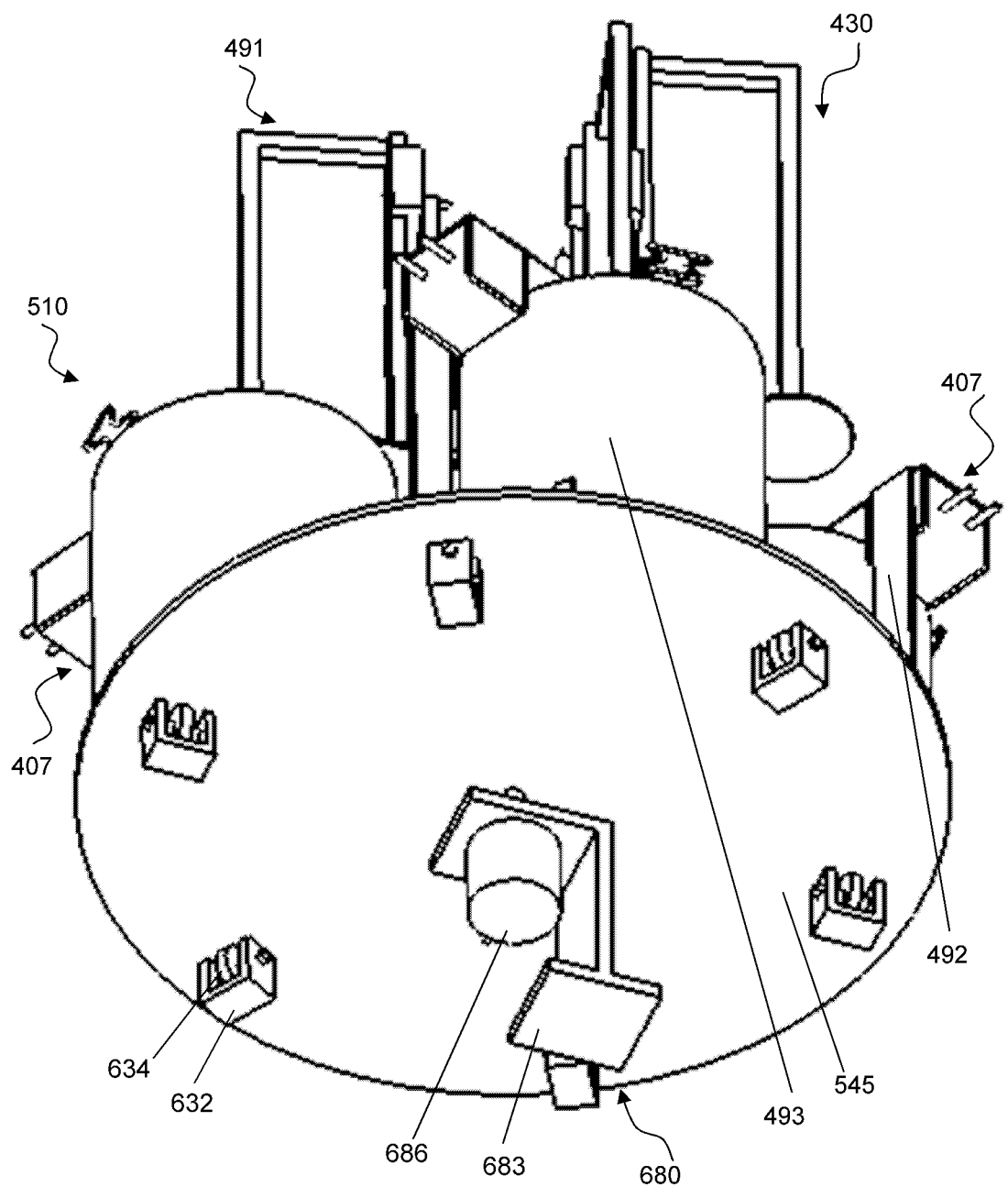
Figure 20G:
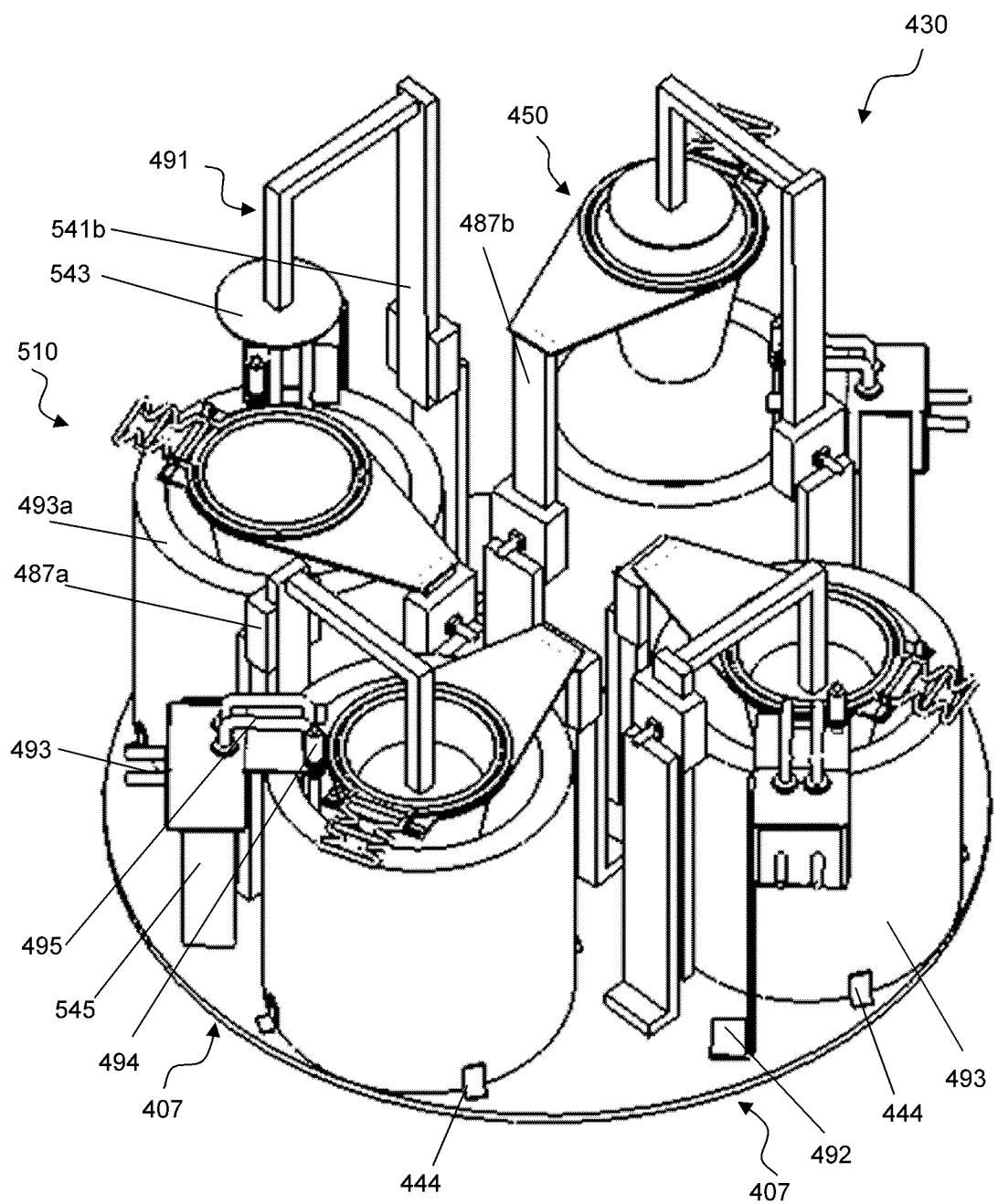
FIG. 20G shows an aerial view of the cooking apparatus configured in another way.
Figure 20H:
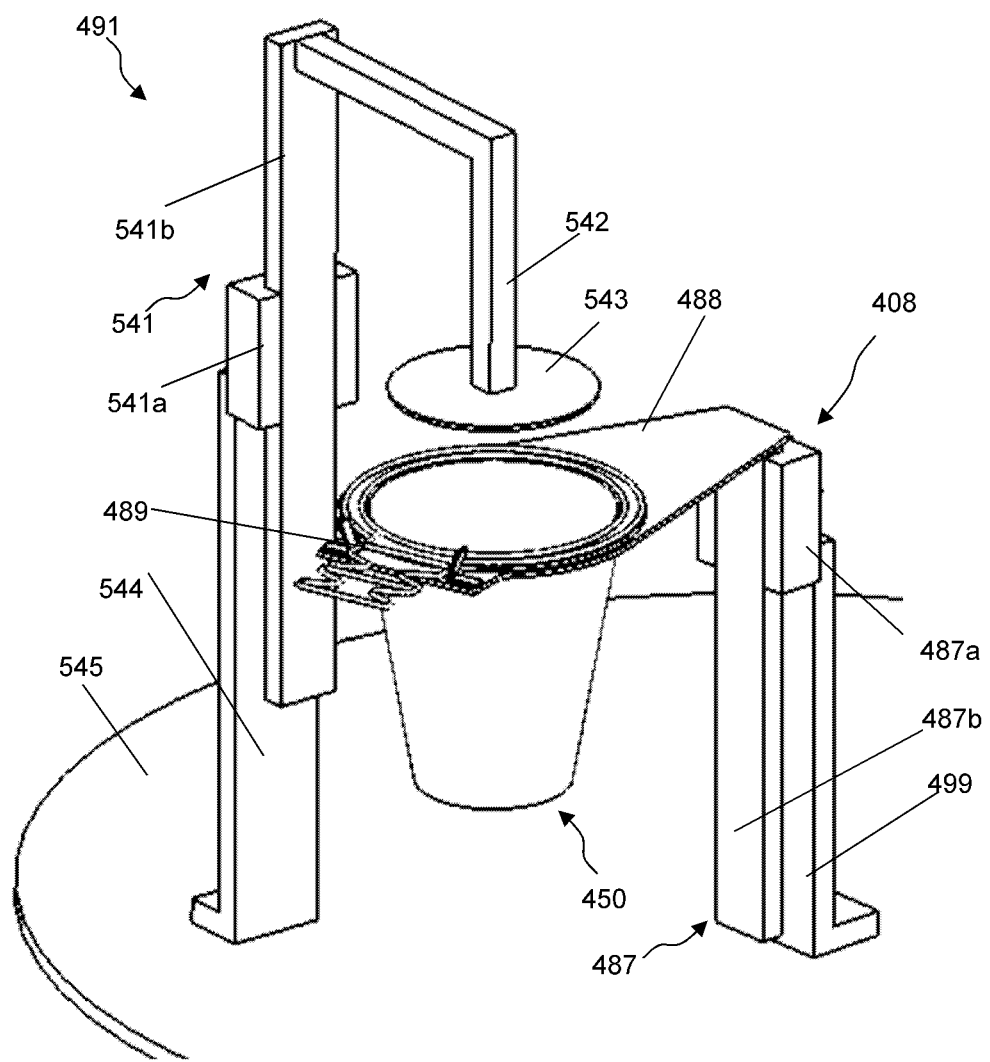
FIG. 20H shows an aerial view of parts of the cooking apparatus.

Referring to FIGS. 20D-20F, a cooking apparatus 430 comprises: a rotatable component 545 comprising a rigid component with a vertical rotational axis; an intermittent motion mechanism 680 comprising a shaft 681 (as a moving member) and a stationary member 683 (as in FIG. 17). The shaft 681 is fixedly connected to the rotatable component 545, so that the intermittent motion mechanism 680 may produce an intermittent cyclic rotation of the rotatable component 545 around the axis of the shaft 681. The axis of the shaft 681 is vertical. The rotatable component 545 may comprise a turntable but this is not a requirement. Sensors (not shown in figures) may be configured to monitor the position of the rotatable component 545 relative to the stationary member and send the information to the computer system 99 of FIG. 1 by known techniques. A plurality of wheels 634 are mounted on a support component 632 which is connected to the ground (the connection is not shown in figures). The wheels 634 are used to touch and provide support to the rotatable component 545.

The cooking apparatus 430 further comprises a plurality of cooking sub-apparatuses 510, each comprising: a liquid container 493 configured to contain a cooking liquid, such as cooking oil or water; a container holder 444 to position or fixedly hold the liquid container 493, wherein the container holder 444 is rigidly or fixedly connected to the rotatable component 545; a movable holder mechanism 408 (as in FIG. 20A); a lid mechanism 491 (as in FIG. 20B); an electric heater 407 (as in FIG. 20D) which is mounted on the rotatable component 545. The linear actuator 487 is referred to as a first motion mechanism or a first actuator; and the linear actuator 541 is referred to as a second motion mechanism or a second actuator. The stationary member 487*a* of said first linear actuator 487 of the movable holder mechanism is rigidly or fixedly connected to the rotatable component 545. The moving member 487*b* of the first actuator 487 and the stationary member 541*b* of said second actuator 541 are configured to be rigidly or fixedly connected to each other. The linear actuator 487 of said linear motion mechanism 408 can move the holder 488 and hence the basket 450 held by said holder 488 between two end-positions: a first end-position which is lower; and a second end-position which is higher. When the holder 488 is at a first end-position (the lower position), said basket 450 is partially immersed in the liquid of a corresponding liquid container 493 and the food or food ingredients held in the basket can be boiled or deep fried. When the holder 488 is at a second end-position (the higher position), the basket 450 is lifted from the liquid container 493. The basket 450 is porous in the sense that a liquid, such as water or oil contained in the basket 450 may leak out when the basket 450 is positioned at said second end-position. The heating device 495 of each electric heater 407 is inserted into a corresponding liquid container 493 as to heat the liquid in the liquid container.

The linear actuator 541 of said lid mechanism 491 can move the lid 543 relative to the holder 488 (and hence relative to a basket 450 held by the holder) between two end-positions: a first end-position which is lower; and a second end-position which is higher. When the lid 543 is moved to the first end-position (the lower position), the lid 543 may cover said basket 450 held by the holder 488. After the holder 488 is moved to the first end-position, said lid 543 is configured to press on the food or food ingredients in said basket 450 so that the food or food ingredients may be entirely immersed into the liquid in the corresponding liquid container 493. This way, the food or food ingredients held in the cooking container can be fully boiled or deep fried. When the lid 543 is moved to a second end-position (the higher position), the lid 543 is sufficiently far away of said basket 450 so there is space for the basket 450 to be moved away from the holder 488.

The movement of said liquid container 493 relative to the rotatable component 545 may be restricted or limited by the container holder 444 when the rotatable component 545 is rotated. In particular, the container holder 444 defines a position to place a liquid container 493. The liquid container 493 can hold a liquid (such as cooking oil or water). The liquid container 493 comprises a heat insulation member 493*a* as to limit heat transfer from the heated liquid.

It should be noted that the cooking sub-apparatus 510 of the cooking apparatus 430 is a deep fryer in case the cooking liquid contained in the liquid container 493 is oil; wherein food or food ingredients can be fried to produce a semi-cooked food. The cooking sub-apparatus can deep fry food or food ingredients in the cooking container 493, which is a basket. If the cooking liquid in the liquid container 493 is water, then food or food ingredients can be boiled to produce a semi-cooked food.

It should be noted that the container holders 444 of the cooking apparatus 430 may be rigidly joined to the rotatable component 545 so that the container holders 444 is a part of the rotatable component.

The container holders 444 may be substituted by other solid of a shape structured to position a basket 450.

It should be noted that the liquid containers 493 can be moved away from the holders 444. The metal boxes 591 (and heating devices 495) can be moved away from the support components 492. It also should be noted the used liquid in each liquid container 493 may be pumped from the liquid container by a corresponding liquid pump.

It should be noted that the support component 683 of the intermittent motion mechanism 680 is referred as to the base support component of the cooking apparatus 430.

It should be noted that the intermittent motion mechanism 680 can produce an intermittent rotation of the rotatable component 545 and the accessories attached on it. The rotation angle in any intermittent rotation is the same.

It should be noted that the heaters 407 may be substituted by another type of heaters, such as gas burners, electric burners, inductive stoves, etc. Any of the known techniques of heating a cooking oil or water contained in a liquid container (such as the liquid container 493) can substitute the heater 407.

It should be noted that in the cooking apparatus 430, the connector 544 of each lid mechanism 491 may be fixedly connected to the rotatable 545 instead of the holder 488 of a linear motion mechanism 408. See FIGS. 20G-20H.

Figure 21:
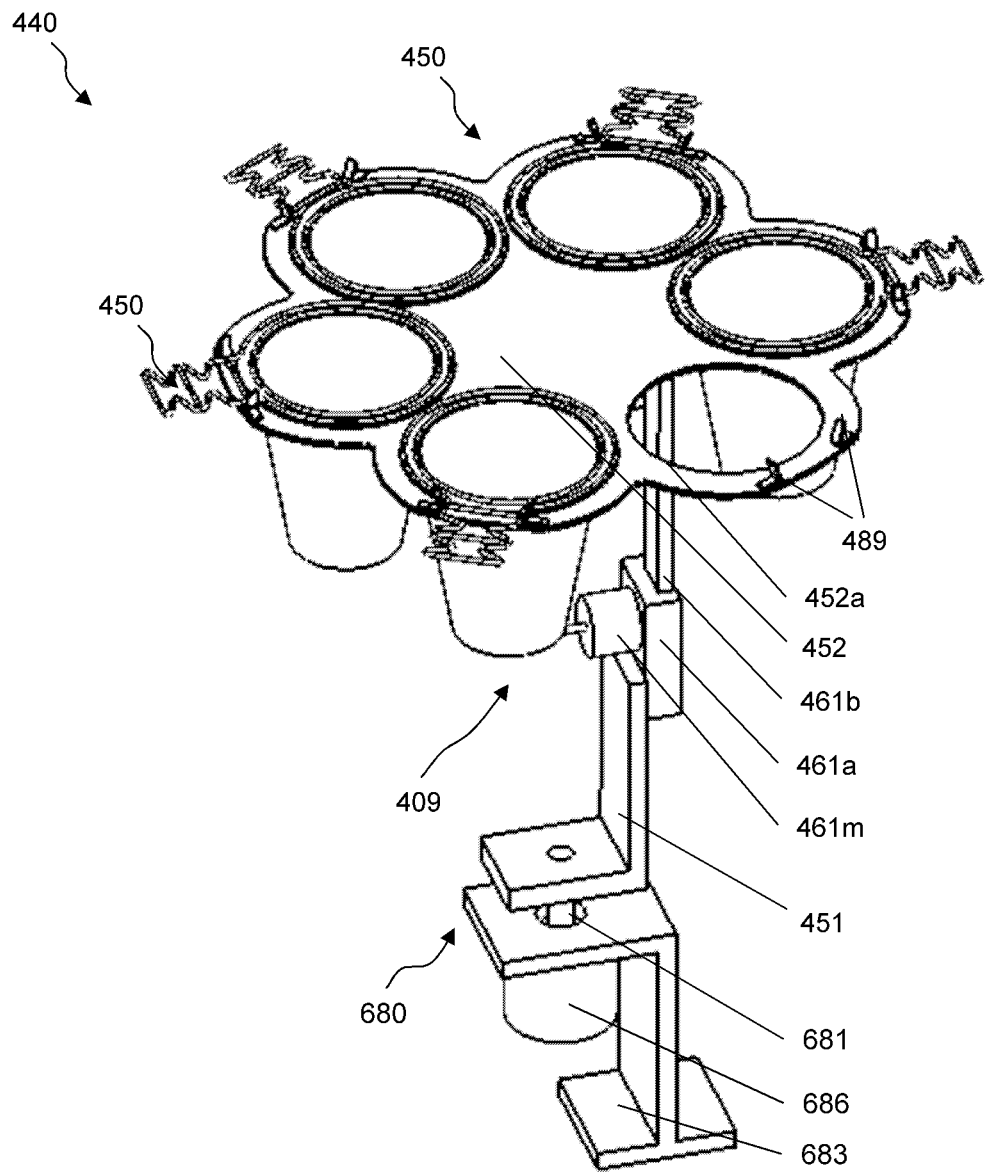
FIG. 21 shows aerial views of a liquid dripping mechanism.
Figure 22A:
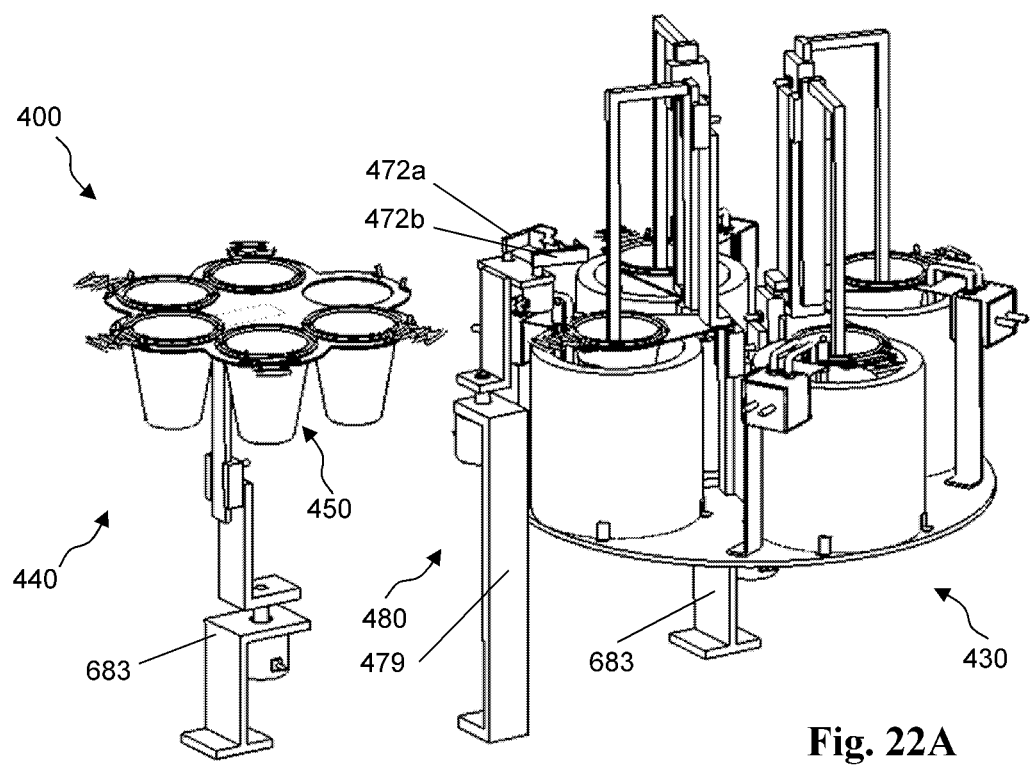
FIGS. 22A-22D show aerial views of a cooking apparatus comprising: a cooking apparatus as in FIG. 20E-20F; a dispensing apparatus as in FIG. 19C; and a liquid dripping mechanism as in FIG. 21A.
Figure 22B:
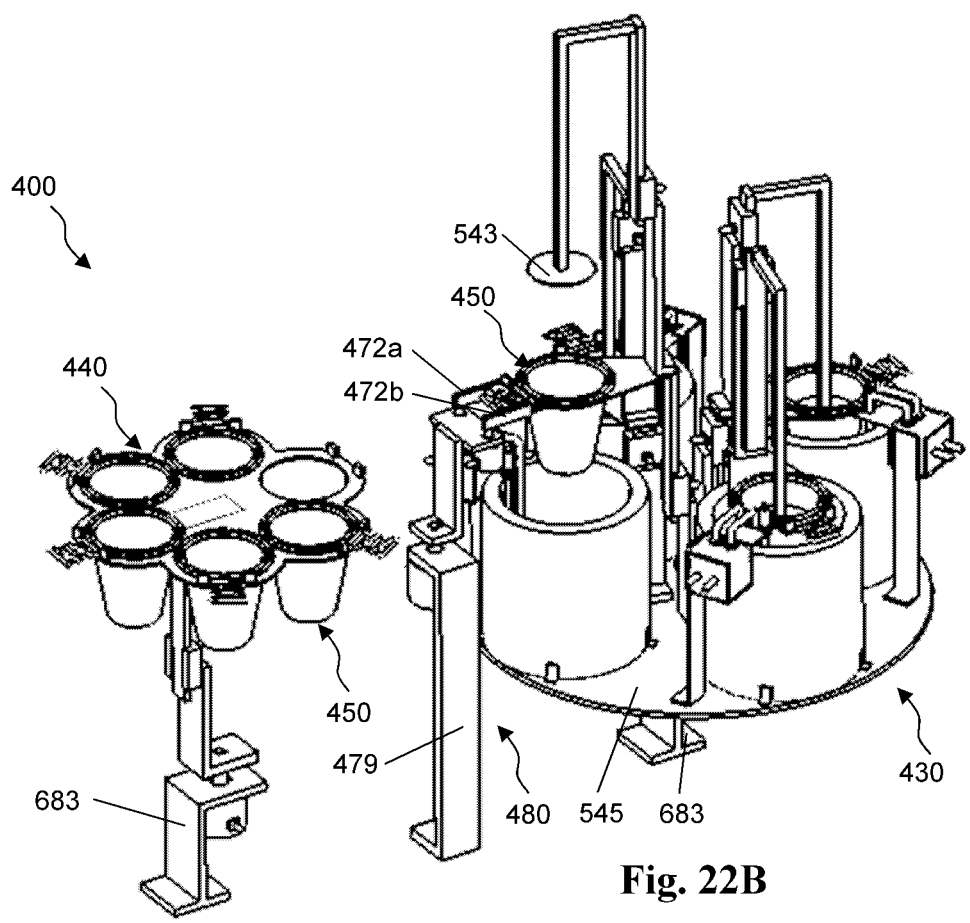
Figure 22C:
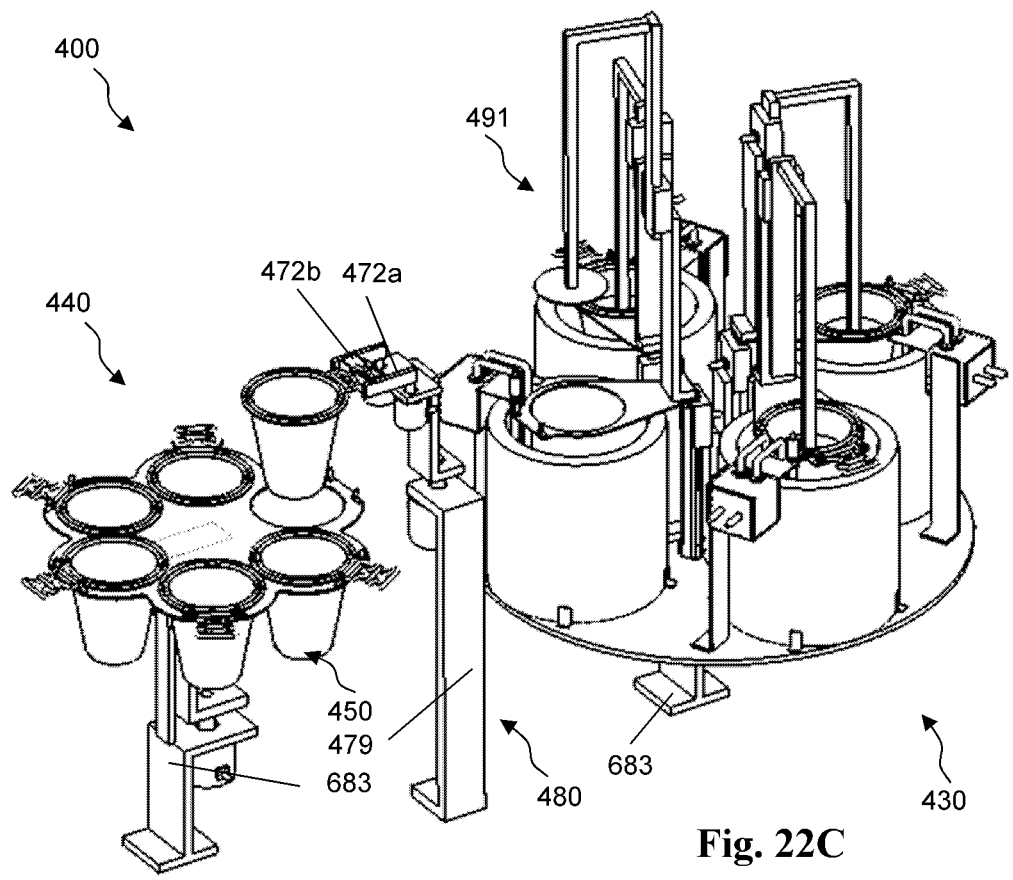
Figure 22D:
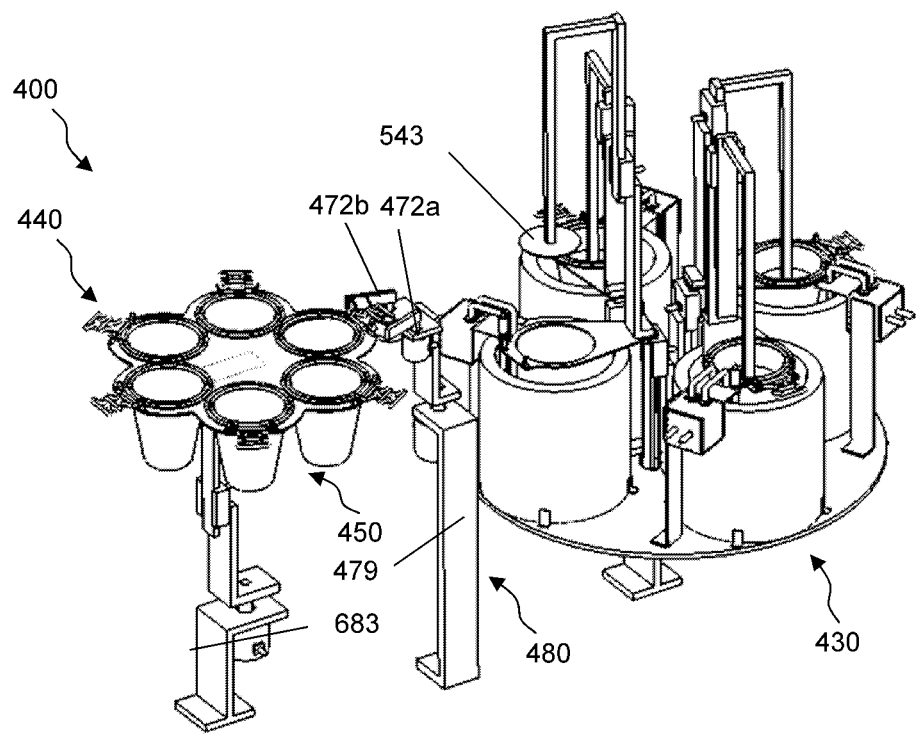
Figure 23:
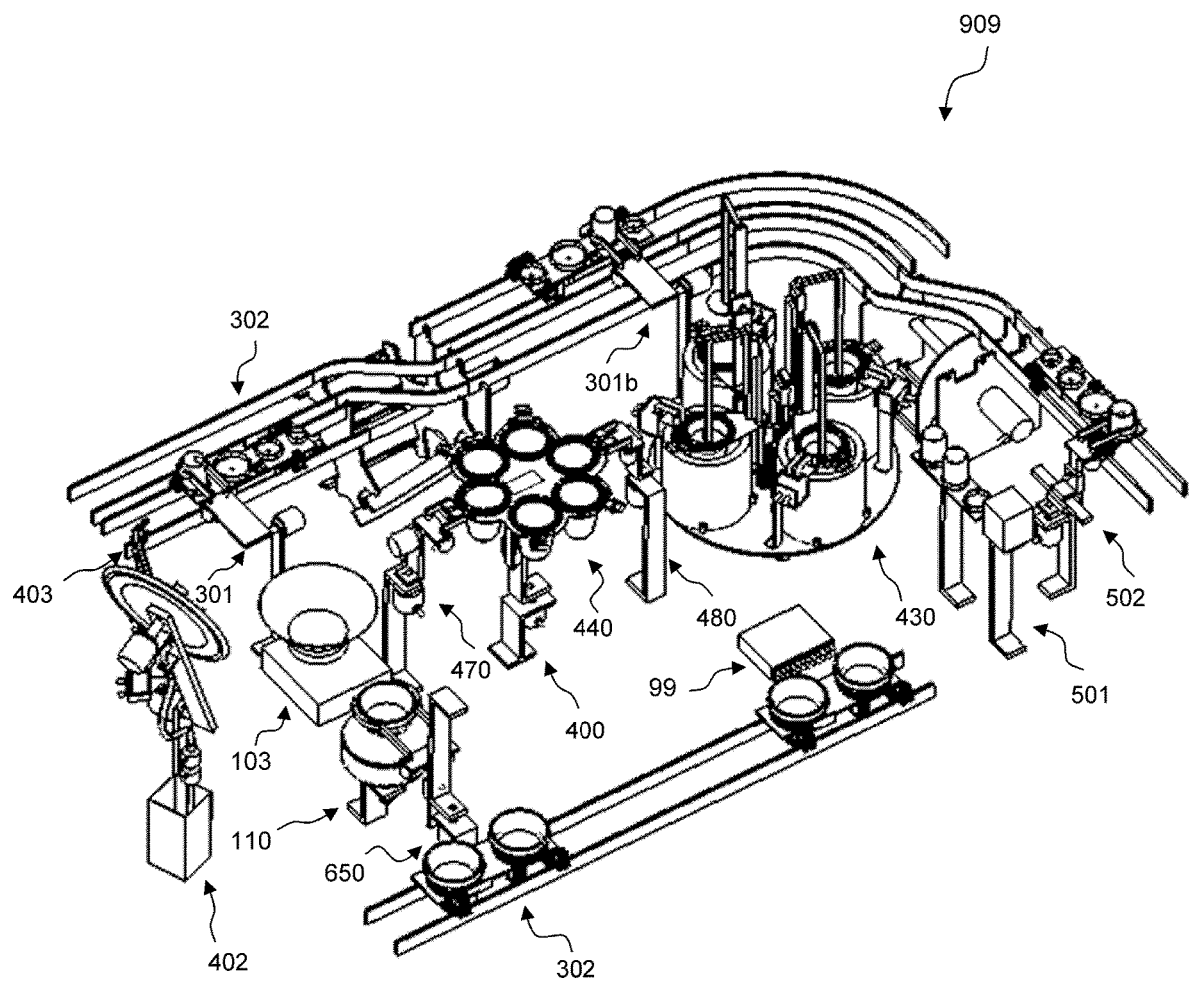
FIG. 23 shows an aerial view of a cooking system.
Figure 24A:
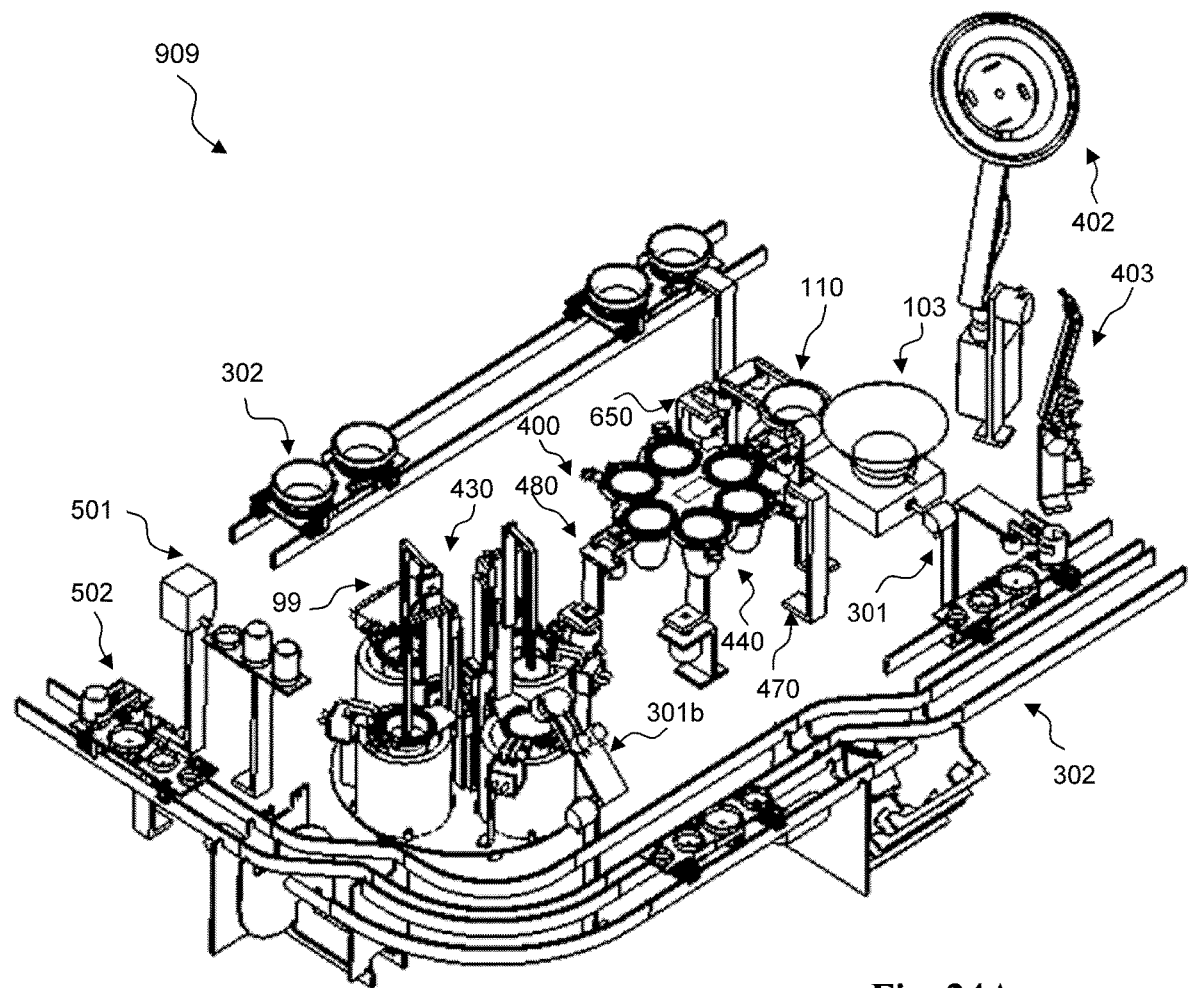
FIG. 24A shows an aerial view of the cooking system (of FIG. 23) showing the dispensing of food ingredients from an ingredient container into a cooking container.
Figure 24B:
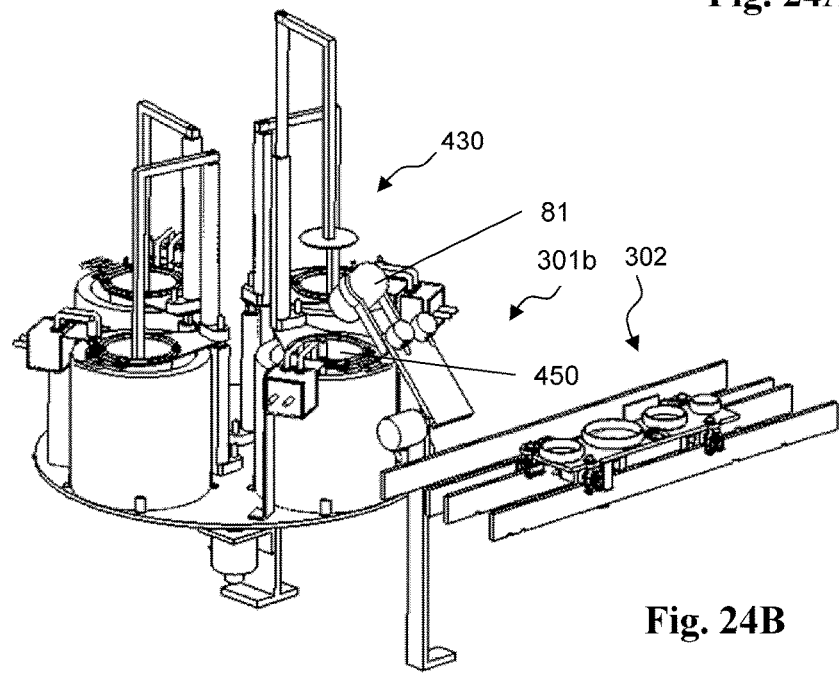
FIG. 24B shows a zoom-in view of the dispensing.
Figure 25A:
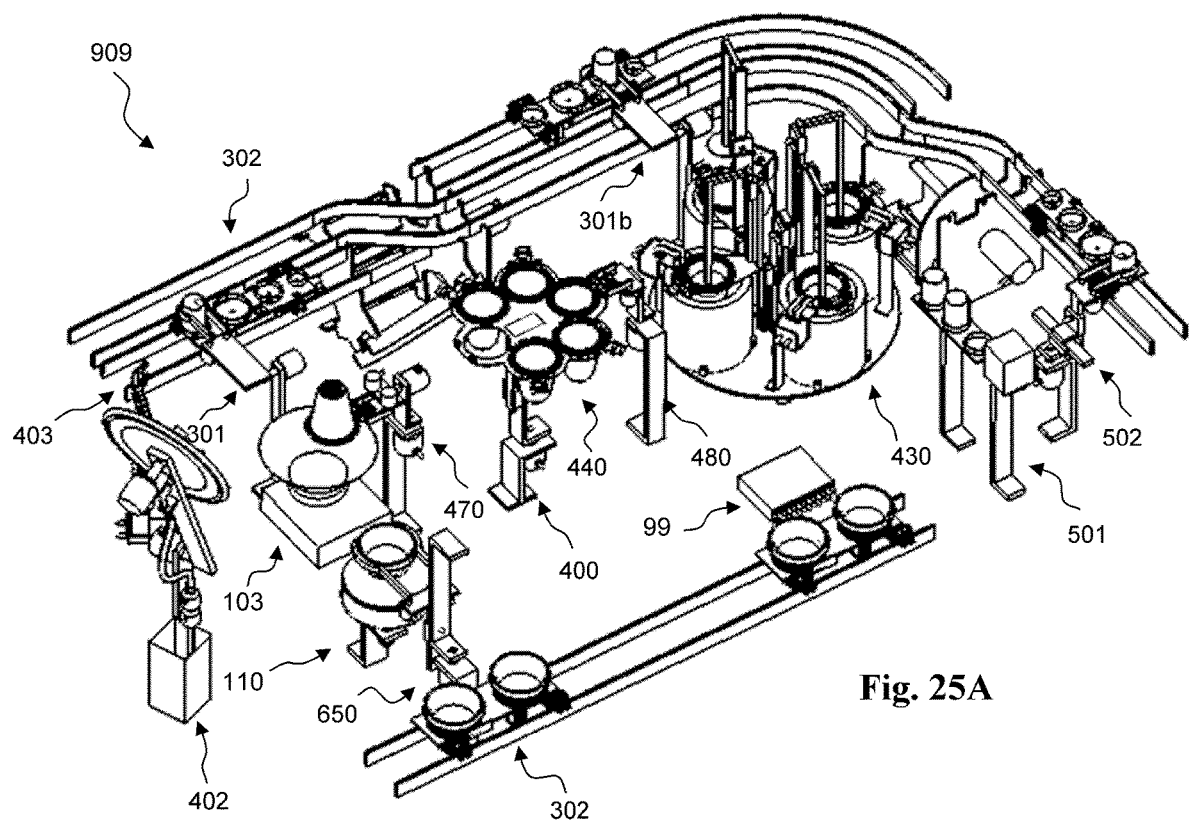
FIG. 25A shows an aerial view of the cooking system (of FIG. 23) showing the dispensing of semi-cooked food into the cookware of the cooking system of FIG. 23.
Figure 25B:
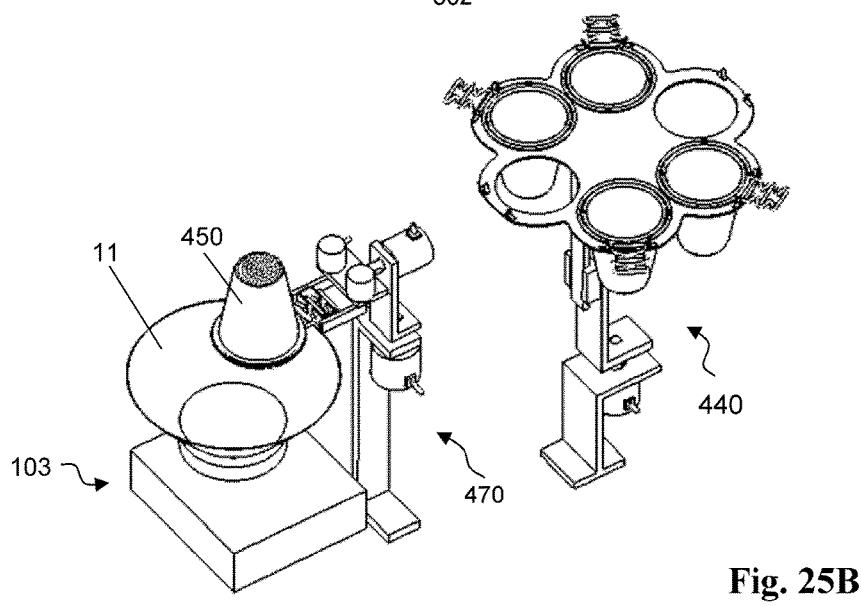
FIG. 25B shows a zoom-in view of the dispensing.

Referring to FIG. 21, a liquid dripping mechanism 440 comprises an intermittent motion mechanism 680 comprising a shaft 681 (as a moving member) and a stationary member 683 (as in FIG. 17). The intermittent motion mechanism 680 may produce an intermittent cyclic rotation of the shaft 681 around the axis of the shaft 681. The axis of the shaft 681 is vertical.

The liquid dripping mechanism 440 further comprises: a vertical linear motion mechanism 409; and a rotatable component 452 comprising a vertical rotational axis. The rotatable component 452 comprises a plurality of holders 452a each of which can position or otherwise hold a basket 450. Corresponding to each holder 452a, two restraining devices 489 are fixedly connected to the rotatable component 452, said restraining devices 489 are configured to restrict or limit the movement of the handle 471 of a basket 450 held by the corresponding holder. The vertical linear motion mechanism 409 comprises: a moving member 461b; a motor 461m; and a stationary member 461a. The motor 461m is configured to produce a movement the moving member vertically relative to the stationary member 461a. The rotatable component 452 is fixedly connected to the moving member 461b, so that motor 461m is configured to move the rotatable component 452 and the components attached on it vertically relative to the stationary member 461a between two end-positions: a first end-position which is lower; and a second end-position which is higher. The motor 461m is connected to the computer system 99 of FIG. 1 by wires and the computer system can control the timing and speed of the motor 461m.

The shaft 681 of the intermittent motion mechanism 680 is rigidly, fixedly or otherwise connected to the stationary member 461a of the vertical linear motion mechanism 409 via a connector 451, so that the intermittent motion mechanism 680 may produce a cyclic intermittently rotation of the stationary member 461a and the rotatable component 452 around the axis of the shaft 681. The rotatable component 452 may comprise a turntable but this is not a requirement.

It should be noted that the holders 452a of the rigid component 452 are optionally configured to be cyclically and symmetrically positioned around the axis of the shaft 681.

It should be noted that the support component 683 of the intermittent motion mechanism 680 is referred as to the base support component of the cooking apparatus 440.

It should be noted that the intermittent motion mechanism 680 may produce an intermittent rotation of the stationary member 461a and the accessories attached on it. The rotation angle in any intermittent rotation is the same.

It should be noted that in the cooking apparatus 430 and the liquid dripping mechanism 440, the cooking containers 450 may be substituted by baskets 450b.

Referring to FIGS. 22A-22D, a cooking apparatus 400 comprises: a cooking apparatus 430 (as in FIGS. 20C-20D); a transfer apparatus 480 (as in FIG. 19B); and a liquid dripping mechanism 440 (as in FIG. 21). The relative positions of the support component of the cooking apparatus 430, the support component of the transfer apparatus 480 and the support component of the liquid dripping mechanism 440 are fixed. After the grippers 472a and 472b of the transfer apparatus 480 are rotated to the second end-position, the support component 475 of the transfer apparatus 480 is rotated to the first end-position, the holders 488 are moved to the second end-position, and the corresponding lid 543 is moved to the second end-position, the grippers 472a and 472b of the transfer apparatus 480 may be rotated to the first end-position to grip and hold a basket 450 which is held by a said holder 488. See FIGS. 22A-22B. Then the holder 488 is moved to the first end-position and the basket 450 is held only by the grippers 472a and 472b. Then the rotational mechanism 404 of the transfer apparatus 480 can rotate said basket 450 to the second end-position which is right above of a container holder 452a of the liquid dripping mechanism 440, while the rotatable component 452 and said holder 452a are at the first end-position (lower position). See FIG. 22C. Then, the holder 452a and the rotatable component 452 are moved to the second end-position; and the basket 450 is placed on said holder 452a. Then the grippers 472a and 472b are rotated to the second end-position as to release said basket 450 to the holder 452a. See FIG. 22D.

It should be noted that the above movements can be reversed so that a basket 450 held by a holder 452a of the filtering mechanism 440 can be moved to a holder 488 in the cooking apparatus 430.

It should be noted that the transfer apparatus 480 in the cooking apparatus 400 may be substituted by other type of transfer apparatus comprising a gripping mechanism and a motion mechanism, e.g., by the transfer apparatus 480b of FIG. 19D.

In the cooking apparatus 400, after the rotatable component 545 of the cooking apparatus 400 is rotated by the motor 686 to a working position, one or more of the following processes may be completed: (1) a linear actuator 487 moves a corresponding basket 450 which is held by the container holder 488 corresponding to said linear actuator 487 to the first end-position so that an ingredient dispensing apparatus 301b may dispense food ingredients into the basket 450; (2) said linear actuator 487 keeps the basket 450 to the first end-position; the corresponding linear actuator 541 moves the lid 543 to the first end-position as to press the food or food ingredients in said basket 450 immersed into the liquid of the corresponding liquid container 493 and said food ingredients can be boiled or deep fried as to produce a semi-cooked food; (3) said linear actuator 541 moves the lid 543 to the second end-position and then said linear actuator 487 moves said basket 450 to the second end-position so that the transfer apparatus 480 can grip and hold the basket 450. (4) after said linear actuator 487 moving the holder 488 to the first end-position, the transfer apparatus 480 moves said basket 450 to a holder 452a of the liquid dripping mechanism 440, and then the transfer apparatus 480 moves an empty basket 450 from the liquid dripping mechanism 440 to said holder 488, while the corresponding lid 543 is kept at the second end-position.

It should be noted that the type of food ingredients that can be cooked by the cooking apparatus 400 must be suitable for deep frying in heated oil or suitable for boiling in hot water. For example, they can be solid ingredients with sufficiently big diameter, bigger than the holes at the bottom of the baskets 450. Powder ingredients are usually undesirable for the cooking apparatus 400 and they may get leaked out from the baskets.

In some embodiments, referring to FIGS. 23-27, a cooking system 909 comprises: a liquid dispensing mechanism 403 (as in FIGS. 7A-7B); a cookware cleaning mechanism 402; a transport system 302 (as shown in FIG. 9A, FIG. 14B, and FIGS. 16A-16E); a cooking apparatus 110 (as in FIGS. 6B-6C). In the cooking apparatus 110, the ingredient dispensing apparatus 301 is positioned next the cooking apparatus 103, as to dispense food ingredients into the cookware 11 of the cooking apparatus 103; the transfer apparatus 650 is positioned next the cooking apparatus 103 as to receive the cooked food dispensed from the cookware 11 of the cooking apparatus 103. The liquid dispensing mechanism 403 may dispense liquid ingredients into the cookware 11. The cookware cleaning mechanism 402 is positioned next to the cooking apparatus 103 and may clean the cookware 11. See U.S. patent application Ser. No. 17/069,707 for more details of the cleaning apparatus 402. The entire contents of the application are hereby incorporated herein.

The cooking system 909 further comprises: a cooking apparatus 400 (as in FIGS. 22A-22D); an ingredient dispensing apparatus 301b; and a dispensing apparatus 470 (as in FIG. 19C); wherein the ingredient dispensing apparatus 301b is a copy of the ingredient dispensing apparatus 301 but is positioned next the cooking apparatus 430 of the cooking apparatus 400. The part numbers in the mechanism 301b are the same as the corresponding parts of the mechanism 301. The ingredient dispensing apparatus 301b is configured to dispense food ingredients into one of the cooking containers 450 of the cooking apparatus 430. The dispensing apparatus 470 is positioned between the cooking apparatus 103 and the liquid dripping mechanism 440 of the cooking apparatus 400, as to dispense semi-cooked food from a basket 450 on the holder 452a of liquid dripping mechanism 440 into the cookware of the cooking apparatus 103.

The cooking system 909 further comprises: a transfer apparatus 502 (as in FIG. 11); a storage apparatus 501 (as in FIG. 12); and a computer system 99 (as in FIG. 1). The transfer apparatus 502 may load an ingredient container 81 (which contains or otherwise holds food ingredients) from the storage apparatus 501 to a vehicle 790 in the transport system 302. The vehicle 790 may move the ingredient container to a location next to the cooking apparatuses as to be gripped and held by the dispensing apparatus of the corresponding cooking apparatus. The timing of arrival of the vehicle 790 at said location is controlled by the computer system 99.

When a basket 450 of the cooking apparatus 430 is at a certain position relative to the support component 349 of the ingredient dispensing apparatus 301b, and when the corresponding basket 450 is at the second end-position, the grippers of the ingredient dispensing apparatus 301b may be moved to grip an ingredient container 81 containing or otherwise holding solid food ingredients; and then the grippers and the ingredient container 81 can be rotated (by the motor 348) as to dispense the food ingredients into said basket 450. See FIGS. 24A-24B. Then, the solid food ingredients can be boiled or deep fried by a heated liquid in the corresponding liquid container 493 as to produce a semi-cooked food.

After the basket 450 of the cooking apparatus 430 is rotated by the motor 686 to a certain position (relative to the stationary member 479 of the transfer apparatus 480), the corresponding linear actuator 487 moves the basket 450 to the second end-position, and the corresponding lid 543 is moved to the second end-position, the transfer apparatus 480 can grip and hold said container 450. After said linear actuator 487 moves the holder 488 to the first end-position, the transfer apparatus 480 moves said basket 450 to a holder 452a of the liquid dripping mechanism 440. See FIGS. 22A-22D. Then the transfer apparatus 480 moves an empty basket 450 from the liquid dripping mechanism 440 to said holder 488.

After the basket 450 of the liquid dripping mechanism 440 is rotated by the motor 686 to a certain position (relative to the stationary member 485 of the dispensing apparatus 470), the dispensing apparatus 470 can grip and hold said basket 450. Then the rotatable component 452 is moved to the first end-position and the basket 450 is held only by the grippers 472a and 472b of the dispensing apparatus 470. Then the dispensing apparatus 470 moves said basket 450 to a position above the cookware 11 and turn the basket 450 as to dispense a semi-cooked food in the cooking container into the cookware 11. See FIGS. 25A-25B.

Figure 26A:
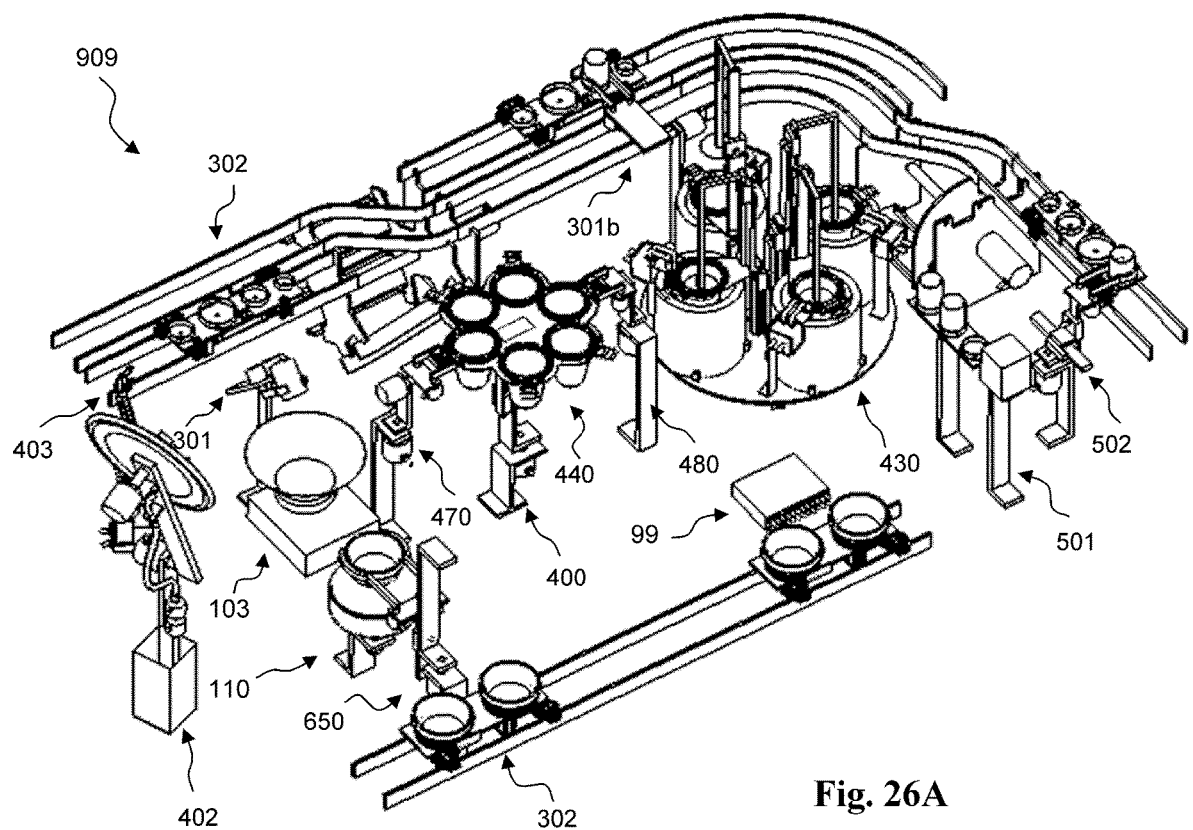
FIG. 26A shows an aerial view of the cooking system (of FIG. 23) showing the dispensing of food ingredients from an ingredient container into the cookware.
Figure 26B:
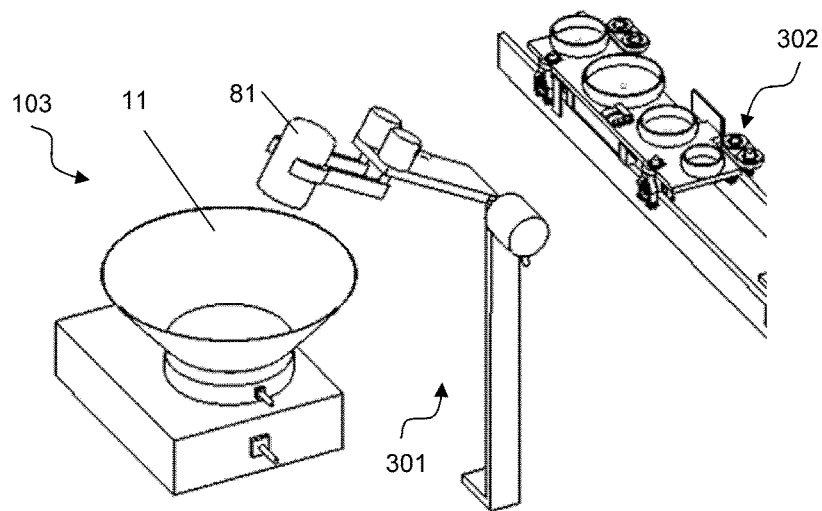
FIG. 26B shows a zoom-in view of the dispensing.
Figure 27:
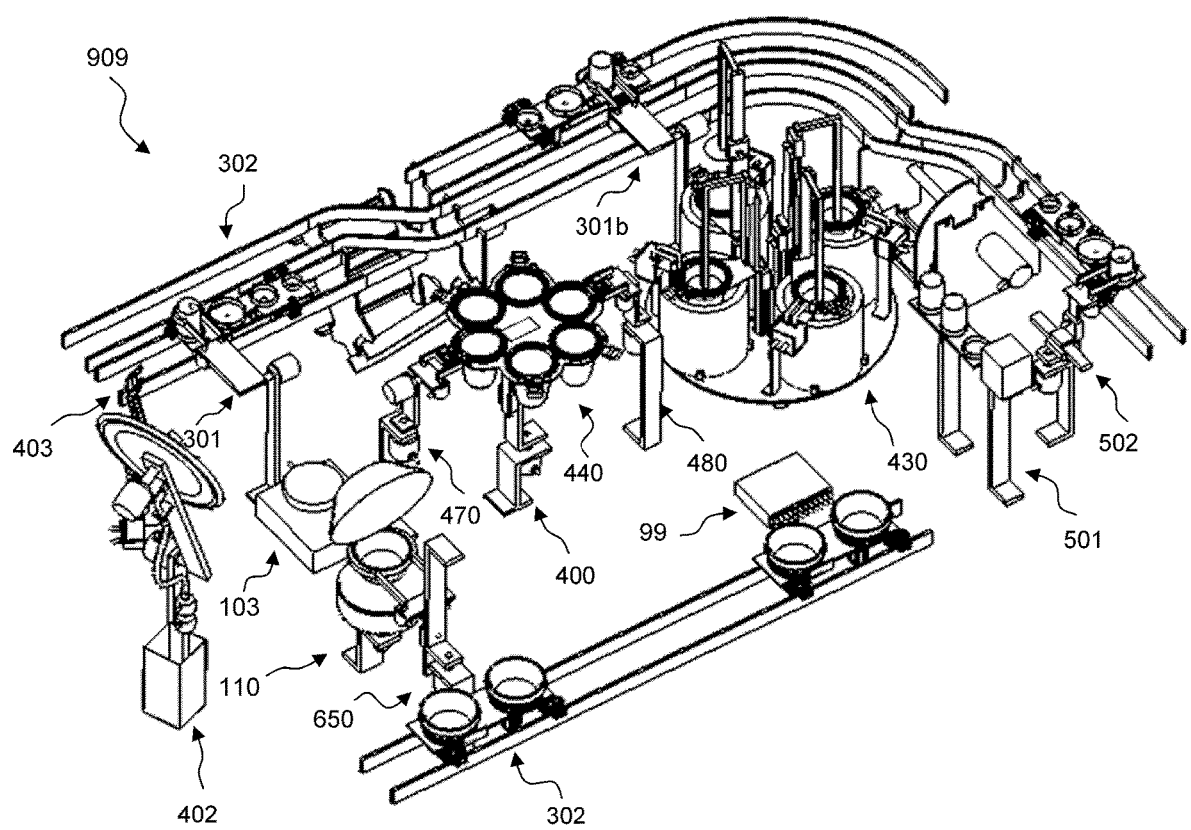
FIG. 27 shows the dispensing of a cooked food from the cookware to a food container in the cooking system of FIG. 23.

The ingredient dispensing apparatus 301 can grip and hold an ingredient container 81 on a vehicle 790 (which is moved to a dispensing position relative to the support component 349) and then rotate the ingredient container 81 around the axis of the shaft 347 as to dispense the food ingredients from the ingredient container 81 into the cookware 11. See FIGS. 26A-26B. Said food ingredients, in combination with the semi-cooked food dispensed from the cooking apparatuses 400, are further cooked by the cooking apparatus 103 to make a cooked food. As shown in FIG. 26B (also see FIG. 6C), said cooked food is dispensed into a food container 182 gripped by the transfer apparatus 650. Then, the transfer apparatus 650 loads the food container 182 to a vehicle 640 which is moved to a certain position relative to the support component 678. Then, the vehicle 640 moves the food container 182 to a location that is closer to customers.

It should be noted that the dispensing apparatus 470 in the cooking system 909 may be substituted by other type of dispensing apparatus comprising a gripping mechanism and a motion mechanism, e.g., by the dispensing apparatus 470b of FIG. 19E. The motion mechanism can turn a gripped food container by some angular degrees, usually between 90 and 180 degrees.

It should be noted that the 3-dimensional positioning of the mechanisms and apparatuses in the cooking system 909 can be done in various ways. For example, the transfer apparatus 650, the ingredient dispensing apparatus 301, the liquid dripping mechanism 440 may be respectively positioned on the Southern, Northern and Eastern sides of the cookware 11 of the cooking apparatus 103; and the cookware cleaning mechanism 402, or the liquid dispensing mechanism 403 may be positioned in the Southwestern, or respectively Northwestern side of the cookware 11. The cooking apparatus 430 may be positioned on the Eastern side of the liquid dripping mechanism 440. The ingredient dispensing apparatus 301b may be positioned on the Northern side of the cooking apparatus 430. The dispensing apparatus 470 is positioned between the cooking apparatus 103 and the liquid dripping mechanism 440. The transfer apparatus 480 is positioned between the liquid dripping mechanism 440 and the cooking apparatus 430. The transfer apparatus 502 and the storage apparatus 501 may be positioned on the Southeastern side of the cooking apparatus 103.

The computer system 99 is connected to the mechanisms and devices 103; 301; 301b; 402; 460; 501; 502; 650; 480; 420; 430 and 440. The computer system 99 is also connected to the transport system 302 as to control the movements of the vehicles of the transport system 302.

As shown in Referring to FIG. 28A, the following tasks are performed by the computer system 99 prior to the operation of the cooking system 909.

In Step 921, the computer system 99 stores (in the computer system's memory) a program, configured to send or receive signals to and from the motion mechanisms, inductive stoves, temperature sensors and pumps of the cooking system 909.

In Step 922, a database is installed in the computer system 99.

In Step 923, each of the cooking apparatuses, receiving apparatus, ingredient dispensing apparatuses, cookware cleaning mechanism, food dispensing apparatus, transfer apparatus, transport system is assigned a unique ID. The computer system 99 stores the IDs of these apparatuses and mechanisms.

In Step 924, the computer system 99 stores the information of the structure of each vehicle of the transport system 302, including the ingredient container types that can be placed on the holders of the vehicle 790.

In Step 925, the computer system 99 stores a program for controlling the transport system 302. The program may be used to control a vehicle 790 so that the vehicle 790 may move and stop at a pre-scheduled time at a position near a cooking apparatus of the cooking system 909, where an ingredient container on a given holder of the vehicle 790 is at a dispensing position relative to the cooking apparatus. The program may be used to control a vehicle 640 so that the vehicle 640 may move and stop at a pre-scheduled time at a position near a transfer apparatus 650 of the cooking system 909, where the container holders of the vehicle 640 are at a transferring position near the transfer apparatus 650.

In Step 926, the computer system 99 stores a list of food items which may be cooked by the cooking system 909.

In Step 927, for each food item in the list of Step 926, the computer system 99 stores a cooking program configured to control the motion mechanisms, inductive stoves, pumps, and devices in the cooking system 909.

In Step 928, for each food item in the list of Step 926, the computer system 99 stores types and quantities of food or food ingredients, relative timing of their dispensing and the respective ID of the destination cooking apparatus for each ingredient to be dispensed into; wherein the relative timing refers to the timing relative to the timing of the program of Step 927 corresponding to the food item. Food ingredients contained in an ingredient container is to be dispensed into a cookware or a cooking container.

As shown in FIG. 28B, the following tasks are routinely performed by the computer system 99 during the operation of the cooking system 909.

In Step 931, the computer system 99 takes an order of a food item. The order may be placed by a human either at the computer system 99, or at a computer which sends the order to the computer system 99.

In Step 932, for the ordered food item of Step 931, the computer system 99 finds the information on the types and quantities of the ingredients needed for cooking the ordered food item. Such information was stored by the computer system 99 in Step 928.

In Step 933, the computer system 99 locates the ingredient containers that contain the food ingredients found in Step 932. The food ingredients may be dispensed from some larger containers into said ingredient containers. Alternatively, food ingredients may already be in the ingredient containers, and their locations had been stored in the memories of the computer system 99.

In Step 934, the computer system 99 schedules the cooking of the ordered food item at the cooking system 909. The schedule includes the timing for running the program of Step 927 corresponding to the ordered food item. The schedule also includes the timing of dispensing of the food ingredients from each ingredient container into a respective cooking container or a cookware of the cooking system 909, in accordance to the stored information by the computer system 99 in Step 928.

In Step 935, the computer system 99 controls the transport system 302 so that each ingredient container of Step 932 may be moved and stopped per the schedule of Step 934.

In Step 936, the computer system 99 runs the program of Step 927 corresponding to the ordered food item, according to the schedule of Step 934, as to send or receive signals to or from the motion mechanisms, inductive stoves, temperature sensors and pumps of the cooking system 909.

After all these steps, the cooking of the food item, including dispensing of the cooked food to a food container, is complete.

It should be noted that the transport system 302 in the above cooking systems may comprise a single connected system or a plurality of disconnected sub-systems. The transport system may comprise different types of vehicles. The ingredient containers may be configured differently for different types or quantities of ingredients.

It should be noted that the transport system 302 may be substituted by other transport system to move ingredient containers; e.g., a transport system comprising a cyclic motion mechanism, a turntable, a chain fixed to chair wheels, a robot arm, or a conveyor mechanism, etc.

The transport system may be substituted by any transport system disclosed in U.S. patent application Ser. Nos. 16/517,705 and 16/997,933. The Entire contents of the applications are incorporated herein by reference.

In the cooking systems 909, the ingredient dispensing apparatus 301 and 301b may be configured differently. The container holders 785a of the transport system 302 which are next to different ingredient dispensing apparatuses may be configured to have different sizes. The ingredient containers 81 on different holders may be configured to have different sizes. The transport system 302 may comprise two or more sub-systems which are not connected with each other, and the vehicles may be configured differently on different sub-systems.

The ingredient dispensing apparatuses 301 and 301b may be combined into one. The ingredient dispensing apparatuses may be substituted by mechanisms each comprising a robot arm.

The dispensing apparatus 470 and the transfer apparatuses 480 and 650 may also be substituted by mechanisms each comprising a robot arm.

Figure 29A:
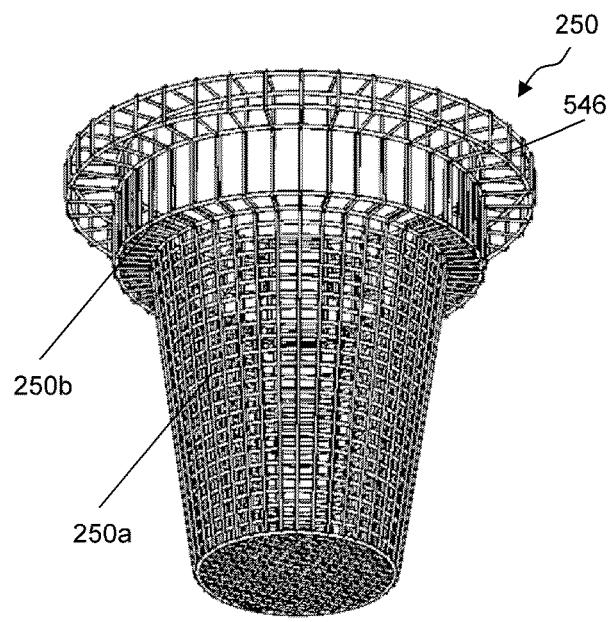
FIGS. 29A-29B show aerial views of a cooking container with a porous bottom.
Figure 29B:
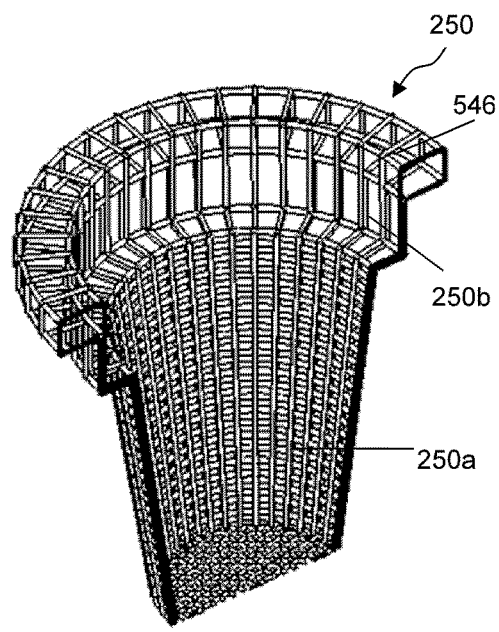

Referring to FIGS. 29A-29B, a basket 250 comprises a mesh 250a (in the shape of a truncated cone with a bottom), a ring-shaped step 250b, and an edge 546. The (mesh 250a of the) basket 250 may hold food or food ingredients.

Figure 30A:
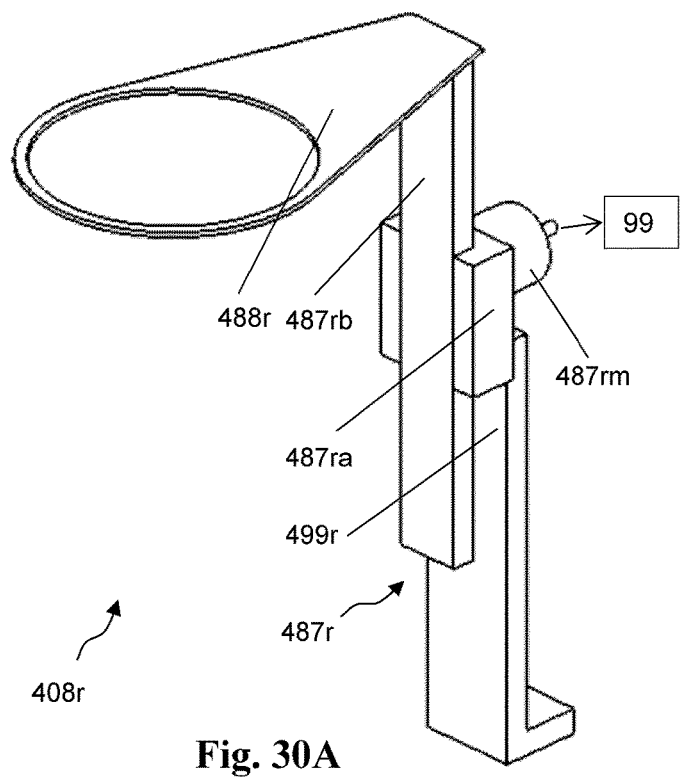
FIG. 30A shows an aerial view of a movable holder mechanism.

Referring to FIG. 30A, a movable holder mechanism 408r comprises: a linear actuator 487r as a linear motion mechanism, the linear actuator 487r comprising a moving member 487rb, a stationary member 487ra, and a motor 487rm configured to move the moving member relative to the stationary member between two end-positions; and a holder 488r comprising a solid shape configured to position or hold a basket 250 wherein the solid shape may touch a bottom part of the ring-shaped step 250b. The moving member 487rb of the motion mechanism 487r is rigidly or fixedly connected to the holder 488r, so that the motion mechanism 487r can move the holder 488r relative to the base component 487ra between two end-positions. The motion mechanism 487r is connected to the computer system 99 of FIG. 1 via wire or wireless means and the computer system 99 may control timings and speeds of the produced motion.

The movable holder mechanism 408 in the cooking apparatus 430 of the cooking system 909 may be substituted by the movable holder mechanism 408r.

Figure 30B:
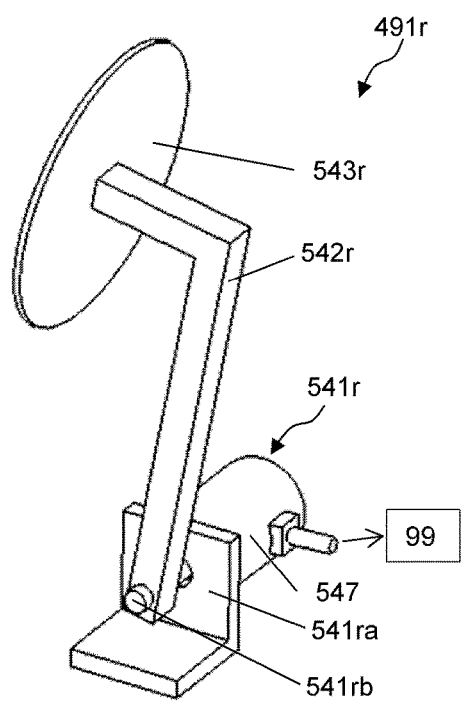
FIG. 30B shows an aerial view a movable lid mechanism.

Referring to FIG. 30B, a lid mechanism 491r comprises: a lid 543r; and a rotational motion mechanism 541r comprising a base component 541ra as a stationary member, a moving member 541rb, and a motor 547 configured to rotate the moving member relative to the stationary member between two end-positions. The lid 543r has a round shape, matching the shape of the ring-shaped step 250b of the basket 250. The moving member 541rb is fixedly connected to the lid 543r via a connector 542r, so that the motion mechanism 541r can rotate the lid 543r relative to the base component 541ra between two end-positions. The motion mechanism 541r is connected to the computer system 99 of FIG. 1 via wire or wireless means and the computer system 99 may control timings and speeds of the produced motion.

Figure 30C:
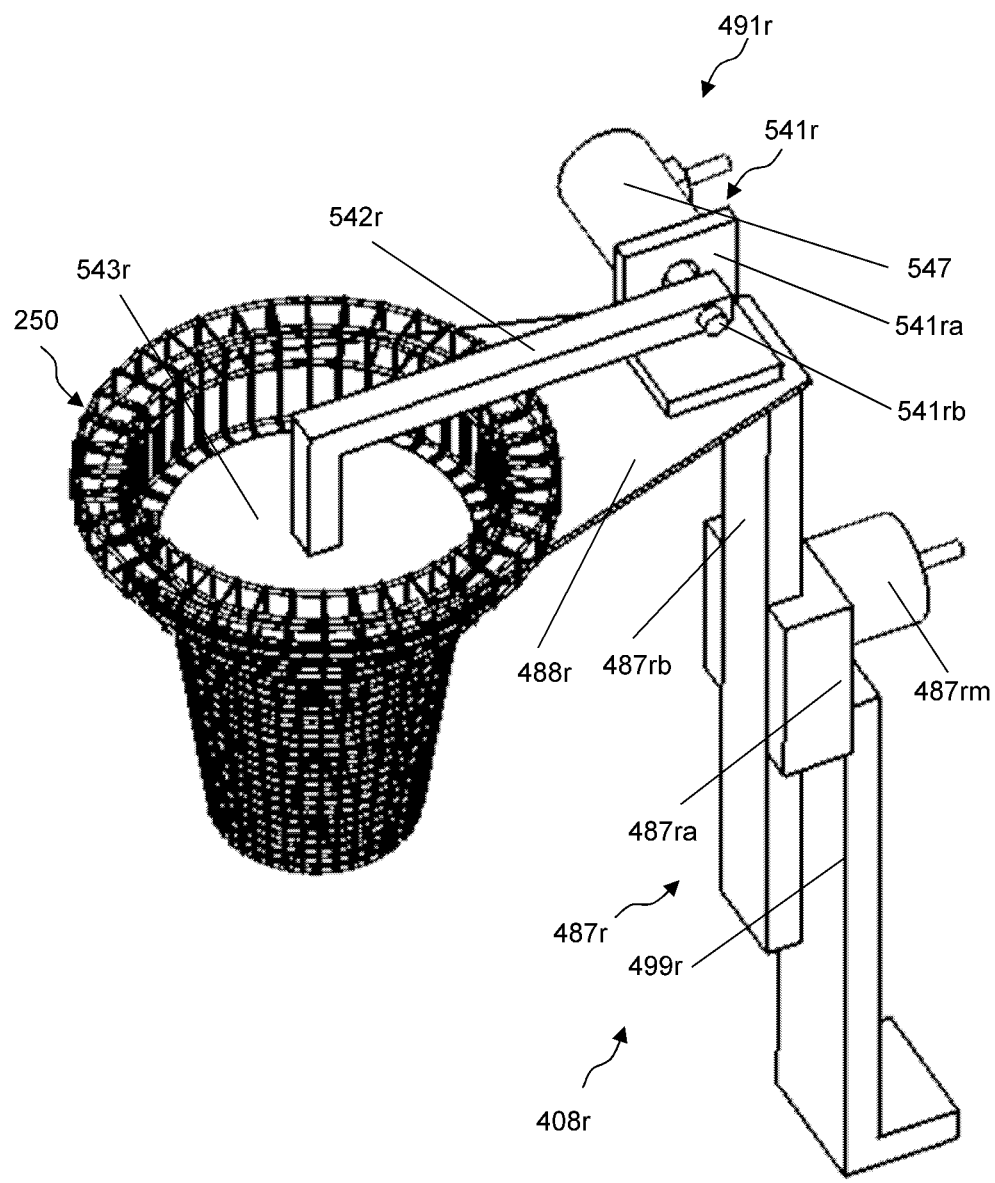
FIG. 30C shows an aerial view of both movable holder mechanism and movable lid mechanism.

The lid mechanism 491 in the cooking apparatus 430 of the cooking system 909 may be substituted by the lid mechanism 491r. See FIG. 30C.

It should be noted that the lid 543 or 543r may optionally comprise a net, a mesh, or a flat board with holes.

It should be noted that the baskets 450, 450b, and 250 are special cases of cooking containers.

Figures 31, 32:
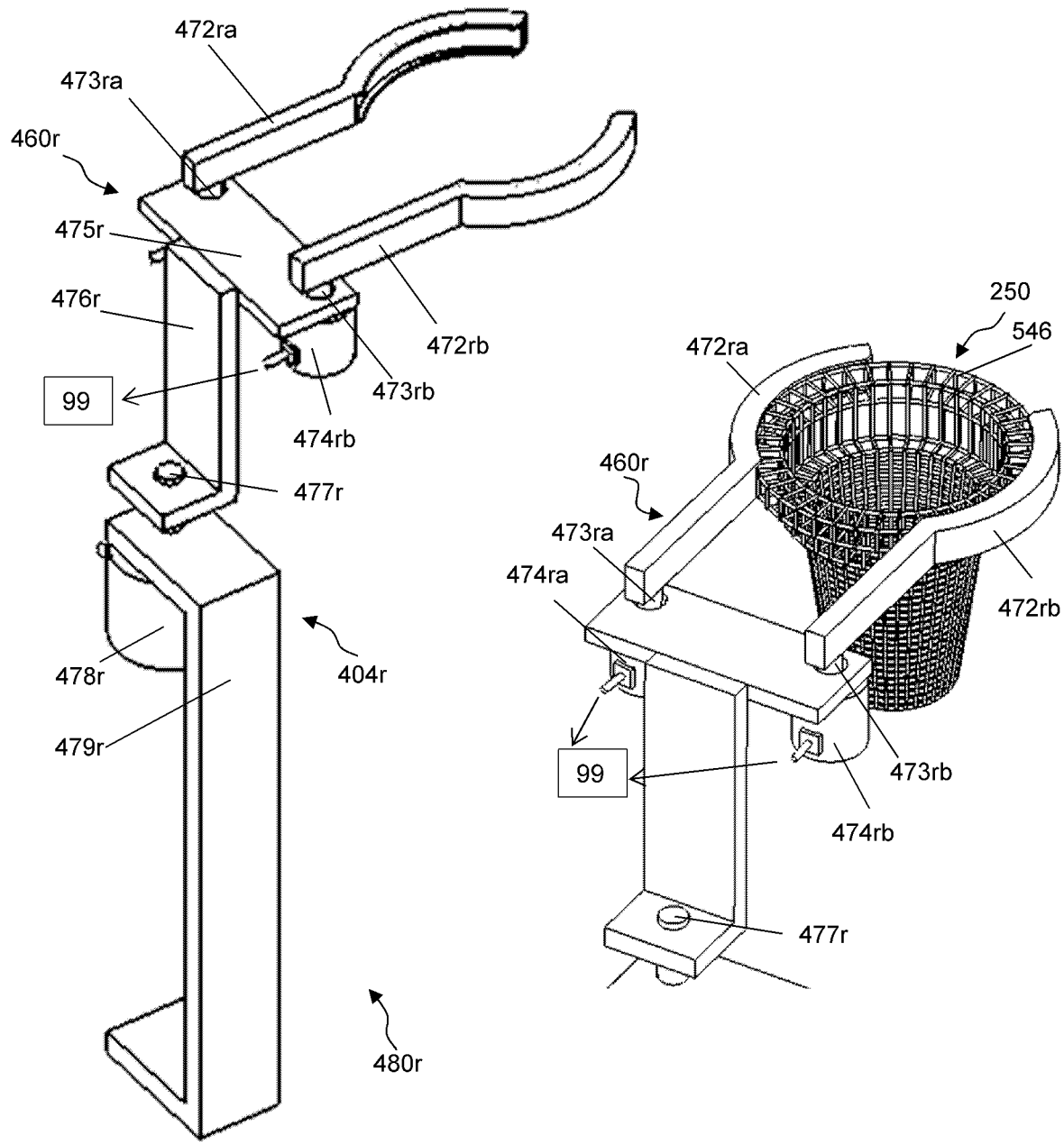
FIG. 31 shows an aerial view a transfer apparatus.
FIG. 32 shows an aerial view of parts of the transfer apparatus.
Figure 33:
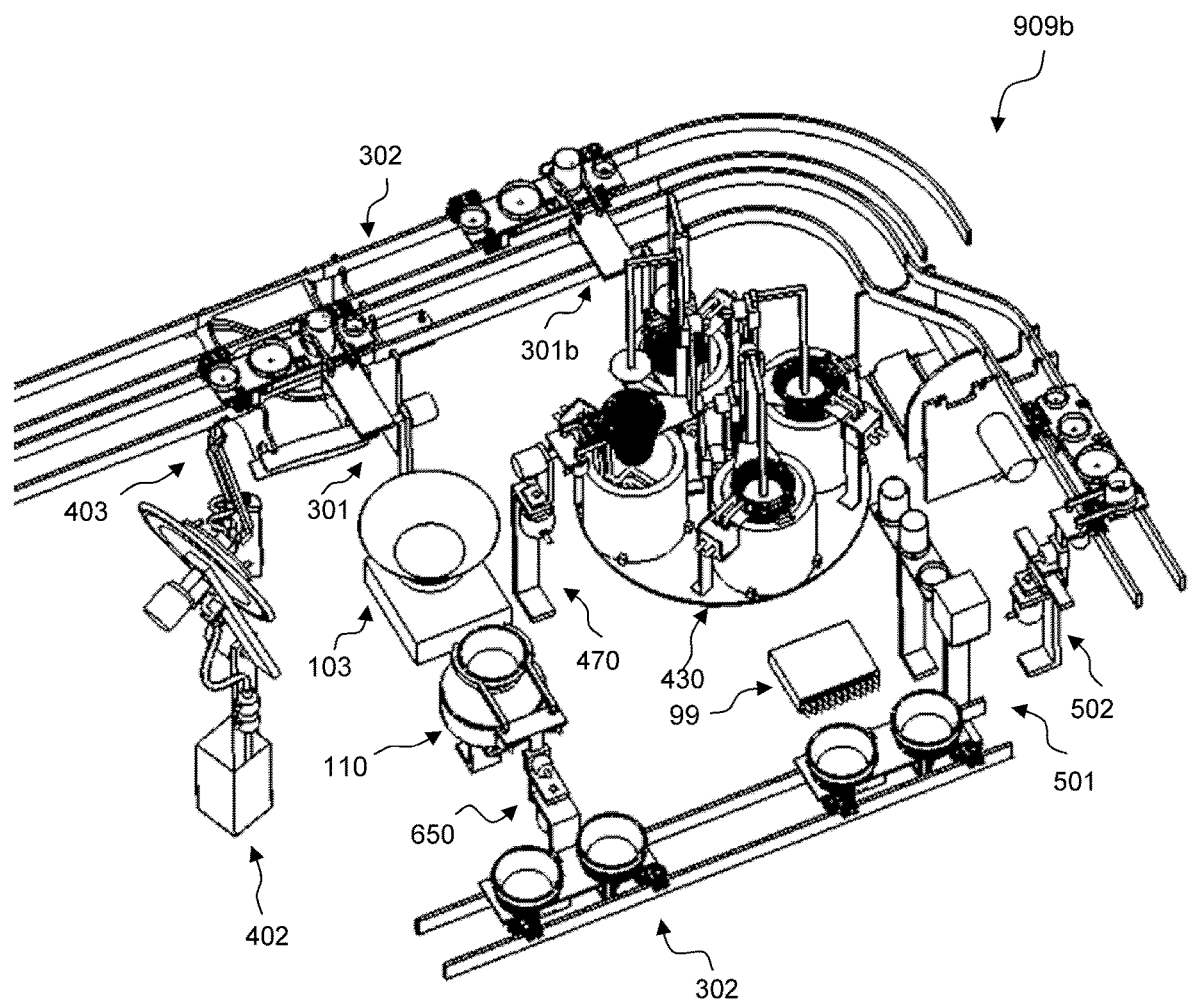
FIG. 33 shows an aerial view of another cooking system.
Figure 34:
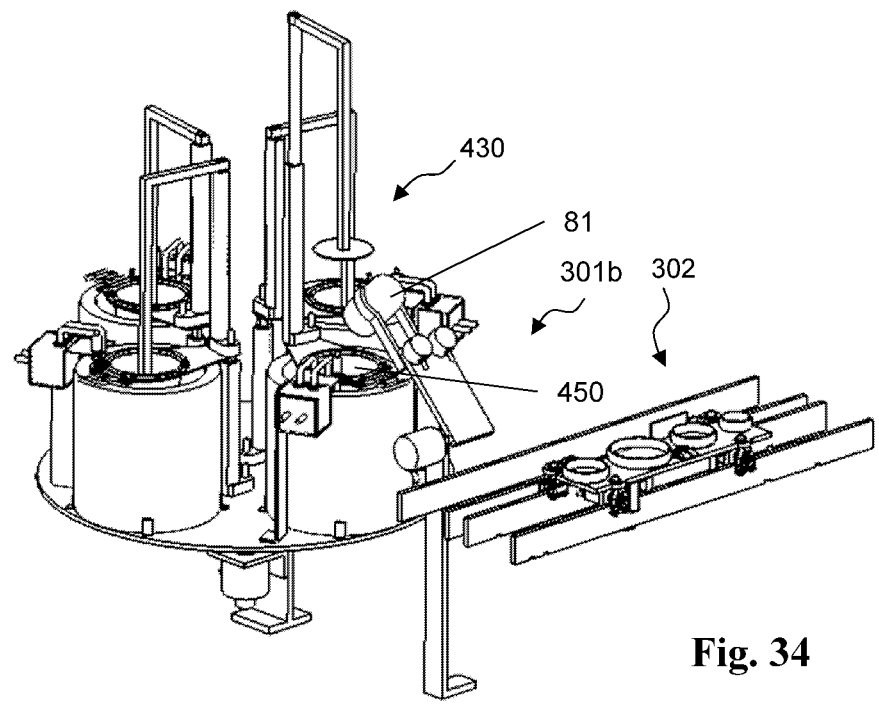
FIG. 34 shows dispensing of food ingredients from an ingredient container into a cooking container in the cooking system of FIG. 33.
Figure 35:
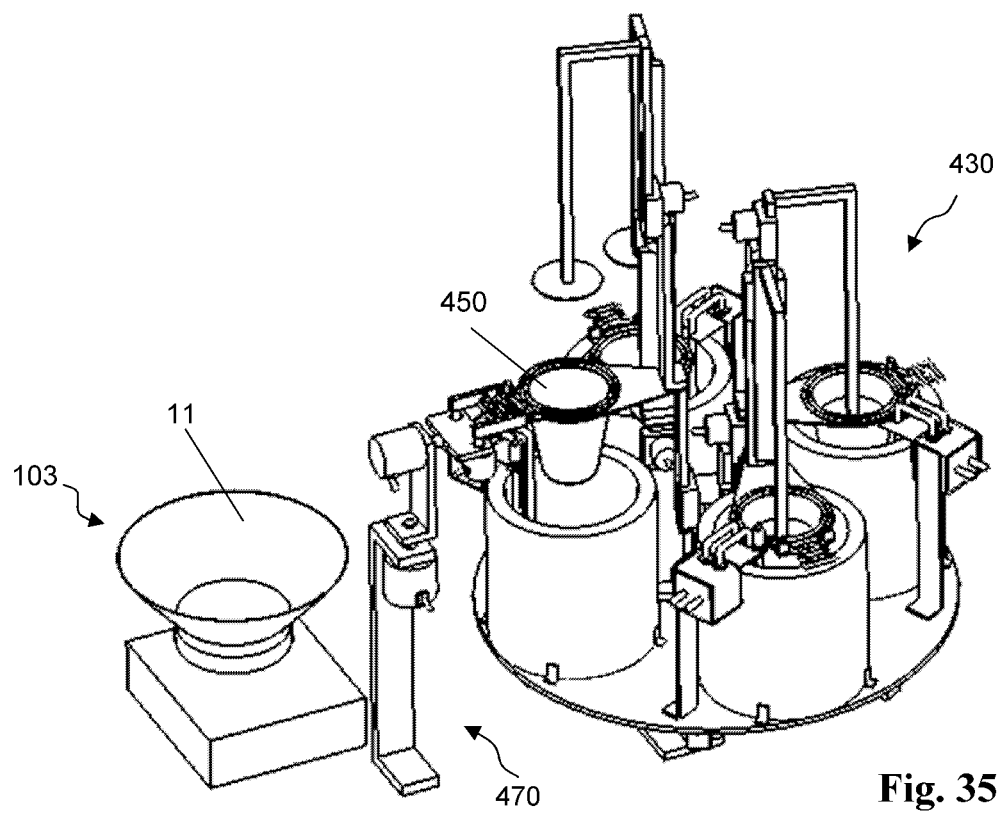
FIG. 35 shows dispensing of semi-cooked food into a cookware of the cooking system.
Figure 36:
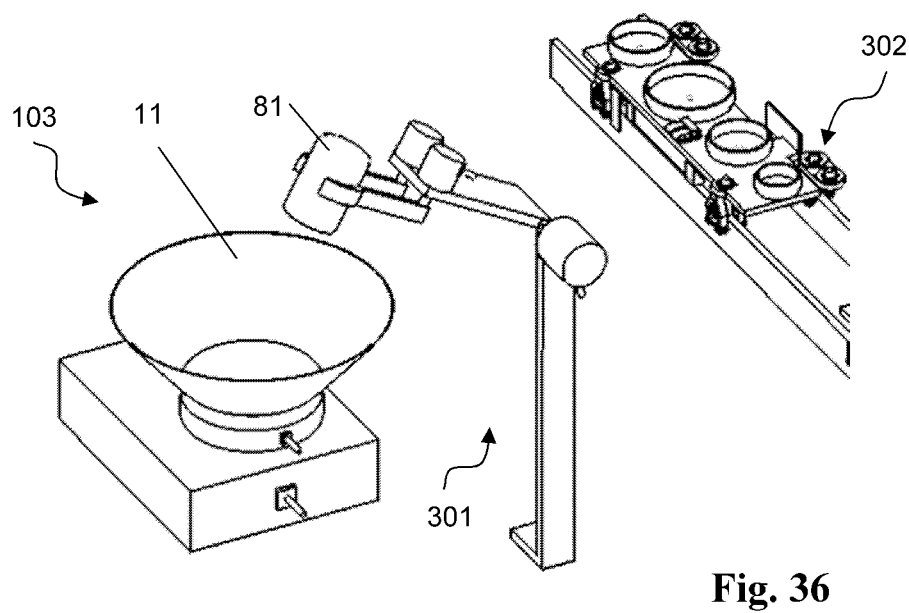
FIG. 36 showing the dispensing of food ingredients from an ingredient container into the cookware.

Referring to FIGS. 31-32, a transfer apparatus 480r comprise a gripping mechanism 460r comprising: a support component 475r referred to as a support component; grippers 472ra and 472rb referred to as gripping devices; shafts 473ra and 473rb; motors 474ra and 474rb. Each of the motors 474ra and 474rb comprises a base component which is fixedly connected to the support component 475r. The gripper 472ra is rigidly connected to the shaft 473ra. The motor 474ra can produce a rotation of the shaft 473ra around the axis of the shaft 473ra relative to the support component 475r. Similarly, the gripper 472rb is rigidly connected to the shaft 473rb. The motor 474rb can produce a rotation of the shaft 473rb around the axis of the shaft 473rb relative to the support component 475r. As the gripper 472ra or 472rb is rigidly connected to the shaft 473ra or respectively 473rb, the motor 474ra or 474rb can produce a rotation of the gripper 472ra or respectively 472rb. The shafts 473ra and 473rb have parallel axes, and the motors 474ra and 474rb are configured to rotate the respective grippers 472ra and 472rb in opposite directions simultaneously. In fact, the grippers 472ra and 472rb may be configured to rotate anti-synchronously. The motion mechanisms 474ra and 474rb may be linked by a transmission mechanism and then a single motor may drive their motions. The gripper 472ra or 472rb is rotated between two end-positions. At some first end-positions, the grippers 472ra and 472rb may grip (the edge 546 of) a basket 450 under the condition that the food container is placed in a certain position relative to the support component 475r. At some second end-positions, the grippers 472ra and 472rb can let loose and release the basket 450. The motors 474ra and 474rb are connected to the computer system 99 of FIG. 1 by wires or by wireless means, so that the computer system 99 may control timings and speeds of their produced motions.

The transfer apparatus 480r further comprises a rotational motion mechanism 404r. Said rotational motion mechanism 404r comprises: a shaft 477r referred as a moving member; a stationary member 479r; and a motor 478r comprising a base component. The support component 475r of the gripping mechanism 460r is rigidly, fixedly, or otherwise connected to the shaft 477r via a connector 476r. The base component of the motor 478r is rigidly, fixedly, or otherwise connected to the stationary member 479r. The motor 478r of the rotational motion mechanism 404r can produce a rotation of both the shaft 477r and the support component 475r between two end-positions relative to the stationary member 479r. The motors 474ra, 474rb, and 478r are all connected to the computer system 99 by wires or by wireless means, so that the computer system 99 may control timings and speeds of their produced motions by known techniques. The stationary member 479r is a rigid component and may also be referred to as the support component of the transfer apparatus 480r.

The transfer apparatus 480 in the cooking system 909 may be substituted by the transfer apparatus 480r.

The liquid dripping apparatus 440 may or may not be needed depending on applications.

In some embodiments, referring to FIGS. 33-36, a cooking system 909b comprises: a liquid dispensing mechanism 403 (as in FIGS. 7A-7B); a cookware cleaning mechanism 402; a transport system 302 (as in FIG. 9A, FIG. 14B, and FIGS. 16A-16E); a cooking apparatus 110 (as in FIGS. 6B-6C). In the cooking apparatus 110, the ingredient dispensing apparatus 301 is positioned next the cooking apparatus 103. The transfer apparatus 650 is positioned next the cooking apparatus 103 as to receive the cooked food dispensed from the cookware 11 of the cooking apparatus 103. The liquid dispensing mechanism 403 may dispense liquid ingredients into the cookware 11. The cookware cleaning mechanism 402 is positioned next to the cooking apparatus 103 and may clean the cookware 11. (See U.S. patent application Ser. No. 17/069,707 for more details of the cleaning apparatus 402. The entire contents of the application are hereby incorporated herein.)

The cooking system 909b further comprises: a cooking apparatus 430 (as in FIGS. 20E-20G); an ingredient dispensing apparatus 301b; and a dispensing apparatus 470 (as in FIG. 19C); wherein the ingredient dispensing apparatus 301b is a copy of the ingredient dispensing apparatus 301 but is positioned next the cooking apparatus 430. The part numbers in the mechanism 301b are the same as the corresponding parts of the mechanism 301. The ingredient dispensing apparatus 301b is configured to dispense solid food ingredients into one of the cooking containers 450 of the cooking apparatus 430. The dispensing apparatus 470 is positioned between the cooking apparatus 103 and the cooking apparatus 430, as to dispense semi-cooked food from a basket 450 on the holder 488 of cooking apparatus 430 into the cookware of the cooking apparatus 103.

The cooking system 909b further comprises: a transfer apparatus 502 (as in FIG. 11); a storage apparatus 501 (as in FIG. 12); and a computer system 99 (as in FIG. 1). The transfer apparatus 502 may load an ingredient container 81 (which contains or otherwise holds food ingredients) from the storage apparatus 501 to a vehicle 790 in the transport system 302. The vehicle 790 may move the ingredient container to a location next to the cooking apparatuses as to be gripped and held by the dispensing apparatus of the corresponding cooking apparatus. The timing of arrival of the vehicle 790 at said location is controlled by the computer system 99.

When a basket 450 of the cooking apparatus 430 is at a certain position relative to the support component 349 of ingredient dispensing apparatus 301b, and when the corresponding basket 450 is at the second end-position, the grippers of the ingredient dispensing apparatus 301b may be moved to grip an ingredient container 81 containing or otherwise holding solid food ingredients; and then the grippers and the ingredient container 81 can be rotated (by the motor 348) as to dispense the food ingredients into said basket 450. See FIG. 34. Then, the solid food ingredients can be boiled or deep fried by a heated liquid in the corresponding liquid container 493 as to produce a semi-cooked food.

After the basket 450 of the cooking apparatus 430 is rotated by the motor 686 to a certain position (relative to the stationary member 479 of the transfer apparatus 480), the corresponding linear actuator 487 moves the basket 450 to the second end-position, and the corresponding lid 543 is moved to the second end-position, the dispensing apparatus 470 can grip and hold said container 450. Then the dispensing apparatus 470 moves said basket 450 to a position above the cookware 11 and turn the basket 450 as to dispense a semi-cooked food in the cooking container into the cookware 11. See FIG. 35.

The ingredient dispensing apparatus 301 can grip and hold an ingredient container 81 on a vehicle 790 (which is moved to a dispensing position relative to the support component 349) and then rotate the ingredient container 81 around the axis of the shaft 347 as to dispense the food ingredients from the ingredient container 81 into the cookware 11. See FIG. 36. Said food ingredients, in combination with the semi-cooked food dispensed from the cooking apparatuses 430, are further cooked by the cooking apparatus 103 to make a cooked food. Said cooked food is dispensed into a food container 182 gripped by the transfer apparatus 650 (also see FIG. 6C). Then, the transfer apparatus 650 loads the food container 182 to a vehicle 640 which is moved to a certain position relative to the support component 678. Then, the vehicle 640 moves the food container 182 to a location that is closer to customers.

It should be noted that the dispensing apparatus 470 in the cooking system 909b may be substituted by other type of dispensing apparatus comprising a gripping mechanism and a motion mechanism, e.g., by the dispensing apparatus 470b of FIG. 19E. The motion mechanism can turn a gripped food container by some angular degrees, usually between 90 and 180 degrees.

It should be noted that the 3-dimensional positioning of the mechanisms and apparatuses in the cooking system 909b can be done in various ways.

It should be noted that a cooked food produced by any of the above cooking systems may optionally be mixed with additional food ingredients such as, salt, cheese, vinegar, soy sauce, etc. The cooked food may be further cooked by another cooking apparatus.

For the present patent application, a motion mechanism is meant to be any mechanism configured to produce a relative motion between two objects. A motion mechanism can be powered by electricity, oil, gas, or other energy sources. A motion mechanism may comprise a motor.

The ingredient dispensing apparatuses 301 and 301b in the cooking system 909 or 909b may be combined into one. The ingredient dispensing apparatuses may be substituted by mechanisms each comprising a robot arm.

It should be noted that the ingredient dispensing apparatuses 301 and 301b in the above described cooking systems may be substituted by other type of dispensing apparatus, such as the robotic apparatus 222 (of FIG. 4F), which is a combination of robot arm and robot fingers. Similarly, the motion mechanism 104 of the cooking apparatus 103 may be substituted by the robot arm 218 (of FIG. 2I) where the moving member 217b is fixedly connected to the cookware 11. The transfer apparatus 650 may be substituted by the robotic apparatus 222.

It should be noted that the drawings in the present patent application are schematic and may not be well scaled. The distances between various mechanisms and apparatuses may not be drawn to scale. The 3-dimensional positioning of various mechanisms and apparatuses in a cooking system may be done in various other ways.

A motor may be an AC or DC motor, stepper motor, servo motor, inverter motor, pneumatic or hydraulic motor, etc. A motor may optionally further comprise a speed reducer, encoder, and/or proximity sensor While this document contains many specifics, these should not be construed as limitations on the scope of an invention that is claimed or of what may be claimed, but rather as descriptions of features specific to embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

A rigid component described in the present patent application can be any type of solid component which has some degree of rigidity in an application, and there is no strict or quantitative requirement for the degree of rigidity. It should be noted that there is no perfect rigid component in our world, as there are always elastic, thermal, and other deformations in any physical subject. A rigid component may comprise one or more of the following: a bar, a tube, a beam, a plate, a board, a frame, a structure, a bearing housing, a shaft. A rigid component can be made by metal such as steel or aluminum, or a mixture of metals, an alloy, a reasonably rigid plastic, some wood, or by other materials, or by a combination of different types of materials.

Similarly, a rigid connection of two or more components can be a connection which has some degree of rigidity in an application, and there is no strict quantitative requirement for the degree of rigidity. A rigid connection may be a welding of two or more metal components. A rigid connection may be a bolting of two or more components; and so on. Clearly, a typical connection of a shaft and a bearing housing by a bearing (and accessories), for example, is not a rigid connection, since the shaft can rotate relative to the bearing housing.

Most common bearings are ball bearings and roller bearings. However, a bearing in the present patent application can be of any type.

A support component described in the present patent application can be any type of rigid component. A support component may be moved or fixed relative to the ground.

Only a few examples and implementations are described. Other implementations, variations, modifications and enhancements to the described examples and implementations may be made without deviating from the spirit of the present invention. For example, the term cookware is used to generally refer to a device for containing or holding food or food ingredients during cooking. For the purpose of present patent application, a cookware can be a wok, a pot, a pan, a basket, a bowl, a dish, a container, a board, a rack, a net, a mesh, or any object used to contain or otherwise hold food or food ingredients during a cooking process. The cooking also is not limited to any ethnic styles. The cooking may include but is not limited to frying (including stir frying, deep frying), steaming, boiling, roasting, baking, smoking, microwaving, etc. The cooking apparatus may or may not use a heater.

Similarly, a food container, ingredient container, or container, can be a bowl, a plate, a cup, a jar, a bottle, a flat board, a basket, a net, a wok, a pan, or any object used to contain or otherwise hold a food. A container can have a rather arbitrary geometric shape. It is possible that different ingredient containers may have different shapes. It is possible that different food containers may have different shapes. It is possible that different cooking containers may have different shapes. It is possible that different cookware may have different shapes.

A gripper is a device used to touch and grip an object such as a container. A gripper can be a rigid or elastic object as in FIGS. 4A-4E. In this patent application, a gripper may be pneumatic gripper, which is an actuating device that uses compressed air as power to pinch or grip an object. A gripper may be a vacuum chuck.

A gripping mechanism can be any mechanism that can be used to grip an object. A gripping mechanism may optionally comprise a gripper such as a vacuum chuck. A gripping mechanism may optionally comprise a plurality of rigid or elastic grippers which are moved to grip an object. A gripping mechanism may optionally comprise a robot hand In fact, a robot hand may be used as a gripping mechanism for our purposes.

A motion mechanism can be any mechanism that can be used to produce a movement of an object, which may be a component of the motion mechanism or an object that is rigidly or fixedly connected to a component of the motion mechanism. A motion mechanism may produce a linear motion of a component. A motion mechanism may produce a rotation of a component. A motion mechanism may comprise a robot arm. A motion mechanism may be a combination motion mechanism comprising a plurality of motion sub-mechanisms. A motion mechanism may comprise: a crank rod mechanism; eccentric motion mechanism; etc. A motion mechanism may comprise one or more the following parts: motor; encoder; shaft; coupling; bearing housing; bearings and accessories; gear and rack; screw rod and screw nut; cylinder; hydraulic cylinder; electromagnet; cam; eccentric shaft; Geneva mechanism, etc. Motion mechanisms can be more complex and the motions produced by a motion mechanism can be a planar motion, a spherical motion, an oscillatory or vibratory motion, see e.g., U.S. patent application Ser. No. 16/997,196, 15/706,136 (in this application a motion mechanism may be referred to as a transport mechanism), Ser. Nos. 15/801,923, and 15/798, 357. The entire contents of the above applications are hereby incorporated herein by reference.

It should be noted that the linear motion produced by the linear motion mechanism may be a linear motion between two end-positions or a linear motion with multiple stop positions. Any robot arm may be used as a motion mechanism for our purposes.

A transfer apparatus can be any apparatus that can be used to transfer an object (such as a container) from one position to another. A transfer apparatus may comprise: a gripping mechanism comprising a support component and one or more grippers; and a combination motion mechanism which is a combination of a plurality of motion sub-mechanisms, said combination motion mechanism being configured to move the support component of the gripping mechanism A transfer apparatus may comprise a robot arm and a gripping mechanism. A robotic apparatus comprising a combination of a robot arm and a robot hand may be used as a transfer apparatus for our purposes.

An ingredient dispensing apparatus can be any apparatus that can be used to dispense food ingredients from an ingredient container into a cookware. A typical dispensing apparatus of food ingredients may comprise: a gripping mechanism configured to grip an ingredient container, and a motion mechanism configured to move a (support) component of gripping mechanism. More examples in U.S. Pat. No. 10,455,987 and U.S. patent application Ser. No. 15/798, 357. In particular, a robotic apparatus comprising a robot hand and robot arm may be used as an ingredient dispensing apparatus. This is often used in prior art.

A food dispensing apparatus can be any apparatus that can be used to dispense a cooked (or semi-cooked) food from a cookware into another container. A food dispensing apparatus may comprise a motion mechanism which moves the cookware. A food dispensing apparatus may alternatively comprise a robotic apparatus comprising a robot arm and a robot hand that moves the cookware, and this is often the case when the cookware is not fixedly attached to another (relatively heavy) mechanism.

There is a difference between transfer apparatus and ingredient (or food) dispensing apparatus, as follows. A dispensing apparatus need to turn (or rotate) a gripped container upside down or by some angle of say, 90 to 180 degrees, as to dispense the food or food ingredients contained in the container to another container. In comparison, a transfer apparatus does not need to turn (or rotate) a gripped container, since the food or food ingredients are not to be dispensed from the container. Indeed, it is advantageous (though not always a strict requirement) for the transfer apparatus to keep the gripped container in some upright or nearly upright position, as to not let the food or food ingredients drop out. Even in case the container is sealed by a lid, there is no need for the food or food ingredients to touch the lid.

Each vertical motion mechanism as described above may be substituted by a motion mechanism which can produce a linear or non-linear motion in an upward or downward direction, where an upward direction needs not to be exactly vertical. It can have an inclination angle between 0 and 90 degrees. Same applies to each horizontal motion mechanism described above.

A liquid dispensing apparatus can be any apparatus that can be used to dispense a liquid ingredient from a container into a cookware. A liquid dispensing apparatus may comprise liquid pipes, a liquid pump, a valve, and/or flow sensors, etc. More examples in U.S. Pat. No. 10,455,987.

A cooking apparatus can be any apparatus comprising a cookware. A cooking apparatus may optionally further comprise a motion mechanism configured to move the cookware. The motion mechanism may optionally comprise a motion sub-mechanism configured to move the cookware as to stir food or food ingredients in the cookware. The motion mechanism may optionally comprise a motion sub-mechanism configured to move the cookware as to dispense a cooked (or semi-cooked) food from the cookware. A cooking apparatus may optionally comprise a transfer apparatus configured to move the cookware. Said transfer apparatus may optionally grip and turn the cookware as to dispense a cooked (or semi-cooked) food from the cookware. Examples of cooking apparatuses are given in U.S. Pat. No. 10,455,987 and U.S. patent application Ser. Nos. 16/997,196, 15/706,136, 16/155,895, 15/801,923, and 15/869,805, the entire disclosures of which are hereby incorporated herein by reference.

A cleaning apparatus can be any apparatus that can be used to clean an object, e.g., a funnel, or a container such as cookware, food container, or ingredient container. A cleaning apparatus comprises a liquid source (e.g., tap water, or a water tank) and a liquid pipe to flow the liquid from the source to the object; wherein the liquid flow may be controlled by a valve, a liquid pump, and/or by other known techniques; wherein the liquid may be referred to as a cleaning liquid, such as hot water, for the purpose of cleaning the object. In some applications, the liquid may be sprayed on the object by high speed, but this is not a requirement. A cleaning apparatus may optionally further comprise a stirrer which is rotated to stir the cleaning liquid in the object, e.g., a container, which is cleaned by the cleaning apparatus. A cleaning apparatus may optionally comprise a motion mechanism configured to move the water pipes and stirrers away from or towards the object, which is cleaned or to be cleaned by the cleaning apparatus.

A transport system can be any system that can be used to transfer a container (such as, an ingredient container, a food container, a cookware, or a cooking container). In some applications (but not always), a transport system can move a container after said container is placed on a member of the transport system. For example, a transport system may include a plurality of vehicles each configured to carry and transport a container; wherein the vehicles may optionally move on rail tracks. A transport system may optionally comprise a rotating turntable, or a cyclic motion mechanism, a chain, and/or a belt. Examples of transport system are given in U.S. Pat. No. 10,455,987 and U.S. patent application Ser. Nos. 15/798,357, 16/997,933, and 16/155,895, the entire disclosures of which are hereby incorporated herein by reference. A transport system may only comprise a transfer apparatus.

A container holder is a solid which has an adequate shape as to position or hold a container of a certain shape.

A container transfer apparatus can be any transfer apparatus used to move a container to a (different) member of a transport system. The container transfer apparatus can optionally be a part of said transport system.

A heater for the purpose of cooking in the known technique may substitute any stove and heater disclosed in the present application.

In our patent application, a computer system may or may not comprise a network. A computer system may be a single computer in some simpler applications.

A loading apparatus can be any transfer apparatus used to move a container to a (different) member of a transport system. The loading apparatus can optionally be a part of said transport system.

Control by a computer or computer system of a motor, an actuator, a heater, or electrical or electronic devices are by known techniques.

What is claimed is:
1. A cooking system comprising:
   a first cooking apparatus comprising:
      a support component;
      a plurality of cooking sub-apparatuses configured to deep fry or boil one or more food ingredients, wherein each cooking sub-apparatus comprises:
         a liquid container configured to contain a heated cooking liquid;
         a container holder comprising a solid structured to position or hold a cooking container, wherein the cooking container is used to contain or hold the one or more food ingredients;
         a first motion mechanism configured to move the container holder up or down, said first motion mechanism comprising a motor, an actuator, or other driving mechanism;
         a lid configured to cover a cooking container which is positioned or held by the container holder; and
         a second motion mechanism configured to move said lid, said second motion mechanism comprising a motor, an actuator, or other driving mechanism; and
      a third motion mechanism comprising a motor, said third motion mechanism being configured to produce a motion of the plurality of cooking sub-apparatuses relative to the support component; and
   a second cooking apparatus comprising:
      a cookware configured to contain or otherwise hold one or more foods or food ingredients;
      a fourth motion mechanism configured to move said cookware, to dispense a cooked food from said cookware to a food container, wherein the food container is used to contain or hold the cooked food, said fourth motion mechanism comprising a motor or other driving mechanism;
   wherein the first cooking apparatus is configured to produce a semi-cooked food from the one or more food ingredients, and the second cooking apparatus is configured to produce a cooked food from the semi-cooked food and/or additional food ingredients.

2. The cooking system of claim 1, further comprising a storage configured to position or store a number of ingredient containers, wherein each ingredient container is used to contain or hold one or more food ingredients.

3. The cooking system of claim 1, further comprising an ingredient dispensing apparatus configured to move an ingredient container to dispense one or more food ingredients to a cooking container which is positioned or held by one of the container holders of the first cooking apparatus, wherein the ingredient container is used to contain or hold the one or more food ingredients prior to the dispensing, said ingredient dispensing apparatus comprising:

a gripping mechanism comprising a support component and one or more grippers, said gripping mechanism being configured to grip the ingredient container; and a fifth motion mechanism configured to move the support component of the gripping mechanism, said fifth motion mechanism comprising a motor or other driving mechanism.

4. The cooking system of claim 1, further comprising an ingredient dispensing apparatus configured to move an ingredient container to dispense one or more food ingredients held to the cookware of the second cooking apparatus, wherein the ingredient container is used to contain or hold the one or more food ingredients prior to the dispensing, said ingredient dispensing apparatus comprising:

a gripping mechanism comprising a support component and one or more grippers, said gripping mechanism being configured to grip the ingredient container; and a sixth motion mechanism configured to move the support component of the gripping mechanism, said sixth motion mechanism comprising a motor or other driving mechanism.

5. The cooking system of claim 1, further comprising a transport system configured to transport an ingredient container, wherein the ingredient container is used to contain or hold the one or more food ingredients.

6. The cooking system of claim 5, wherein said transport system comprises a plurality of vehicles, said cooking system further comprising a container transfer apparatus configured to load an ingredient container to one of the plurality of vehicles, wherein the ingredient container is used to contain or hold one or more food ingredients, said container transfer apparatus comprising:

a gripping mechanism comprising a support component and one or more grippers, said gripping mechanism being configured to grip a said ingredient container; and a seventh motion mechanism configured to move the support component of the gripping mechanism, said seventh motion mechanism comprising a motor or other driving mechanism.

7. The cooking system of claim 1, further comprising a transport system configured to transport a food container, wherein the food container is used to contain or hold a cooked food.

8. The cooking system of claim 7, said transport system comprises a plurality of vehicles, each of the plurality of vehicles being configured to move a food container which is used to contain or hold a cooked food, said cooking system further comprising a transfer apparatus configured to move a food container to one of the plurality of vehicles, wherein the food container is used to contain or hold a cooked food, said transfer apparatus comprising:

a gripping mechanism comprising a support component and one or more grippers, said gripping mechanism being configured to grip the food container; and an eighth motion mechanism configured to move the support component of the gripping mechanism, said eighth motion mechanism comprising a motor or other driving mechanism.

9. The cooking system of claim 1, said first cooking apparatus comprises a liquid dispensing apparatus configured to dispense a liquid ingredient to said cookware of the second cooking apparatus.

10. The cooking system of claim 1, wherein the third motion mechanism of the first cooking apparatus is configured to produce an intermittent rotation.

11. The cooking system of claim 1, further comprising a food dispensing apparatus configured to move the cooking container which is positioned or held by one of the container holders to dispense a semi-cooked food from the cooking container to the cookware, wherein the cooking container is used to contain or hold the semi-cooked food prior to the dispensing, said food dispensing apparatus comprising:

a gripping mechanism comprising a support component and one or more grippers, said gripping mechanism being configured to grip a said ingredient container; and a ninth motion mechanism configured to move the support component of the gripping mechanism, said ninth motion mechanism comprising a motor or other driving mechanism.

12. The cooking system of claim 11, wherein the ninth motion mechanism of said food dispensing apparatus comprises:

a first motion sub-mechanism comprising a moving member, a stationary member, and a motor or other driving mechanism, said motion sub-mechanism being configured to produce a motion of said moving member relative to said stationary member;

a second motion sub-mechanism comprising a moving member, a stationary member, and a motor or other driving mechanism, said motion sub-mechanism being configured to produce a motion of said moving member relative to said stationary member; and a third motion sub-mechanism comprising a moving member, a stationary member, and a motor or other driving mechanism, said motion sub-mechanism being configured to produce a motion of said moving member relative to said stationary member;

wherein the moving member of the first motion sub-mechanism is configured to be rigidly, fixedly, or otherwise connected to the support component of the gripping mechanism;

wherein the moving member of the second motion sub-mechanism is configured to be rigidly, fixedly, or otherwise connected to the stationary member of the first motion sub-mechanism;

wherein the moving member of the third motion sub-mechanism is configured to be rigidly, fixedly, or otherwise connected to the stationary member of the second motion sub-mechanism.

13. The cooking system of claim 12, wherein the first motion sub-mechanism is configured to produce a rotation of its moving member relative to its stationary member, wherein the second motion sub-mechanism is configured to produce a vertical linear motion of its moving member relative to its stationary member, wherein the third motion sub-mechanism is configured to produce a rotation of its moving member relative to its stationary member.

14. The cooking system of claim 1, wherein the third motion mechanism of the first cooking apparatus is configured to produce a rotation.

15. A cooking system comprising a cooking apparatus, said cooking apparatus comprising:

a support component;

a plurality of cooking sub-apparatuses, each comprising:

a liquid container configured to contain a heated cooking liquid;

a container holder comprising a solid structured to position or hold a cooking container, wherein the cooking container is used to contain or hold one or more foods or food ingredients;

a first motion mechanism configured to move the container holder and the cooking container positioned or held by the container holder towards or away from the liquid container, said first motion mechanism comprising a motor, an actuator, or other driving mechanism;

a lid configured to cover the cooking container that is positioned or held by the container holder; and a second motion mechanism configured to move said lid, said second motion mechanism comprising a motor, an actuator, or other driving mechanism; and a third motion mechanism comprising a motor or other driving mechanism, said third motion mechanism being configured to move the plurality of cooking sub-apparatuses relative to the support component.

16. The cooking system of claim 15, wherein the third motion mechanism is configured to produce a rotation.

17. The cooking system of claim 15, further comprising an ingredient dispensing apparatus configured to move an ingredient container to dispense one or more food ingredients from the ingredient container to a cooking container which is positioned or held by one of the container holders of the first cooking apparatus, wherein the ingredient container is used to contain or hold the one or more food ingredients, said ingredient dispensing apparatus comprising:

a gripping mechanism comprising a support component and one or more grippers, said gripping mechanism being configured to grip a said ingredient container; and a fourth motion mechanism configured to move the support component of the gripping mechanism, said fourth motion mechanism comprising a motor or other driving mechanism.

18. The cooking system of claim 15, wherein the second motion mechanism of one of the cooking sub-apparatuses is configured to move the corresponding lid by rotation or by a vertical linear motion.

19. The cooking system of claim 15, wherein said cooking apparatus further comprising a liquid dripping mechanism comprising:

a plurality of container holders, each comprising a solid shape structured to position or hold a cooking container, wherein the cooking container is used to contain or hold a semi-cooked food; and a fifth motion mechanism comprising a motor or other driving mechanism, said fifth motion mechanism being configured to intermittently move the plurality of container holders.

20. The cooking system of claim 15, further comprising a transfer apparatus configured to move a cooking container from a said container holder of the cooking apparatus to a said container holder of the liquid dripping apparatus, wherein the cooking container is used to contain or hold a food or one or more food ingredients, said transfer apparatus comprising:

a gripping mechanism comprising a support component and one or more grippers, said gripping mechanism being configured to grip a said ingredient container; and a sixth motion mechanism configured to move the support component of the gripping mechanism, said sixth motion mechanism comprising a motor or other driving mechanism.

21. A cooking system comprising a cooking apparatus, said cooking apparatus comprising:

a container holder comprising a solid structured to position or hold amid cooking container, wherein the cooking container is used to contain or hold a food or one or more food ingredients;

a liquid container configured to contain a heated cooking liquid;

a first motion mechanism configured to move the container holder and the cooking container positioned or held by the container holder towards or away from the liquid container, said first motion mechanism comprising a motor, an actuator, or other driving mechanism;

a lid configured to cover the cooking container that is positioned or held by the container holder; and a second motion mechanism configured to move said lid, said second motion mechanism comprising a motor or other driving mechanism.

22. The cooking system of claim 21, further comprising an ingredient dispensing apparatus configured to move an ingredient container to dispense one or more food ingredients to a cooking container which is positioned or held by the container holder, wherein the ingredient container is used to contain or hold the food ingredients prior to the dispensing, said ingredient dispensing apparatus comprising:

a gripping mechanism comprising a support component and one or more grippers, said gripping mechanism being configured to grip a said ingredient container; and a third motion mechanism configured to move the support component of the gripping mechanism, said third motion mechanism comprising a motor or other driving mechanism.

23. The cooking system of claim 21, further comprising a storage configured to position or store a number of ingredient containers, wherein each ingredient container is used to contain or hold one or more food ingredients, and a transfer apparatus and/or transport system configured to transfer one of the ingredient containers from said storage to cooking apparatus, said transfer apparatus comprising:

a gripping mechanism comprising a support component and one or more grippers, said gripping mechanism being configured to grip a said ingredient container; and a fourth motion mechanism configured to move the support component of the gripping mechanism, said fourth motion mechanism comprising a motor or other driving mechanism.

* * * * *